(12) United States Patent
Thompson et al.

(10) Patent No.: US 10,378,316 B2
(45) Date of Patent: *Aug. 13, 2019

(54) METHOD AND SYSTEM FOR PASSIVE ELECTROSEISMIC SURVEYING

(71) Applicant: Hunt Energy Enterprises, L.L.C., Dallas, TX (US)

(72) Inventors: Arthur Thompson, Houston, TX (US); Alan Katz, Dallas, TX (US); Robert England, Flower Mound, TX (US); Mohammad Rahman, Dallas, TX (US); Naga P. Devineni, Irving, TX (US)

(73) Assignee: ES Xplore, L.L.C., Dallas, TX (US)

( * ) Notice: Subject to any disclaimer, the term of this patent is extended or adjusted under 35 U.S.C. 154(b) by 855 days.

This patent is subject to a terminal disclaimer.

(21) Appl. No.: 14/044,469

(22) Filed: Oct. 2, 2013

(65) Prior Publication Data

US 2014/0039796 A1    Feb. 6, 2014

Related U.S. Application Data

(63) Continuation of application No. 13/712,177, filed on Dec. 12, 2012, now Pat. No. 8,589,079, which is a
(Continued)

(51) Int. Cl.
*G01V 1/40* (2006.01)
*E21B 41/00* (2006.01)
(Continued)

(52) U.S. Cl.
CPC .......... *E21B 41/0092* (2013.01); *E21B 43/00* (2013.01); *E21B 43/16* (2013.01);
(Continued)

(58) Field of Classification Search
CPC .......................... G01V 11/007; E21B 41/0092
(Continued)

(56) References Cited

U.S. PATENT DOCUMENTS 3,136,943 A    6/1964    Slichter
4,507,611 A    3/1985    Helms
(Continued)

FOREIGN PATENT DOCUMENTS

GB    2 459 365    10/2009
WO    WO 2010/080366    12/2009

OTHER PUBLICATIONS

U.S. Appl. No. 61/469,498, filed Mar. 30, 2011, Arthur Thompson.
(Continued)

*Primary Examiner* — Toan M Le
*Assistant Examiner* — Xiuqin Sun
(74) *Attorney, Agent, or Firm* — Baker Botts L.L.P.

(57) ABSTRACT

A method of passive surveying comprises generating one or more detected signals by passively detecting a signal generated within a subsurface earth formation due to a seismoelectric response or an electroseismic response in at least one porous subsurface earth formation containing at least one fluid, and processing the one or more detected signals to determine at least one property of the subsurface earth formation.

23 Claims, 10 Drawing Sheets

Related U.S. Application Data continuation of application No. 13/674,666, filed on Nov. 12, 2012, now Pat. No. 8,478,533, which is a continuation of application No. 13/431,735, filed on Mar. 27, 2012, now Pat. No. 8,347,658.

(60) Provisional application No. 61/528,421, filed on Aug. 29, 2011, provisional application No. 61/469,498, filed on Mar. 30, 2011.

(51) Int. Cl.
| | |
|---|---|
| *G01V 11/00* | (2006.01) |
| *G06F 19/00* | (2018.01) |
| *E21B 43/16* | (2006.01) |
| *G01V 3/12* | (2006.01) |
| *G01V 3/16* | (2006.01) |
| *E21B 47/00* | (2012.01) |
| *G01V 3/38* | (2006.01) |
| *E21B 43/00* | (2006.01) |

(52) U.S. Cl.
CPC ............... *E21B 47/00* (2013.01); *G01V 3/12* (2013.01); *G01V 3/16* (2013.01); *G01V 3/38* (2013.01); *G01V 11/007* (2013.01); *G06F 19/00* (2013.01); *G01V 2210/6163* (2013.01); *Y10T 70/375* (2015.04)

(58) Field of Classification Search
USPC .......................................................... 702/11
See application file for complete search history.

(56) References Cited

U.S. PATENT DOCUMENTS

| | | | |
|---|---|---|---|
| 4,573,148 A | | 2/1986 | Herkenhoff et al. |
| 4,686,475 A | | 8/1987 | Kober et al. |
| 4,825,165 A | | 4/1989 | Helms et al. |
| 4,841,250 A | | 6/1989 | Jackson |
| 4,904,942 A | * | 2/1990 | Thompson ............. G01V 3/082 324/323 |
| 4,964,098 A | * | 10/1990 | Hornbostel ............. G01V 1/28 367/38 |
| 5,041,792 A | | 8/1991 | Thompson |
| H1490 H | | 9/1995 | Thompson et al. |
| 5,486,764 A | | 1/1996 | Thompson et al. |
| H1524 H | | 4/1996 | Thompson et al. |
| H1561 H | | 7/1996 | Thompson |
| 5,777,478 A | | 7/1998 | Jackson |
| 5,877,995 A | | 3/1999 | Thompson et al. |
| 6,462,549 B1 | * | 10/2002 | Curtis .................... G01V 3/082 181/122 |
| 6,476,608 B1 | | 11/2002 | Dong |
| 6,477,113 B2 | | 11/2002 | Hornbostel et al. |
| 6,664,788 B2 | | 12/2003 | Hornbostel et al. |
| 6,950,747 B2 | | 9/2005 | Byerly |
| 7,248,052 B2 | | 7/2007 | Weaver et al. |
| 7,330,790 B2 | | 2/2008 | Berg |
| 7,340,348 B2 | | 3/2008 | Strack et al. |
| 7,397,417 B2 | | 7/2008 | Jackson |
| 7,573,780 B2 | | 8/2009 | Thompson et al. |
| 8,169,222 B2 | | 5/2012 | Hornbostel et al. |
| 8,347,658 B2 | * | 1/2013 | Thompson ............ G01V 11/007 324/323 |
| 8,478,533 B2 | * | 7/2013 | Thompson ............ G01V 11/007 324/323 |
| 8,589,079 B2 | * | 11/2013 | Thompson ............ G01V 11/007 324/323 |
| 2002/0181326 A1 | | 12/2002 | Hornbostel et al. |
| 2006/0132137 A1 | * | 6/2006 | MacGregor .............. G01V 3/12 324/334 |
| 2007/0257830 A1 | | 11/2007 | Savage et al. |
| 2007/0294036 A1 | | 12/2007 | Strack et al. |
| 2009/0108845 A1 | | 4/2009 | Kaminski |
| 2012/0253680 A1 | * | 10/2012 | Thompson ............ G01V 11/007 702/13 |

OTHER PUBLICATIONS

PCT Notification of Transmittal of the International Search Report and the Written Opinion of the International Searching Authoritiy of the Declaration; Int'l application No. PCT/US2012/030750; 25 pages, dated Sep. 18, 2012.

Simpson, Fiona, et al.; "Practical Magnetotellurics," Feb. 15, 2005, Cambridge University Press, Feb. 14, 2005.

European Search Report; European Patent Application No. 12161617.1-2213; dated Jul. 4, 2012, 6 pages.

U.S. Appl. No. 61/528,421, filed Aug. 29, 2011, Alan Katz.

H. Roder, et al.; "Seismo-electrical effects: Experiments and Field Measurements;" Applied Physics Letters, AIP, American Institute of Physics, Melville, NY, US, vol. 80, No. 2; XP012030927; pp. 334-336, Jan. 14, 2002.

European Patent Office "Communication Pursuant to Article 94(3) EPC" Application No. 12 161 617.1-1610; 4 pages, dated Jan. 2, 2016, Feb. 19, 2016 (receipt date).

State Intellectual Property Office of the People's Republic of China; Examination Report issued for Gulf Cooperation Council Patent Application No. 2012-20901, dated Jan. 1, 2017.

State Intellectual Property Office of the People's Republic of China; Search Report issued for Gulf Cooperation Council Patent Application No. 2012-20901, dated Jan. 1, 2017.

Australian Patent Office; Examination Report No. 1 issued for Australian Patent Application No. 2017200753, dated Mar. 6, 2017; received Mar. 18, 2017.

European Patent Office; Extended European Search Report for EP Patent Application No. 17168089.5; dated Aug. 11, 2017; received Sep. 19, 2017.

\* cited by examiner

METHOD AND SYSTEM FOR PASSIVE ELECTROSEISMIC SURVEYING

CROSS-REFERENCE TO RELATED APPLICATIONS

This application is a continuation of U.S. application Ser. No. 13/712,177 filed Dec. 12, 2012 and entitled "Method and System for Passive Electroseismic Surveying" which is a continuation of U.S. application Ser. No. 13/674,666 filed Nov. 12, 2012 and entitled "Method and System for Passive Electroseismic Surveying" which is a continuation of U.S. application Ser. No. 13/431,735 filed Mar. 27, 2012 and entitled "Method and System for Passive Electroseismic Surveying" which claims priority under 35 U.S.C. § 119 of provisional application No. 61/469,498 filed Mar. 30, 2011 entitled "Method and System for Passive Electroseismic Surveying" and provisional application No. 61/528,421 filed Aug. 29, 2011 and entitled "Passive Electromagnetic Tool for Direct Hydrocarbon Indication".

STATEMENT REGARDING FEDERALLY SPONSORED RESEARCH OR DEVELOPMENT

Not applicable.

REFERENCE TO A MICROFICHE APPENDIX

Not applicable.

BACKGROUND

Conventional geophysical surveying techniques employ several distinct technologies, which can include seismology, controlled-source electromagnetics, (CSEM), magnetotellurics, microseismology, gravity, magnetics, and controlled source electroseismology and seismoelectric surveying. Gravity and magnetics technologies survey large areas, such as whole geological basins. These technologies generally identify prospective regions with attractive geological features but do not generally identify the detailed location of hydrocarbon reservoirs or mineral resources. Microseismology generally relies on small, localized seismic events generated in the earth by naturally occurring earth movements or by well-drilling operations. Microseismology may locate the source of fracturing events such as encountered in fracturing reservoirs. Magnetotellurics uses the low-frequency portion of the earth's background electromagnetic fields to estimate the subsurface electrical conductivity but the method does not provide a detailed location or shape of target reservoir structures. Seismology produces information indicative of reservoir structures and CSEM provides electrical resistivity information that indirectly indicates the presence of hydrocarbons. Controlled source electroseismology and electroseismic surveying use high-power seismic or electromagnetic sources to create images of the subsurface that provide both structural and fluid property information. These methods are seldom used because they are significantly limited by the requirement for high-power sources.

In gravity surveying, sensitive gravity detectors are placed on the earth or above the earth. Reservoirs typically have smaller mass density than non-reservoir rock. The sensitive gravity meter detects a minimum in local gravitational acceleration over a reservoir. Gravity studies have several limitations. Local gravity values reflect an average of the mass densities from all materials in the neighborhood of the sensor. Whereas reservoirs of low density reduce the measured gravitational acceleration, the presence of high-density rock reduces the spatial resolution of the measurement and may obscure the presence of a low-density formation. The spatial resolution of gravity measurements is limited to length scales comparable to the depth and lateral extent of the reservoir. The amplitude of the identifying gravity signature depends on the volume of the reservoir. Little information is provided regarding the reservoir structure, pore-fluid properties, or the permeability.

In magnetic surveying, magnetic-field sensing devices measure the magnetic field of the earth, typically from aircraft. Hydrocarbon reservoirs and mineral deposits, such as iron ore, may alter the local earth's magnetic field. Measured data can be used to indicate the presence of reservoir structures. Magnetic surveying is limited because it measures neither properties related to the reservoir spatial extent and structure, nor the fluid identity and flow properties.

Seismic prospecting techniques generally involve the use of a seismic energy source and a set of receivers spread out along or near the earth's surface to detect seismic signals reflected from subsurface geological boundaries. These signals are recorded as a function of time, and subsequent processing of these signals is designed to reconstruct an appropriate image of the subsurface formation. In generic terms, this conventional process has seismic energy traveling down into the earth, reflecting from a particular geologic layer at a seismic impedance contrast, and returning to the receiver as a reflected seismic wave.

The seismic energy may be so-called shear waves (S-waves) or so-called compressional waves (P-waves). Shear waves and compressional waves differ with respect to their velocities, angles of reflection, vibrational directions, and to some extent the types of information that may be obtained from their respective types of seismic data. However, both types of waves suffer similar attenuation by earth formations; that is, the earth formations tend to attenuate the higher frequency components and allow the lower frequency components to pass through the earth relatively unattenuated. This means that, for deeper formations, the low frequency content of the reflected seismic energy contains the information about the underlying subsurface formations. However, because of the low frequency of the detected reflected seismic energy, the resolution of the reflected seismic energy may be insufficient to allow for detection of very thin geologic layers.

Further, if the seismic impedance contrast between adjacent but distinct geologic layers is small, little seismic energy is reflected and the distinctness of the geologic layers may not be discernible from the detected or recorded seismic data. Additionally, seismic studies might provide information about the structure of rock formations in the subsurface but generally are not able to distinguish between pore fluids, such as an aqueous fluid, oil, or gas.

Magnetotelluric surveying generally involves the use of the natural electromagnetic fields that originate in the earth's atmosphere. Naturally-occurring electromagnetic fields propagate into the subsurface where they encounter rock formations of differing electrical conductivity. When the electromagnetic fields contact a formation of low conductivity, such as is typical of hydrocarbon reservoirs, the electromagnetic field measured at the surface of the earth changes. Spatially-dependent electromagnetic fields measured on the earth's surface can be used to indicate the presence of low-conductivity formations that might contain hydrocarbons. Magnetotelluric surveying has several limitations. Only low-frequency, long-wavelength electromagnetic stimulation may reach prospective reservoirs because the high-frequency electromagnetic fields are rapidly attenuated by the conducting earth. Long-wavelength electromagnetic waves limit the spatial resolution of magnetotellurics making reservoir delineation difficult. Additionally, magnetotelluric surveying only provides information about formation electrical conductivity and does not yield data revealing information about porosity, permeability, or reservoir structure.

Seismic energy may be so-called micro-seismic energy. Seismic waves are generated in the earth by tectonic forces, by ocean tides and other natural phenomena. Seismic waves are also created when drilling or earth fracturing operations are conducted in hydrocarbon exploration, production, or in water well services. The events created by these natural and man-made events are called microseismic events. Generally, micro-seismic studies yield qualitative information about the location of subsurface structures or positional information about drilling operations. In these studies the location of the seismic source is imperfectly known so that only poor quality images of the subsurface are possible.

Controlled-source electromagnetic surveying involves the use of a source of electrical power and a set of electromagnetic receivers typically deployed on the seafloor in deep water. Although CSEM surveying may be done on land or in shallow water, recent work finds particularly useful applications in deep water. In CSEM surveying, the power source drives an electrical current into the earth that passes through the various subsurface rock formations. The electrical current follows a path of low electrical resistance through the most conducting rock masses. Hydrocarbon reservoirs contain insulating gas or oil fluids so the applied electrical current tends to flow around the resistive reservoir structures. The deflection of current around reservoirs is detected as a change in electromagnetic response on the detectors deployed on the seafloor. The measured signal properties can be used to reflect the presence of resistive reservoir structures.

SUMMARY

In an embodiment, a method of passive surveying comprises generating one or more detected signals by passively detecting a signal generated within a subsurface earth formation due to a seismoelectric response or an electroseismic response in at least one porous subsurface earth formation containing at least one fluid, and processing the one or more detected signals to determine at least one property of the subsurface earth formation. Generating the one or more detected signals may comprise generating a detected electromagnetic field by detecting earth's electromagnetic field using an electromagnetic field detector and processing the one or more detected signals may comprises demodulating a portion of the signal to identify an envelope of the signal, wherein the envelope is indicative of the presence of the hydrocarbons. Processing the one or more detected signals may also comprise analyzing the envelope to determine a value correlated to a depth of the hydrocarbons in the subterranean formation. Demodulating the portion of the signal may comprise extracting a frequency modulation, a phase modulation, an amplitude modulation, or any combination thereof from the signal. The envelope may comprise at least one of the frequency modulation, the phase modulation, or the amplitude modulation. Generating the one or more detected signals may comprise generating a detected electromagnetic field by detecting earth's electromagnetic field using an electromagnetic field detector, and processing the one or more detected signals may comprise processing the detected electromagnetic field to determine the at least one property of the subsurface earth formation. Generating the one or more detected signals may comprise generating a detected seismic signal by detecting a seismic wave generated within the subsurface earth formation using a seismic sensor, and processing the one or more detected signals may comprise processing the detected seismic signal to determine the at least one property of the subsurface earth formation. In another embodiment, generating the one or more detected signals may comprise generating a detected electromagnetic field by detecting earth's electromagnetic field using an electromagnetic field detector, and generating a detected seismic signal by detecting a seismic wave using a seismic sensor. Processing the one or more detected signals may comprise processing the detected electromagnetic field and the detected seismic signal to determine the at least one property of the subsurface earth formation. The detected electromagnetic field may be generated at a different time than the detected seismic signal. The detected electromagnetic field may be generated at a different location than the detected seismic signal. The at least one fluid may comprise at least one component selected from the group consisting of: an aqueous fluid, a hydrocarbon, a petroleum, carbon dioxide, and any combination thereof.

In an embodiment, a system for identifying hydrocarbons in a subterranean formation comprises one or more sensors coupled to a processor that detect one or more signals generated within a subsurface earth formation due to a seismoelectric response or an electroseismic response in at least one porous subsurface earth formation containing at least one fluid, and an analysis tool, that when executed on the processor, configures the processor to receive the one or more signals from the one or more sensors, and process at least a portion of the one or more signals to determine at least one property of the subsurface earth formation. The one or more sensors may comprise one or more electromagnetic field detectors that measures the earth's electromagnetic field and produces a signal indicative of the detected electromagnetic field, and the analysis tool may configures the processor to receive the signal from the one or more sensors, demodulate a portion of the signal to identify an envelope of the signal, analyze the envelope to determine one or more properties indicative of the presence of the hydrocarbons, and analyze the envelope to determine the depth of the hydrocarbons in the subterranean formation. The one or more sensors may comprise an electromagnetic field detector that measures the earth's electromagnetic field and produces a signal indicative of the detected electromagnetic field, and the analysis tool may receive the signal and determine the at least one property of a subsurface earth formation. The one or more sensors may comprise a seismic sensor that detects a seismic signal related to earth's electromagnetic field and produces a first signal indicative of the detected seismic signal, and the analysis tool may receive the first signal and process the first signal to determine the at least one property of the subsurface earth formation. The one or more sensors may comprise a seismic sensor that detects a seismic signal related to earth's electromagnetic field and produces a first signal indicative of the detected seismic signal and an electromagnetic field detector that measures the earth's electromagnetic field and produces a second signal indicative of the detected electromagnetic field. The analysis tool may receive the first signal and the second signal and determine the at least one property of a subsurface earth formation. The first signal may be generated at a different time than the second signal, and/or the first signal may be generated at a different location than the second signal. The electromagnetic field detector may comprise a plurality of pairs of porous pot electrodes, and each pair of porous pot electrodes may be electrically coupled. The electromagnetic field detector may comprise a plurality of pairs of conductive electrodes, and each pair of conductive electrodes may be electrically coupled. The electromagnetic field detector may comprise a conductive electrode coupled to a porous pot electrode. The electromagnetic field detector may comprise an antenna disposed on or above the surface of the earth. The antenna may comprise at least one antenna selected from the group consisting of: a parallel-plate capacitor antenna comprising two or more parallel conducting plates, a single-plate capacitor antenna comprising one electrode electrically coupled to the earth, a monopole antenna comprising a conducting element, a dipole antenna comprising two conducting elements, a multi-pole antenna comprising a plurality of conducting elements, a directional antenna comprising conducting elements arranged to augment a signal amplitude in a particular direction, a coil antenna comprising one or more coils of wire, a concentric electric dipole, and any combination thereof. The seismic sensor may comprise at least one sensor selected from the group consisting of: a hydrophone, a single-component geophone, a two-component geophone, a three-component geophone, a single-axis accelerometer, a two-axis accelerometer, a three-axis accelerometer, and any combination thereof.

In an embodiment, a system for identifying hydrocarbons in a subterranean formation comprises: a memory comprising a non-transitory computer readable media, a processor, and an analysis tool, that when executed on the processor, configures the processor to: receive one or more signals from one or more sensors, wherein the one or more sensors detect one or more signals generated within a subsurface earth formation due to a seismoelectric response or an electroseismic response in at least one porous subsurface earth formation containing at least one fluid, and process at least a portion of the one or more signals to determine at least one property of the subsurface earth formation. The one or more sensors may comprise one or more electromagnetic field detectors that measure the earth's electromagnetic field and produce a signal indicative of the detected electromagnetic field. The analysis tool may also configure the processor to: receive the signal from the one or more electromagnetic field detectors; demodulate a portion of the signal to identify an envelope of the signal; analyze the envelope to determine one or more properties indicative of the presence of the hydrocarbons; and analyze the envelope to determine the depth of the hydrocarbons in the subterranean formation. The one or more sensors may comprise an electromagnetic field detector that measures the earth's electromagnetic field and produces a signal indicative of the detected electromagnetic field, and the analysis tool may configure the processor to receive the signal and determine the at least one property of a subsurface earth formation. The one or more sensors may comprise a plurality of seismic sensors that detect a seismic signal related to earth's electromagnetic field and produce a first signal indicative of the detected seismic signal. The analysis tool may configure the processor to receive the first signal, and process the first signal to determine the at least one property of the subsurface earth formation. The one or more sensors may comprise a plurality of seismic sensors that detect a seismic signal related to earth's electromagnetic field and produce a first signal indicative of the detected seismic signal and an electromagnetic field detector that measures the earth's electromagnetic field and produces a second signal indicative of the detected electromagnetic field. The analysis tool may also configure the processor to receive the first signal and the second signal and determine the at least one property of a subsurface earth formation. The one or more sensors may comprise a seismic sensor that detects a seismic signal related to earth's electromagnetic field and produces a first signal indicative of the detected seismic signal, and an electromagnetic field detector that measures the earth's electromagnetic field and produces a second signal indicative of the detected electromagnetic field. The analysis tool configures the processor to receive the first signal and the second signal and determines the at least one property of a subsurface earth formation.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION

Figure 1:
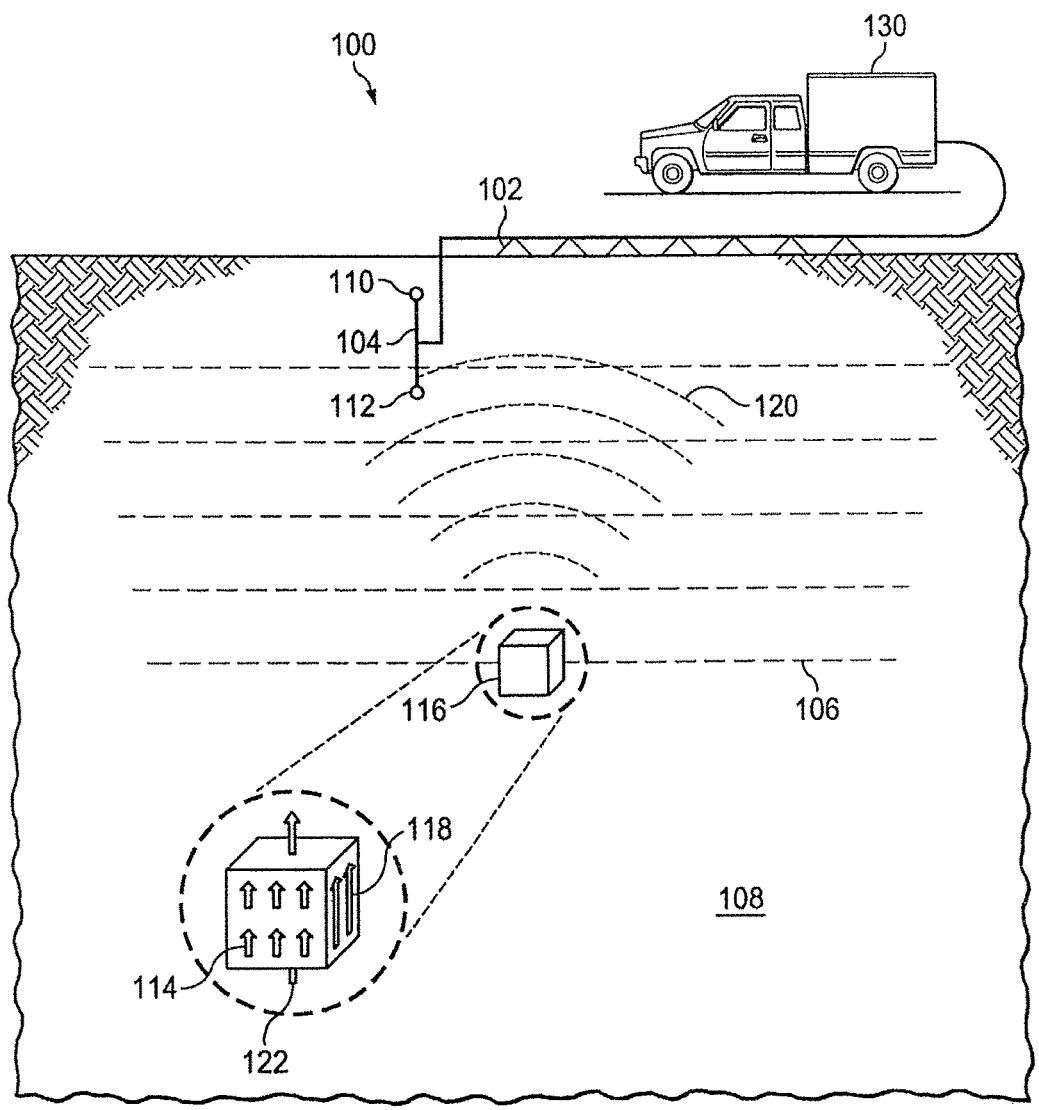
FIG. 1 is a cross-sectional view of a passive surveying system according to an embodiment.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Overview

In controlled-source seismoelectric surveying, generally a seismic source that might be dynamite or a seismic vibrator, creates a seismic wave that propagates into the subsurface where its seismic energy is partially converted to an electric field at a boundary between rock types or at fluid interfaces. The produced electric field then propagates to the surface of the earth where it is detected with electric and/or magnetic field sensors. In controlled-source electroseismic surveying, a source of electrical power is connected to electrodes in contact with the earth's surface. The voltage applied to the electrodes causes electrical current to flow in the subsurface. When that current passes through a rock boundary or a fluid interface, a portion of the electrical energy is converted to seismic energy. The resulting seismic energy propagates to the earth's surface where it is detected with seismic detectors that might be selected from geophones, accelerometers, or hydrophones. Both seismoelectric and electroseismic conversion amplitudes depend on the presence of hydrocarbon fluids so both methods yield information about rock fluid content that is of use in hydrocarbon exploration and production. Both methods also yield high resolution images of rock formations that are typical of seismic surveying. However, the high power sources that are required in these methods limit their usefulness.

The systems and methods disclosed herein utilize naturally occurring electromagnetic fields (e.g., the earth's background electromagnetic field) and their interactions with a subsurface formation through electroseismic and/or seismoelectric conversions to employ passive surveying. Previous surveying methods differ from the methods and systems described herein in several ways. Some novel elements of the present methods and systems include: the creation of seismic waves in a passive measurement where the source is the earth's electromagnetic field; the subsequent conversion of that seismic energy to electromagnetic energy; the detection of the generated seismic energy and/or detection of the further conversion of the seismic energy to electromagnetic energy; identifying the generated seismic energy by detecting the characteristic time lags or frequencies associated with the seismic travel time using a frequency-selective method; and determining the depth of origin of the seismic signal from said frequency selective method.

As described in more detail herein, passive surveying may involve detecting a seismic and/or electromagnetic signal generated in a subterranean formation, and processing the resulting signal to determine the presence of one or more fluids (e.g., a hydrocarbon, an aqueous fluid such as potable water, fresh water, brine, etc.) in the subterranean formation. The one or more signals may be detected using a variety of sensors and systems as described below. The detection may involve 1) detecting an electromagnetic signal alone, 2) detecting a seismic signal alone, 3) detecting both an electromagnetic signal and a seismic signal at different times and/or locations, and/or 4) detecting both an electromagnetic signal and a seismic signal at overlapping time intervals to allow for cross correlation of the two detected signals. The detected signals may then be processed using a variety of techniques to determine if one or more fluids are present in a subterranean formation, and optionally one or more additional properties of the one or more fluids in the subterranean formation (e.g., an existence of a subsurface earth formation containing at least one fluid, a depth of the subsurface formation, a porosity, a fluid permeability, a composition of at least one fluid within the subsurface earth formation, a spatial extent of the subsurface earth formation, an orientation of the boundaries of the subsurface earth formation, a resistivity, and any combination thereof).

Each of these surveying techniques described herein can utilize a passive source to provide the energy for generating the electroseismic and/or seismoelectric conversions. As used herein, a "passive source" includes any source that is not being actively used to generate a seismic and/or electromagnetic signal for use with surveying a subterranean formation. The passive source generally comprises a natural source of electromagnetic energy such as the earth's natural electromagnetic field, though other man-made source of electromagnetic radiation such as electrical power lines may also be included. While certain man-made sources may induce an electromagnetic field, they are distinguishable from an "active source" (e.g., a seismic generator, explosives, electric field generators, etc.) in that they are generally stationary, not used for surveying a subterranean formation, and/or not associated with the detectors being used to detect the seismic and/or electromagnetic signal. As used herein, "passive surveying," "passive electroseismic surveying," and "passive seismoelectric surveying" may then utilize a passive source (e.g., the earth's natural electromagnetic field as the source field). The passive surveying can then make use of the generation of secondary seismic waves through coupling of the electromagnetic source field to various rock formations (electroseismic effect) and subsequent generations of secondary electromagnetic fields through coupling of the generated seismic waves with various rock formations (seismoelectric effect) to probe those formations and the fluids they contain. Generation of tertiary and higher order electromagnetic fields and seismic waves can also result from additional couplings.

Having generally described the systems and methods for passive surveying, the detection systems, signals, and processing techniques will now be described in more detail.

Electroseismic and Seismoelectric Conversions

The systems and methods disclosed herein advantageously utilize signals that have heretofore been neglected and/or not detected. Magnetotelluric surveying generally involves the use of the natural electromagnetic fields that originate in the earth's atmosphere. In magnetotelluric surveying, naturally-occurring electromagnetic fields propagate into the subsurface where they encounter rock formations of differing electrical conductivity. When the electromagnetic fields contact a formation of low conductivity, such as is typical of hydrocarbon reservoirs, the electromagnetic field measured at the surface of the earth changes. Spatially-dependent electromagnetic fields measured on the earth's surface can be used to indicate the presence of low-conductivity formations that might contain hydrocarbons. Magnetotelluric surveying has several limitations. Only low-frequency, long-wavelength electromagnetic stimulation may reach prospective reservoirs because the high-frequency electromagnetic fields are rapidly attenuated by the conducting earth. Long-wavelength electromagnetic waves limit the spatial resolution of magnetotellurics making reservoir delineation difficult. Additionally, magnetotelluric surveying only provides information about formation electrical conductivity and does not yield data revealing information about porosity, permeability, or reservoir structure.

In contrast to the magnetotelluric surveying method, the passive electroseismic surveying method makes explicit use of the generation of seismic waves through the electroseismic effect, and the subsequent generation of secondary electromagnetic fields and seismic waves through combinations of the electroseismic and seismoelectric effects to determine one or more properties of a subsurface earth formation of interest that cannot be learned from the magnetotelluric surveying method. In addition, the passive electroseismic surveying method addresses the spatial resolution issue of the magnetotellurics surveying method. Similarly, the seismic signals generated due to the interactions between the electromagnetic field and the subterranean formation may be used alone or in combination with the electromagnetic field measurements to determine one or more properties of the subsurface earth formation.

An understanding of the electroseismic and seismoelectric effects useful in passive surveying begins with an understanding of the electromagnetic field within the earth, at least a portion of which may comprise the naturally occurring background electromagnetic field of the earth. The earth's naturally occurring electromagnetic field comprises a broad spectrum of frequencies, from sub-hertz frequencies to tens of thousands of hertz frequencies, having a broad coverage over the surface of the earth. This broad spectrum allows for a broad range of penetration depths from tens of meters to tens of kilometers. The various frequencies in the earth may result from various natural events such as electromagnetic fluctuations in the ionosphere and/or naturally occurring electromagnetic discharges in the atmosphere (e.g., lightning). Further information concerning the earth's background electromagnetic field including the sources of the earth's electromagnetic field and the power and frequency spectrum associated with the earth's electromagnetic field can be found in PRACTICAL MAGNETOTELLURICS by Simpson et al., published by Cambridge University Press (2005), which is incorporated by reference herein in its entirety. Other sources of electromagnetic radiation may include cultural sources of electromagnetic radiation that may contain electromagnetic radiation with sufficiently low frequencies to reach and interact with a subterranean formation. Power transmission lines are one example of a cultural source of electromagnetic radiation that can interact with a subterranean formation.

The earth's electromagnetic field propagates as an electromagnetic modulation that unlike an acoustic wave travels at the speed of an electromagnetic wave in the subsurface, which is less than the speed of an electromagnetic wave in a vacuum or air. The electromagnetic wave may typically travel in the subsurface of the earth at a speed of about one hundred times greater than the speed of propagation of an acoustic wave in the seismic frequency band of about 1-100 Hz. Due to the relative speed of the electromagnetic wave when compared to the seismic signal, the travel time of the electromagnetic wave into the subsurface earth formation is generally neglected for purpose of processing the detected electromagnetic field and/or the detected seismic signal in the methods disclosed herein.

As shown in FIG. 1, the earth's electromagnetic field 106 may encounter fluid dipoles 114 associated with at least one fluid in a porous earth formation layer. A portion 116 of this formation layer is depicted in an exploded view in FIG. 1. In general, the earth's electromagnetic field 106 causes a change in the polarization of the dipoles 114 in the pore fluid, which in turn causes the fluid to flow or to generate a pressure pulse 118. The flowing fluid (or pulse) produces a time varying pressure gradient, which is then propagated into the earth formation (or rock). The pressure gradient then propagates through the subsurface to the surface as a seismic wave 120. The term "seismic wave" is used herein to mean any mechanical wave that propagates in the subsurface of the earth and includes, but is not limited to, P- and S-waves.

Figure 2:
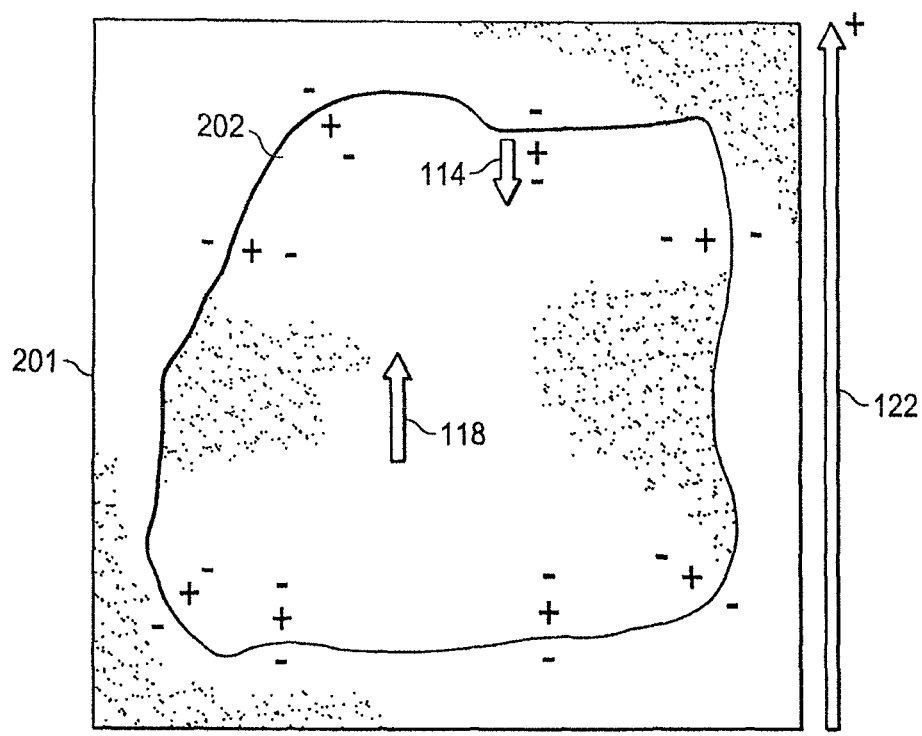
FIG. 2 is a cross-sectional view of a porous subsurface earth formation containing at least one fluid according to an embodiment.

In order to more clearly illustrate the basis for the passive electroseismic surveying system and method disclosed herein, the conversion of the earth's electromagnetic field to seismic energy in at least one porous subsurface earth formation containing at least one fluid will be described in more detail with reference to FIG. 1 and FIG. 2. The formations of interest may generally be porous, as is more clearly illustrated in FIG. 2. A porous formation generally comprises a solid rock portion 201 interspersed throughout with channel-like porous spaces 202. The term "porous" is used herein to mean some earth substance containing non-earthen volume or pore space, and includes, but is not limited to, consolidated, poorly consolidated, or unconsolidated earthen materials. Where a polarizable fluid (e.g., aqueous or other polarizable fluid) exists, an electrochemical interaction may form between the polarizable fluid and the solid rock portions 201. The polarizable fluid may include, but is not limited to, an aqueous fluid, hydrocarbons, petroleum, or any combinations thereof. The electrochemical interaction is represented by the "+" symbol in the fluid portion and the "−" symbol in the rock portion of the formation. In general, the rock portion 201 may have an existing natural surface charge over at least a portion of the rock surface. This electrochemical interaction may result in a local pore fluid dipole that causes a local background electromagnetic field. It may be noted that, overall, there is no net dipole field in unperturbed rock and its associated fluids. The sign of the background electromagnetic field or field polarity direction depends on the surface charge on the solid and the way the fluid screens out that charge. In clays, the charge is typically as shown in FIG. 2. However, in other materials (e.g., carbonates), the charge could be reversed (i.e., with the "+" charge on the solid).

When the earth's electromagnetic field 122 interacts with the formation, as illustrated for a region of the formation, the background electromagnetic field that acts upon the established fluid dipole 114 or the charges associated with that dipole changes, causing fluid movement. This is illustrated by the earth's electromagnetic field 106 shown in FIG. 1. Although the earth's electromagnetic field 106 may be a time varying field, the earth's electromagnetic field 106 is illustrated as a static electric field 122 in FIG. 2 for ease of discussion. This electric field 122 has the effect of modifying the electrochemical bonds or moving the charges (depicted by the small arrows above and below the "charges" in the fluid in FIG. 2), thereby effectively creating a pressure pulse where the interactions are distorted or broken. This electric field 122 exists throughout the fluid area and primarily affects the charges of the dipoles 114 which are at or near the fluid surface or interface of the rock. Thus, a pore fluid pressure pulse is generated from the resulting charge movement and this resulting pressure pulse is transmitted to the solid rock portions 201 of the formation. In turn the pressure pulse is transmitted through the rock portions 201 as a seismic wave 120. This effect may be referred to as the electroseismic effect or the electrokinetic effect. Thus, an appropriate subsurface formation layer may be a subsurface source of seismic energy. A more detailed description of the electroseismic effect and the electrokinetic effect can be found in U.S. Pat. No. 5,877,995 entitled "Geophysical Prospecting" and issued to Thompson et al., and which is incorporated herein by reference in its entirety. Additional information on seismoelectric surveying may be found in U.S. Pat. No. 4,904,942 entitled "Electroseismic Prospecting by Detection of an Electromagnetic Signal Produced by Dipolar Movement" and issued to Thompson, which is incorporated herein by reference in its entirety.

Seismoelectric and electroseismic effects are also known to generate harmonic responses where the coupling of electromagnetic and seismic modulations creates new modulations at frequencies that are harmonics of the generating seismic and electromagnetic signals. Nonlinear electroseismic conversions may produce signals useful during processing. In an embodiment, nonlinear, harmonic signals having frequency components at higher frequency harmonics of the source's fundamental frequency (i.e., those frequencies present in the earth's background electromagnetic field) may be detected as a result of distortions of the background electromagnetic field interacting with the subsurface earth formation containing at least one fluid. The harmonic signals may be processed alone or in conjunction with the fundamental frequencies of the detected seismic signal and/or the detected electromagnetic field to determine one or more properties of the subsurface earth formation. In an embodiment, the harmonic signals may be present, detected, and/or isolated in both the detected electromagnetic field and the detected seismic signal. A detailed description of the nonlinear, harmonic generation of electroseismic and seismoelectric effects can be found in U.S. Patent Application Publication No. 2002/0181326 A1 entitled "Nonlinear Electroseismic Exploration" and is issued to Hornbostel et al., and which is incorporated herein by reference in its entirety.

A portion of this seismic energy generated by the conversion of the earth's electromagnetic field to seismic energy may travel upwardly from the formation (seismic wave 120) towards the surface, where it may be detected by one or more seismic sensors, which may be arranged in an array. When conventional seismic reflection boundaries exist between the formation and surface, seismic reflections may occur and may be detected by the detector array, also in a conventional fashion. The detection of the resulting subsurface-generated seismic wave may occur whenever there is fluid in a porous formation, including formations of low permeability.

Figure 3:
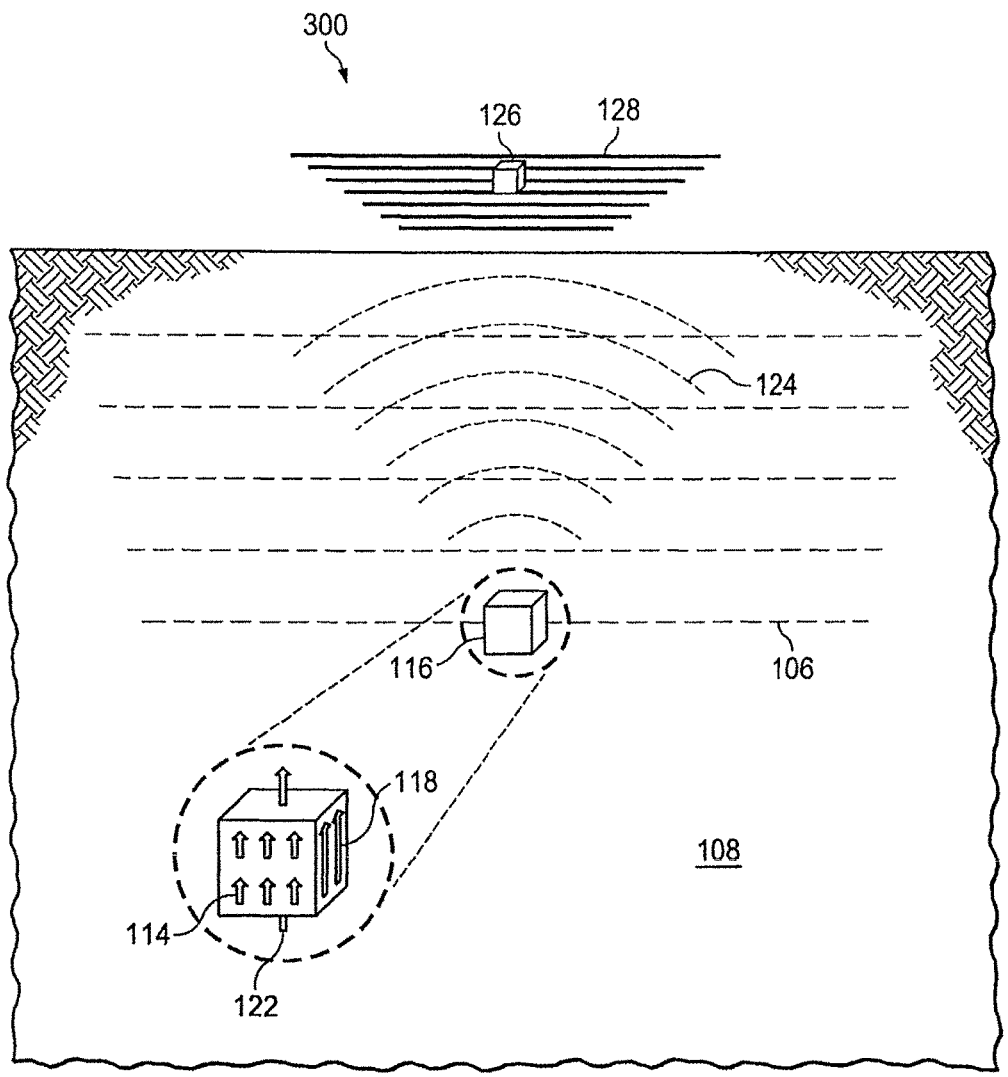
FIG. 3 is a cross-sectional view of a passive surveying system according to an embodiment.

With reference to FIGS. 2 and 3, a seismoelectric effect may also be observed based on the same principles as the electroseismic effect. Rather than an electromagnetic wave interacting with the fluid in a pore to produce a seismic wave, a seismic wave that originated due to the electroseismic effect, may interact with the fluid in a pore 202 near the surface of the earth to generate a modification of the charges present within the pore 202. This pore 202 could be filled with fresh water as is present in the water table. The resulting modification of the charges may generate an alternating current field, which may lead to the emission of an electromagnetic signal 124. This electromagnetic signal may be directly detected by one or more electromagnetic sensors, which may be arranged in an array. In addition, the resulting time-variant electromagnetic field resulting from the seismoelectric effect may be referred to as a modulating signal since it may modulate an electromagnetic field within the earth (e.g., the near surface of the earth). As used herein, the term modulation can refer to frequency modulation, phase modulation, and/or amplitude modulation. The seismic wave that originated due to the electroseismic effect may travel to the near surface of the earth where it directly modulates an electromagnetic field within the earth (e.g. the near surface of the earth). This modulation is believed to occur because the passage of the seismic wave causes a change in the electrical impedance that results in a time-dependent variation of the electromagnetic field and/or the passage of the seismic wave interacts with a fluid or rock boundary to produce an electromagnetic field. The modulated signal may then be detectable in the near surface or just above the surface of the earth. A portion of the electromagnetic field generated by the conversion of the seismic waves to electromagnetic energy and/or the modulating signal generated by the conversion of the seismic waves to electromagnetic energy or the seismic wave generated by the electroseismic effect may be detected by one or more sensors. The detection of the resulting subsurface generated electromagnetic signal, the modulating signal, and/or the seismic signal may occur whenever there is fluid in a porous formation, including formations of low permeability. The indication of a fluid in a porous formation may be used to locate or potentially locate a hydrocarbon in a subterranean formation and/or locate or potentially locate an aqueous fluid (e.g., fresh water, potable water, brine, etc.) in the earth (e.g., detecting water or the water level in a subsurface water table).

The earth's electromagnetic field may propagate into the subsurface of the earth as an approximate plane wave, including over a subsurface formation of interest. As used herein, a "plane wave" refers to a wave with a substantially uniform amplitude on a plane normal to the velocity vector. The velocity vector may be generally vertical and may not necessarily be perpendicular to the surface of the earth above the subsurface formation of interest. For example, the velocity vector would be approximately vertical rather than inclined from the vertical axis where the surface of the earth above a subsurface formation of interest was inclined to the vertical (e.g., on a hill or slope). As a result of the electroseismic effect and/or seismoelectric effect, the seismic and/or electromagnetic waves resulting from the earth's electromagnetic field may be generated somewhat uniformly across the subsurface formation containing at least one fluid, resulting in a seismic and/or electromagnetic wave that is approximately a plane wave traveling back to the surface of the earth. The discovery of this result may be useful in processing the various detected signals, as described in more detail below.

Passive Electromagnetic Field Detection Systems

Various sensors and detection mechanisms may be used to detect the electromagnetic field within and/or above the surface of the earth. Referring now to FIG. 3, a system 300 of geophysical surveying is illustrated in a simplified manner for the purpose of clarity. In system 300, a sensor 126 for detecting an electromagnetic field 124 is disposed in contact with or near the surface of the earth 108. The electromagnetic field 124 may be emitted above the surface of the earth 108 as a detectable electromagnetic field 128. It can be noted that the electromagnetic field comprises both an electric field and a magnetic field, and the reference to a sensor 126 for detecting the electromagnetic field refers to a device for detecting an electromagnetic field, an electric portion of the electromagnetic field, and/or a magnetic portion of the electromagnetic field. A magnetic field detector may refer to a device for detecting a magnetic field. In an embodiment, a magnetic field detector may also be present at each location at which an electromagnetic field detector is placed, though its presence may not be specifically mentioned throughout the remainder of the description for the purpose of clarity. The magnetic field may be detected and processed using similar processing to that described herein for the detected electromagnetic field.

The sensor 126 may be used to detect a signal of interest 124 within the earth 108 while being disposed above the surface of the earth 108. The signal of interest may include the vertical component of the electromagnetic field and/or the modulated, vertical component of the electric field 124 in the near surface of the earth 108 resulting ultimately from the coupling of an electromagnetic field 106 with a formation containing a fluid of interest. In an embodiment, the signal of interest may comprise and/or be indicative of a time-varying electromagnetic field within and/or above the surface of the earth 108. The electromagnetic signal 106 interacting with the formation may generally include the earth's background electromagnetic field, though other sources of electromagnetic radiation may result in interactions with the formation of interest. In order to measure the signal of interest, the sensor 126 may measure the vertical portion of an electric field in the near surface of the earth. As a result, the sensor 126 may comprise any type of sensor capable of measuring the vertical electric field 128 in the near surface of the earth. Additional signals may also be measured including the background vertical portion of the earth's electromagnetic signal, the background cultural source electromagnetic radiation, one or more components of the magnetic field, one or more horizontal components of the electromagnetic signal and/or one or more components of the seismic amplitude.

The sensor 126 may be placed at or on the surface of the earth 108 or at any distance above the surface of the earth (e.g., up to about one hundred feet) so long as the sensor 126 is within a detectable range of the vertical electric field in the earth. In an embodiment, the sensor 126 may be placed up to about ten feet from the surface of the earth. The sensor 126 may be maintained in one location during the detection of a signal and subsequently moved to provide another detection period. Alternatively, a plurality of sensors 126 may be used to provide a plurality of simultaneous measurements at multiple locations. For example, a plurality of sensors may be disposed in an array to allow for a plurality of measurements at multiple locations.

Still further, the sensor 126 may be moved during a measurement to detect the signal at multiple locations. Moving the sensor 126 may result in a degradation of the spatial resolution of the resulting analysis, as described below, but may still provide information that can be useful as a screening or first look at an area of interest. In an embodiment, the sensor 126 may be disposed in a moving vehicle. Suitable vehicles may include, but are not limited to, an airplane, an automobile, and/or a boat in shallow water (e.g., a river). A recording apparatus (e.g., element 304 of FIG. 4) may be used to record the signal detected by the sensor 126, as described in more detail herein. In an embodiment, the sensor 126 may be used to continuously detect the signal of interest (e.g., while the sensor is moved), and the detected signal may be recorded. Desired portions of the recorded signal may then be used in the systems and methods described below.

Figure 4:
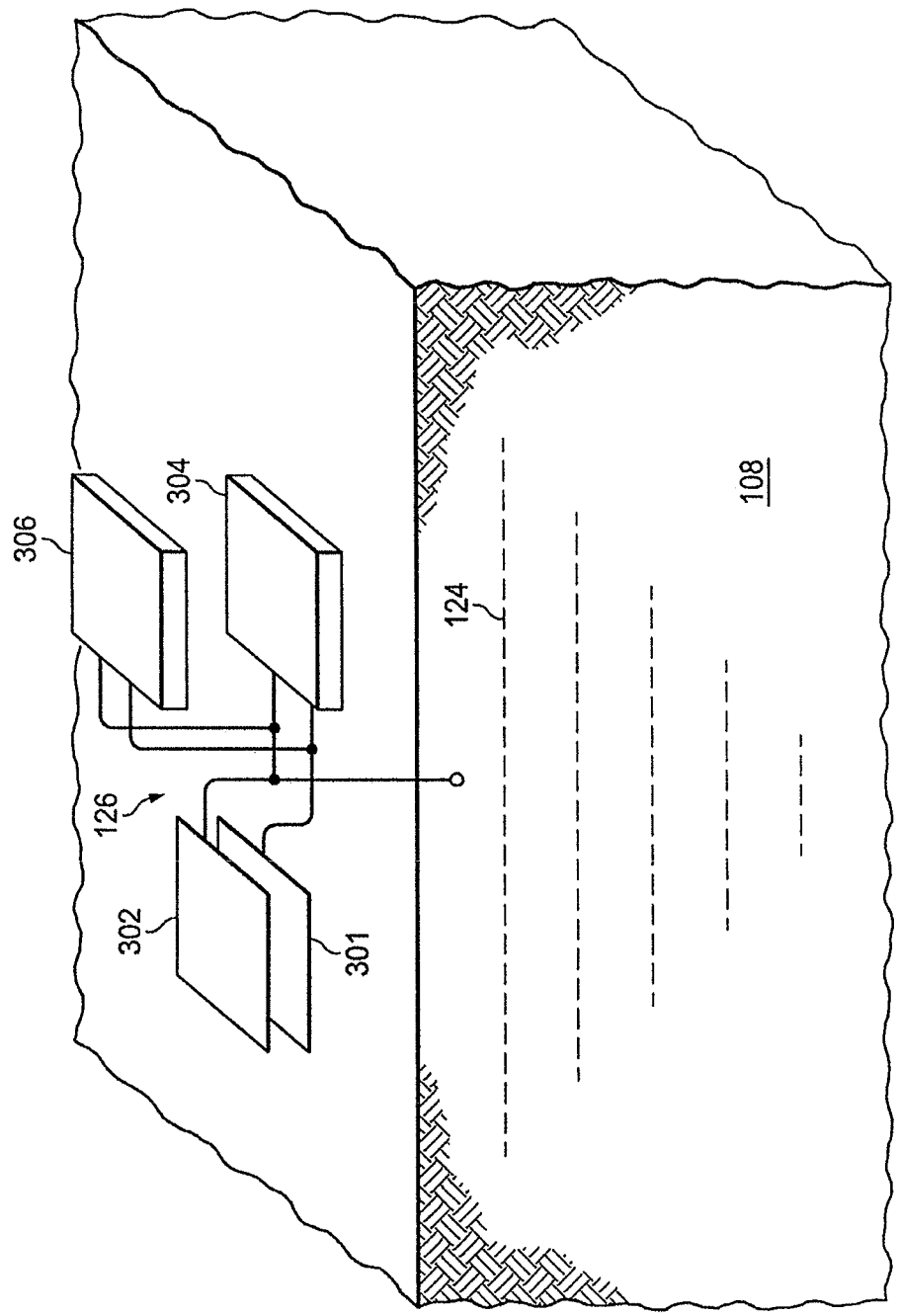
FIG. 4 is a perspective view of a passive surveying system according to an embodiment.

In an embodiment as shown in FIG. 4, the sensor 126 may comprise one or more capacitive plates 301, 302 arranged parallel to the surface of the earth 108. The sensor 126 may be contained in suitable housing, and may comprise a capacitor consisting of two parallel conductive plates 301, 302. The conductive plates 301, 302 may be oriented generally parallel to the surface of the earth 108 to measure the vertical electric field. The conductive plates 301, 302 are preferably made from a conductive metal such as copper, aluminum, or stainless steel, and can be about several square inches in area to about several square feet in area. The time varying, vertical electric field may produce a charge on the area of one of the conductive plates 301. The other plate of the conductive plates 302 may be grounded to produce a capacitive charge for the sensor 126. In an embodiment, a resistor may be coupled in series with the charged conductive plate 301 and a recording apparatus 304 to discharge the charged plate 301 and allow a time varying field to be measured. The parallel plate design may detect only the vertical electric field due to the capacitive nature of the sensor 126, which may not detect the horizontal magnetic component of the electromagnetic signal. While two plates 301, 302 are shown, the sensor 126 may include a single plate 301 appropriately grounded through one or more resistive devices and coupled to a recording apparatus 304.

In an embodiment, the sensor 126 as shown in FIG. 3 may comprise one or more antennas disposed on or above the surface of the earth. Suitable antennas may include, but are not limited to, a parallel-plate capacitor antenna comprising two or more parallel conducting plates, a single-plate capacitor antenna comprising one electrode electrically coupled to the earth, a monopole antenna comprising a conducting element, a dipole antenna comprising two conducting elements, a multi-pole antenna comprising a plurality of conducting elements, a directional antenna comprising conducting elements arranged to augment a signal amplitude in a particular direction, and a coil antenna comprising one or more coils of wire, and/or any combination thereof.

In an embodiment, the antenna may comprise a concentric electric dipole (CED). The CED comprises two electrodes in a concentric configuration. For example, the electrodes may comprise generally circular dipoles with an inner circular electrode disposed concentrically within an outer circular electrode. The electrodes may generally be aligned in a plane that is parallel with the plane of the surface of the earth. The CED may then preferentially detect the vertical portion of the earth's electromagnetic field that is substantially perpendicular to the plane of the CED, where the vertical portion of the earth's electromagnetic field may create a detectable potential difference between the two electrodes.

Figure 5:
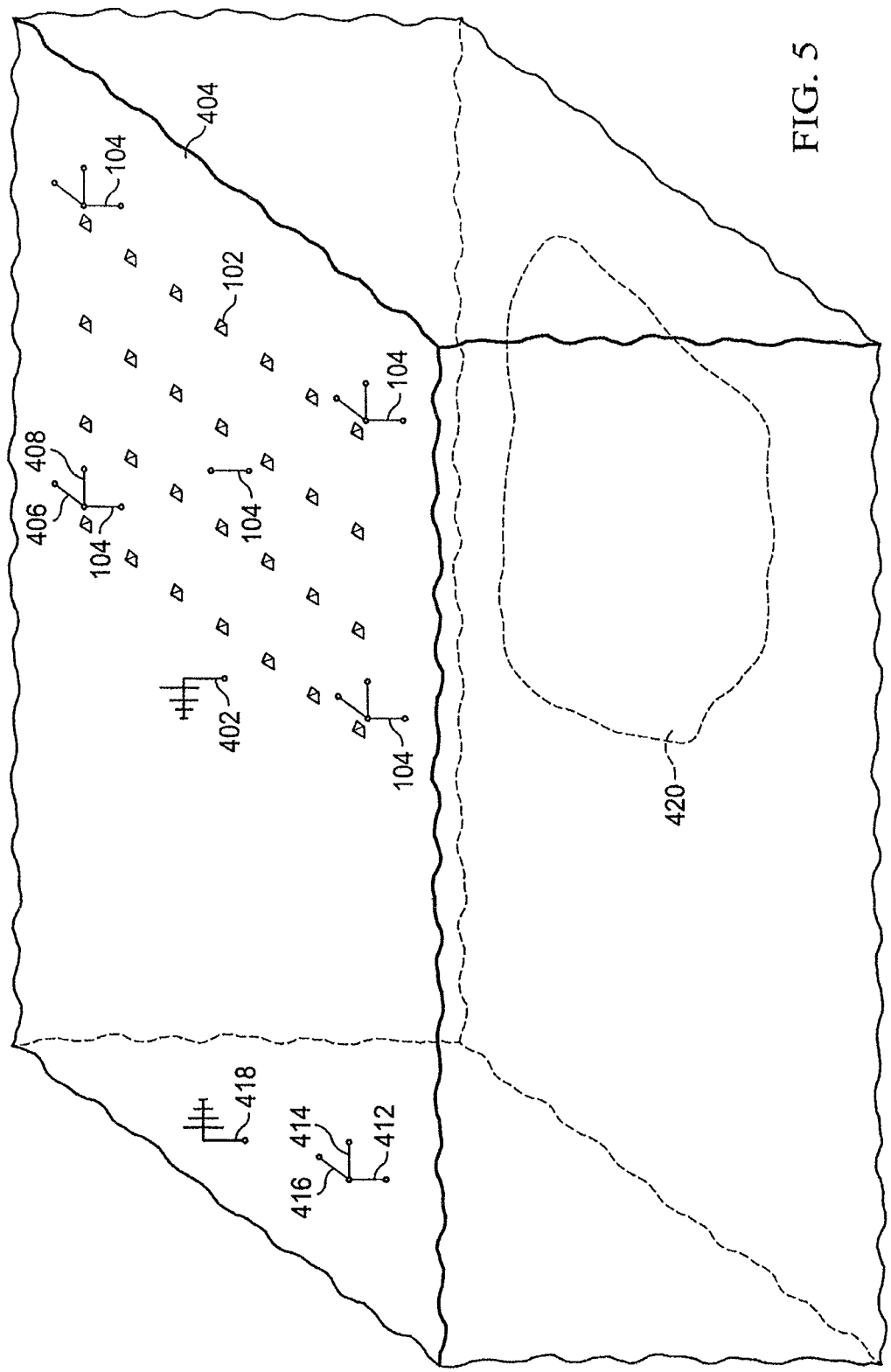
FIG. 5 is a perspective view of a passive surveying system according to embodiment.

In an embodiment illustrated in FIG. 1, an electromagnetic field detector 104 may be disposed near or within the surface of the earth 108 to measure the earth's naturally occurring electromagnetic field 106 within the earth 108. The electromagnetic field detector 104 may be used to detect the earth's naturally occurring electromagnetic field 106 within the earth 108, or any component of the naturally occurring electromagnetic field 106. The electromagnetic field detector 104 may be configured to measure the vertical component of the earth's electromagnetic field within the earth. In an embodiment, one or more electromagnetic field detectors may be configured to measure a horizontal component of the earth's electromagnetic field in one or two dimensions. For example, FIG. 5 illustrates additional electrode pairs 406, 408 disposed in a horizontal alignment to measure one or more horizontal components of the earth's electromagnetic field. In an embodiment, a single electromagnetic field detector may be configured to measure a plurality of components of the electromagnetic field (e.g., a two-axis electromagnetic field detector, or a three-axis electromagnetic field detector).

Returning to FIG. 1, the electromagnetic field detector 104 disposed within the earth may be above or below the water table. In an embodiment, the electromagnetic field detector 104 may be disposed at any depth in the earth above the formation of interest. In an embodiment, the electromagnetic field detector 104 may be disposed at any depth in the earth within and/or below the formation of interest. Combinations of these depths may also be used, for example with electromagnetic field detectors above, within, and/or below the formation of interest.

In an embodiment, the electromagnetic field detector 104 may comprise a pair of electrodes 110, 112 in contact with the earth and disposed within the earth. For example, a first electrode 112 may be disposed in a hole drilled into the earth ranging from about 10 feet to about 15 feet. A second electrode 110 may be disposed within about 1 foot to about 3 feet of the surface of the earth, and the pair of electrodes 110, 112 may be electrically coupled. In an embodiment, the pair of electrodes 110, 112 may be disposed within the earth at varying depths as needed to form an electrical coupling with the earth.

In an embodiment, the electrodes may take the form of porous pot electrodes, which may use an appropriate salt and/or aqueous solution to form an electrical coupling with the earth. Suitable salts useful with the electrodes 110, 112 may include, but are not limited to, copper sulfate, silver chloride, cadmium chloride, mercury chloride, lead chloride, and any combination thereof. In an embodiment, the electrodes may include, but are not limited to, conductive electrodes such as rods that are driven into the ground and/or sheets of metal, mesh sheets, and/or wires buried in trenches or in shallow pits. The conductive electrodes may comprise a variety of conductive materials including, but not limited to, copper, stainless steel, aluminum, gold, galvanized metal, iron, lead, brass, graphite, steel, alloys thereof, and combinations thereof. In an embodiment, the electrodes may comprise a conductive electrode in contact with the earth and electrically coupled to a porous pot electrode.

Figure 6:
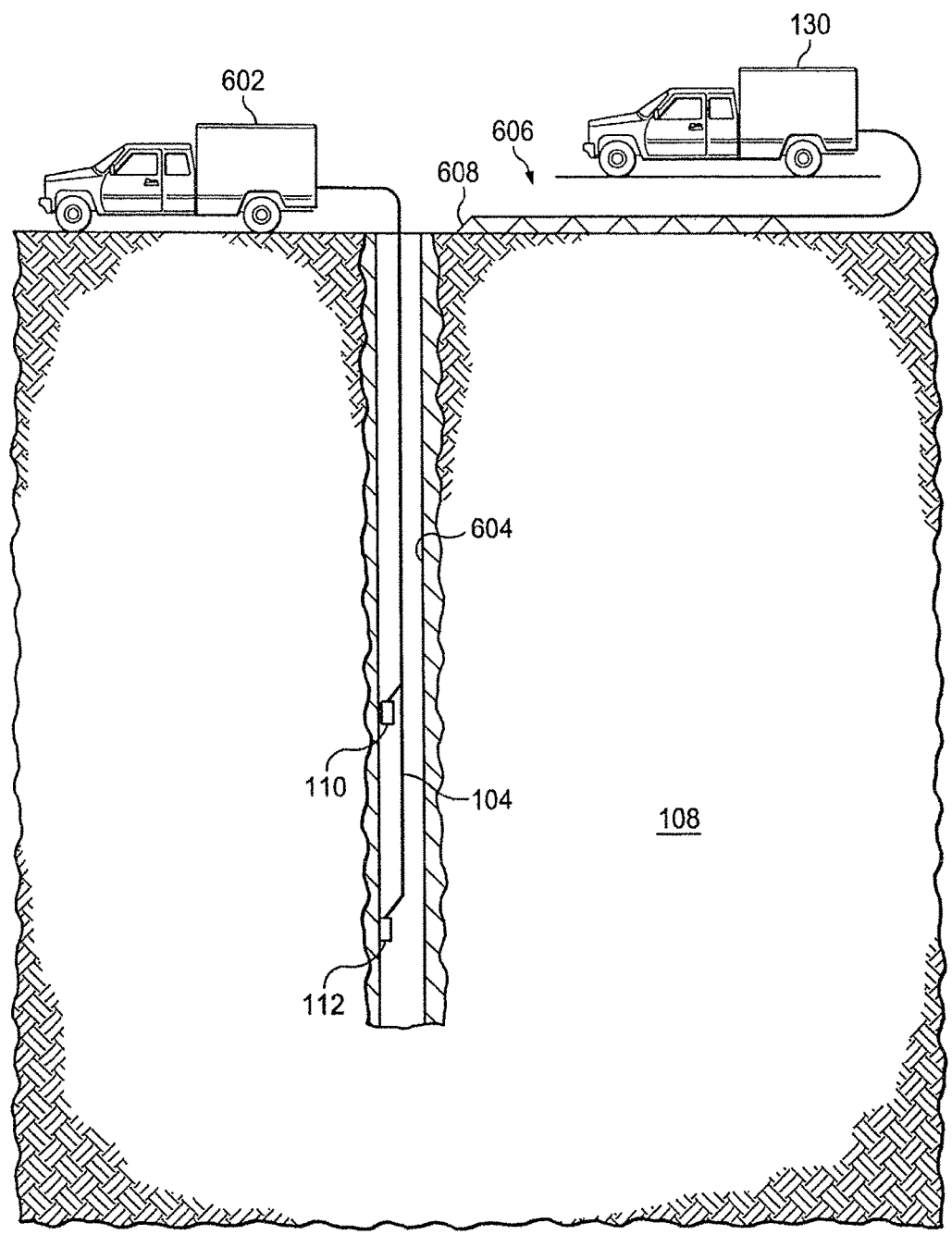
FIG. 6 is another cross-sectional view of a passive surveying system according to an embodiment.

In an embodiment as shown in FIG. 5, a plurality of suitable electromagnetic field detectors 104 may be employed. The electromagnetic field detectors 104 may be disposed in a pattern or array. For example, an array of suitable electromagnetic field detectors may comprise from about 2 to about 1,000, or from about 10 to about 100 electromagnetic field detectors. In an embodiment as shown in FIG. 6, one or more of the electromagnetic field detectors 104 may be disposed within a wellbore 604. The wellbore 604 may be disposed below an array 606 of sensors 608 (e.g., electromagnetic field detectors and/or seismic sensors as described in more detail below) or outside an array 606 of sensors 608. In an embodiment, a plurality of electromagnetic field detectors 104 may be used with one or more of the electromagnetic field detectors 104 disposed in a wellbore 604, and one or more of the electromagnetic field detectors disposed above and/or within the earth outside the wellbore (e.g., using porous pot and/or conductive electrodes).

As shown in FIG. 5, suitable additional electric and/or magnetic field detectors 402 may be located near one or more detectors used for passive surveying. In an embodiment, the electric and/or magnetic field detectors 402 may be located within about 10 yards, alternatively within about 100 yards, or alternatively within about 500 yards of one or more of the detectors. In an embodiment, additional electromagnetic field detectors 412, 414, 416 configured to measure the electromagnetic field within the earth and/or electric and magnetic field detectors 418 configured to measure the electromagnetic field above the surface of the earth may be located at a distance away from the seismic sensors 102 to identify the electric and/or magnetic fields that occur over large distances. In an embodiment, the additional detectors 412, 414, 416, 418 may be located more than about 500 yards, alternatively more than about one half mile, alternatively more than about one mile, or alternatively more than about 5 miles from the one or more detectors.

One or more recording devices may record the resulting electromagnetic field produced by the one or more sensors and/or detectors disposed above and/or within the earth. A suitable recording device may include digital and/or analog recording devices and/or non-transitory media that may, in an embodiment, be contained in a weather resistant enclosure capable of recording data over days to weeks without human intervention. The recording apparatus may be contained in a recording vehicle, a housing structure, or a weather resistant enclosure located proximate the sensor. In an embodiment shown in FIG. 1, a suitable recording device may be contained in a dedicated recording vehicle 130 for the electromagnetic field detector 104. In an embodiment shown in FIG. 4, the recording device 304 may be coupled to the sensor 126, and the recording apparatus 304 may be internal or external to the sensor 126 housing. In an embodiment shown in FIG. 6, the recording device 602 may be one of a plurality of recording devices 130, 602 used to record one or more electric and/or seismic signals.

The signals may be recorded over a length of time sufficient to allow for analysis of the signals including a sufficient time to allow for averaging and signal integration to ensure an adequate signal-to-noise ratio (SNR). In an embodiment, the signal may be recorded for at least about 2 times, at least about 3 times, at least about 4 times, at least about 5, times, at least about 10 times, at least about 20 times, at least about 50 times, at least about 100 times, or at least about 1,000 times the period of the signal of interest. In an embodiment, the signal may be recorded at least about 0.1 seconds, at least about 5 seconds, at least about 20 seconds, or at least about 30 seconds. Longer recording times may allow for increasing reliability, but at the same time, the amount of data that must be processed is increased. In general, a recording time of from about 5 to about 6,000 seconds, about 200 to about 1,200 seconds, or alternatively about 300 to about 900 seconds will be sufficient to analyze the data without generating excessive data to be processed. Longer recording times may be used, for example, when the sensor is moved during recording as when disposed in an airplane or automobile. The signal may be converted into a digital signal using an analog-to-digital converter with an appropriate sampling rate. The sampling rate stored by the recording apparatus may vary, though some consideration of the frequencies of interest may determine the minimum sampling rate.

The signals from the sensor/detector and/or the signals stored in the recording apparatus may be processed in real time. As used herein, "real time" refers to a nearly contemporaneous processing of the detected data though some processing delays may be present (e.g., due to latency in the sensors and processing equipment). Thus, real time may refer to the handling and/or processing of a signal within about five minutes of the generation of the corresponding signal. Alternatively, the storage of the signal in the recording apparatus may allow for subsequent processing and interpretation. As described above, the signal may be processed using an analog-to-digital converter to allow the signal to be processed by one or more digital signal processing components, such as a digital computer as described in more detail herein. For example, a signal processor 306 as illustrated in FIG. 4 may be used to process the signal. In general, the sampling rate for the analog-to-digital conversion should be at least twice the highest frequency of interest in order to properly represent the recorded waveform. Higher sampling rates are also possible and may include about 3 times, about 4 times, or about 5 times the highest frequency of interest.

Passive Seismic Signal Detection Systems

Figure 7:
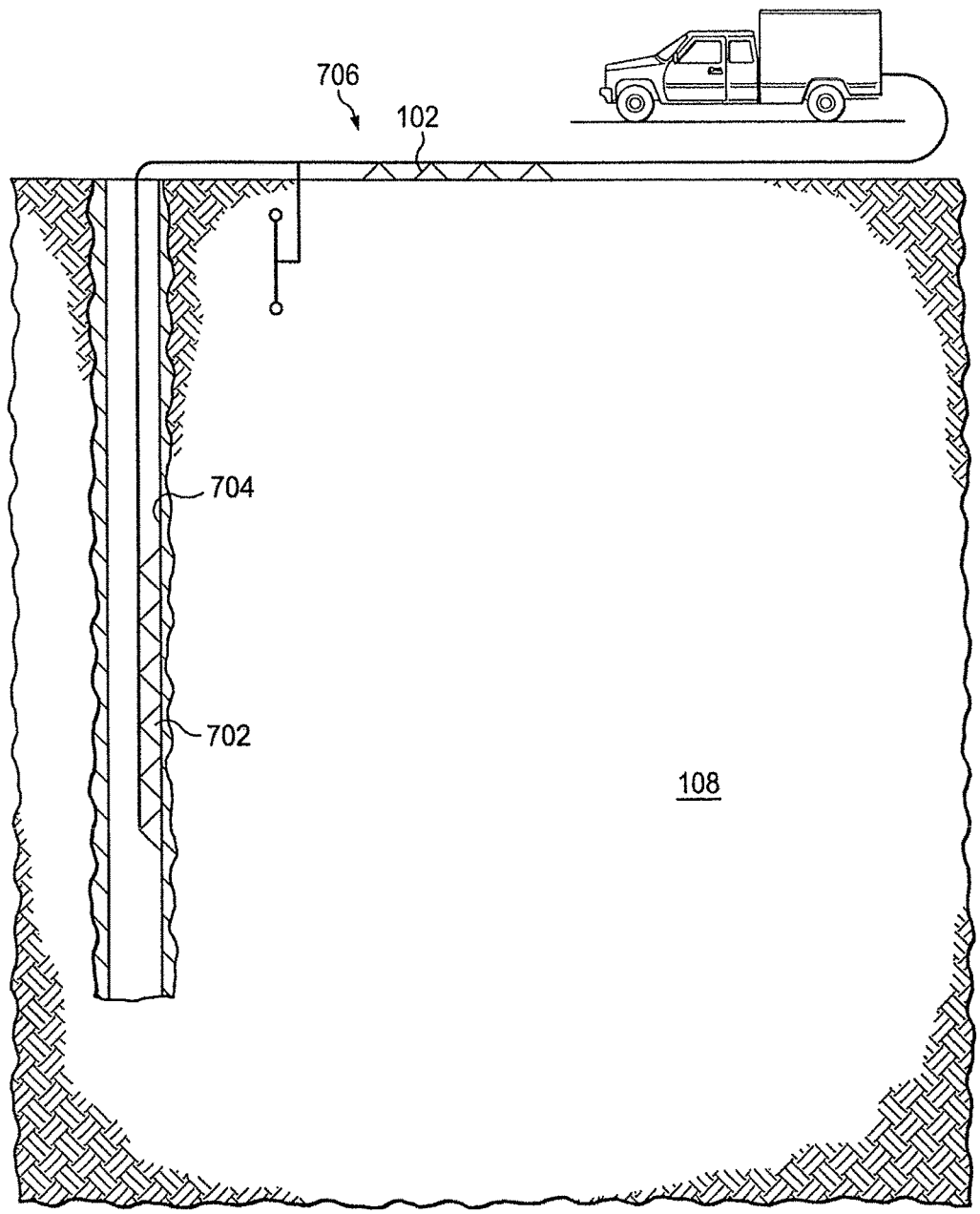
FIG. 7 is still another cross-sectional view of a passive surveying system according to an embodiment.

As shown in FIG. 1, a seismic wave 120 may be detected by one or more appropriate seismic sensors 102 positioned on and/or in the surface of the earth 108. In an embodiment, a plurality of seismic sensors 102 may be used to detect the seismic wave 120 at multiple locations. As shown in FIG. 7, one or more seismic sensors 702 may be disposed within a wellbore 704 (e.g., an existing wellbore, a new wellbore, a water well, a hydrocarbon well, etc.) for detecting a seismic wave within the subsurface earth formation. The wellbore may extend through and/or below the formation of interest to allow for detection of the seismic wave at varying depths in the earth. In an embodiment, the wellbore 704 may be disposed below the array 706 of seismic sensors 102 and/or electric sensors/detectors or outside the array 706 of sensors. In an embodiment, one or more of the electromagnetic field detectors 104 shown in FIG. 6 may be included in the same wellbore 704 as the one or more seismic sensors 702 as shown in FIG. 7 (e.g., the embodiments of FIG. 6 and FIG. 7 may be combined). The seismic sensors 102, 702 may include, but are not limited to, a geophone, a hydrophone, and/or an accelerometer (e.g., a digital accelerometer). The geophone may comprise a single-component geophone, a two-component geophone, or a three-component geophone, and the accelerometer may comprise a single-axis accelerometer, a two-axis accelerometer, or a three-axis accelerometer. In an embodiment, the seismic sensor may comprise a three-component accelerometer. Combinations of these types of seismic sensors may be used when a plurality of seismic sensors are used to detect the seismic wave. The seismic sensors 102, 702 may measure a seismic wave in multiple directions, for example in one or two directions parallel to the surface of the earth, in a direction perpendicular to the surface of the earth, and/or in a vertical direction.

Returning to FIG. 1, a detected seismic signal may be generated by each seismic sensor 102. The detected seismic signal may represent or be indicative of the seismic wave 120 and may be suitably recorded, for example, using a conventional seismic field recorder. In an embodiment, a suitable recording device may be contained in a recording vehicle 130, which may comprise a dedicated recording vehicle for the detected seismic signal. Additional or alternative recording devices for the detected seismic signal may also be used and may include digital and/or analog recording devices and/or non-transitory media that may, in an embodiment, be contained in a weather resistant enclosure capable of recording data over days to weeks without human intervention. In an embodiment, each seismic sensor may have its own recording device, and each recording device may be internal or external to the seismic sensor. The detected seismic signal may then be processed along with the detected electromagnetic field to determine at least one property of the subsurface earth formation. In an embodiment, the detected seismic signal and the detected electromagnetic field may be processed in real-time without first being recorded on a non-transitory medium.

When a plurality of seismic sensors is used to measure the seismic wave, the seismic sensors may be arranged in a variety of patterns. In an embodiment as shown in FIG. 5, a grid pattern may be used, and the spacing between the seismic sensors 102 may be less than about one half of the wavelength of the highest frequency surface seismic waves expected to be encountered, which may include higher frequencies than those expected to be produced by the electroseismic effect within the subsurface earth formation. Surface seismic waves may be due to various sources including heavy equipment (e.g., construction equipment, trains, etc.), vehicular traffic, and/or natural sources (e.g., natural seismic activity such as earthquakes, thunder, etc.).

In an embodiment as shown in FIG. 5, one or more seismic sensors 410 may be used to measure one or more components of a seismic wave at a distance away from the seismic sensors 102 above the subsurface earth formation 420 of interest. In an embodiment, an additional seismic sensor 410 may be located at a distance away from the one or more seismic sensors 102 to identify seismic waves from sources other than the subsurface earth formation and/or that occur over large distances. In an embodiment, the additional seismic sensors 410 may be located more than about 500 yards, alternatively more than about one half mile, alternatively more than about one mile, or alternatively more than about 5 miles from the one or more seismic sensors above the subsurface earth formation 420.

In an embodiment, the electromagnetic field detectors and seismic sensors disclosed herein may be used to perform passive surveying. The sensors may be combined in any combination in order to obtain the desired signals. For example, when a detected seismic signal is desired, a single seismic sensor or a plurality of seismic sensors may be employed. Similarly, when a detected electromagnetic signal is desired, a single electromagnetic field detector or a plurality of electromagnetic field detectors may be employed. When both a detected seismic signal and a detected electromagnetic signal are desired, a single seismic sensor and a single electromagnetic field detector may be employed, alternatively a single seismic sensor and a plurality of electromagnetic field detectors may be employed, alternatively, a plurality of seismic sensors and a single electromagnetic field detector may be employed, or alternatively, a plurality of seismic sensors 120 and a plurality of electromagnetic field detectors may be employed. The electromagnetic field detectors 104, 126 may be disposed in a pattern or array, which in an embodiment may overlap with a pattern or array of seismic sensors 102.

In an embodiment, any of the electromagnetic field detectors and/or seismic sensors disclosed herein may be used to perform long-term passive surveying. In this embodiment, one or more of the signals may be detected a plurality of times using the sensors. The signals may be detected periodically (e.g., every week, every month, every year, etc.) or aperiodically over a period of hours, days, weeks, months, years, and/or decades. The long-term survey results may provide a time-based indication of a subsurface earth formation of interest with respect to time, including any changes in the formation over the time period in which the signals are detected. Such a system may be used to monitor the development and/or depletion of a hydrocarbon field and/or water well or aquifer, for example during production of a fluid from the formation.

Passive Electrical Surveying and Processing: Detecting a Modulating Signal

In an embodiment, passive surveying may be carried out by detecting an electromagnetic signal alone, and processing the detected electromagnetic signal to determine if one or more fluids are present in a subterranean formation of interest. The electromagnetic signal may comprise any of the electromagnetic signals described above including a nonlinear electromagnetic response. In this embodiment, an electromagnetic signal may be detected using any of the electromagnetic field detector configurations described above. In the broadest sense, the signal may be optionally pre-processed using one or more filters, followed by demodulation of the signal to determine if a modulation of a carrier signal (e.g., the earth's background electromagnetic field, electromagnetic radiation from a cultural source, a generated reference signal, etc.) exists. The existence of a modulation of the carrier signal may be taken as a direct indication that a coupling has occurred due to the interaction of the carrier signal with a modulating signal produced in a subterranean formation below the sensor. Additional processing may be performed including power spectral analysis and relative power ratios of the modulating signal relative to a background signal to determine the frequency characteristics of the modulating signal. The frequency characteristics may be used to derive depth and location information about the source and strength of the modulating signal, thereby revealing information about the location of a subterranean formation. A variety of models may be used to correlate the spectral analysis results with the depth of the modulating signal.

Having generally described the various types of signal analysis that can be performed on the detected electromagnetic signal, each signal processing method will now be described in greater detail. As discussed above, the source signal interacting with the formation of interest may comprise a broad spectrum of frequencies, from sub-hertz frequencies to tens of thousands of hertz frequencies. While not intended to be limited by theory, the modulating signal arising from the interactions within the formation of interest may have a narrower frequency-band spectrum than the source signal with recognizable and extractable characteristics. Even with the narrower frequency-band characteristics, some pre-processing of the signal may be used to analyze the detected signal. The optional pre-processing of the signal may include use of noise reduction, separation of a direct current component of the signal, data reduction, and/or noise filtering/frequency band-passing.

Figure 8:
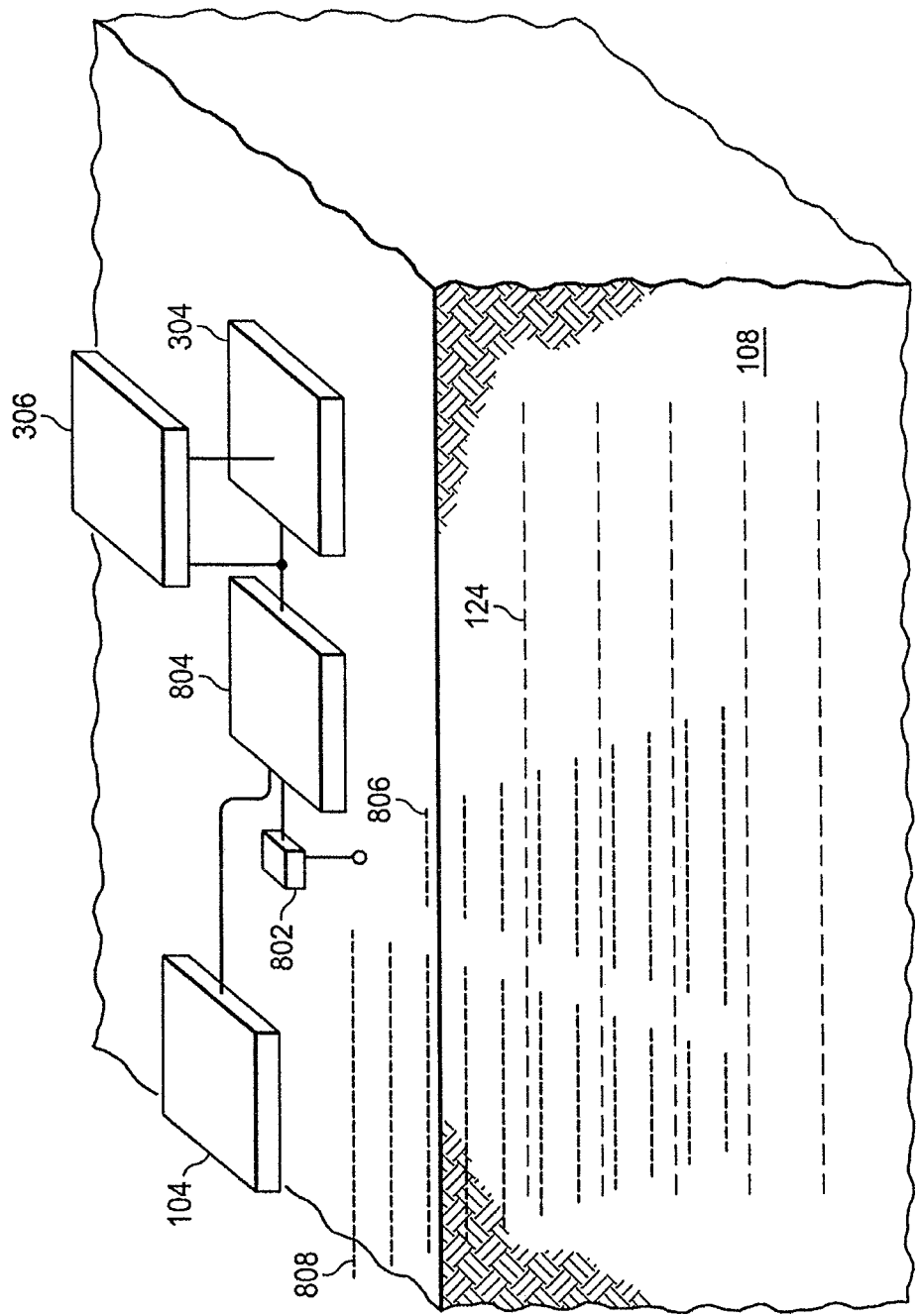
FIG. 8 is another perspective view of a passive surveying system according to an embodiment.

A noise reduction scheme may be used to generate a signal that may have an increased signal-to-noise ratio relative to the full spectrum of the electromagnetic field in the earth. In an embodiment as shown in FIG. 8, a reference signal 806 may be generated by a reference signal generator 802 and introduced into the near surface of the earth, for example, by transmitting the reference signal into the earth from a location near to the ground 108. The modulating signal 124 may act to modulate the reference signal 806 in the same way as the vertical portion of the electric field within the earth. Upon detecting the modulated reference signal 808 with the sensor 104, various detection methods may then be used to compare the detected signal 808 with the known reference signal 806 and isolate the modulating signal 124 for further processing. The detected, modulated reference signal 808 may, in some embodiments, be filtered or otherwise pre-processed prior to being compared and isolating the modulating signal 124. In an embodiment, a lock-in amplifier 804 may be used to isolate the modulating signal 124 from the detected signal 808. The lock-in amplifier 804 may be of any type known in the art and may receive as inputs the reference signal 802 and the detected signal 808 from the sensor 104. For example, the reference signal generator 802 may be coupled to the lock-in amplifier 804 or may form a part of the lock-in amplifier 804. The lock-in amplifier 804 may produce a signal comprising the modulating signal 124 with a reduced signal-to-noise ratio as compared to the signal detected by the sensor 104. The produced signal may then be sent to one or more additional, optional pre-processing steps before being passed on for further analysis.

Depending on the type of sensor used to detect the signal, the signal may comprise both an alternating current (AC) portion and direct current (DC) portion. The DC portion of the signal may result from the detection one or more portions of the earth's electromagnetic field and may not contain data indicative of the modulating signal. The DC portion may then be thought of as noise that may be filtered out prior to analysis of the signal. Any suitable DC filtering methods and/or equipment may be used to remove the DC portion from the detected signal. When a capacitive plate sensor is used, the DC portion may be filtered out based on the sensor design. Alternatively, a capacitive filter and/or a digital filter implemented in software on a computer may be used to remove the DC portion from the detected and/or stored signal.

As discussed above, the time period over which the signal is detected and recorded and/or the sampling frequency of the signal may result in a significant quantity of data to analyze. Greater amounts of data generally require more time to analyze and greater storage and computing costs. As a result, the amount of data may be limited and/or reduced to allow for faster processing, especially when real time processing is desired. While a reduced amount of data may lead to a less accurate analysis, processing of a relatively small portion of the data may provide a faster, cheaper first look at the results of the survey.

The data may be limited in a number of ways. In an embodiment, the signal data may be decimated. Decimating the data reduces the amount of data that is processed in the analysis steps and, therefore, reduces processing time and costs. Excessive decimation may reduce the reliability of the analysis to a certain extent, and thus the savings in processing times and costs must be weighed against reduced reliability. The signal data may typically be decimated down to an effective sampling rate approximating two times the highest frequency of interest while allowing for an identification of the frequency characteristics in the data. Higher decimation rates may be used, for example, when a faster, and possibly less accurate first look at the data is desired. Decimation of the data may be used alone or in addition to any of the other pre-processing techniques described herein.

The signal data may be filtered to reduce the amount of noise and thereby increase the SNR of the signal and/or the signal may be band-pass filtered to isolate one or more frequency bands of interest for use in the further analysis of the data. A noise filter may comprise any type of noise filter known in the art. For example, a high pass filter, a low pass filter, any suitable wide band frequency filter, and/or any suitable narrow band frequency filter may be used to eliminate noise. The earth's background electromagnetic field, a cultural source of electromagnetic radiation, and/or the reference signal, if used, may be used to determine the frequency range, amplitude range, and/or other parameters of a desired noise filter.

In some embodiments, a plurality of electromagnetic detectors may be disposed in an array and may be used to detect one or more components of the electromagnetic signal. In an embodiment, a horizontal component of the detected electromagnetic signal may be used with a predictive filter to remove noise from the vertical component of the detected electromagnetic field. The predictive filter may utilize one horizontal component or two horizontal components as detected by the one or more electromagnetic field detectors. This predictive filter may be applied to each electromagnetic field detector of the plurality of electromagnetic field detectors.

In addition to, or in place of, the noise filter, a band-pass filter may be used to isolate one or more frequency ranges of interest for purpose of extracting the envelope or demodulating the signal over this frequency range. A set of predetermined frequencies may be used as the basis for filtering the detected signal for further processing. The frequency filters may improve the SNR of the signal. A variety of band-pass filters may be used to produce one or more frequency filtered signals useful for further processing. For example, band-pass filters implemented in hardware are known and may be suitable. Alternatively, band-pass filters may also be implemented in software, for example, using a digital processing environment on a computer encoded for processing of the data. Any of a number of known rational polynomial functions may be used alone or in combination with other functions to separate the data for a particular frequency and/or frequency range from the data set as a whole, and in general those functions and processes may be used as frequency filters. For example, linear phase filters, finite impulse response filters, forward infinite impulse response filters, reverse infinite impulse response filters, and the like may be used. When a plurality of band-pass filters are used to generate a plurality of signals, each band pass filter may have the same or may have different bandwidths. The correlation between the frequency of the modulating signal obtained from the envelope extracted from the signal and the depth of the formation of interest may be determined in a number of ways, as described in more detail below.

In an embodiment, the detected signal amplitude may be averaged over one or more frequencies and/or frequency ranges. In an embodiment, the averaging of the detected electromagnetic field signal amplitude may comprise averaging the signal amplitude at one or more fixed frequencies. The frequencies may generally be selected from those frequencies present in the detected electric signal. In an embodiment, the one or more frequencies at which the detected signal can be averaged may be selected from a range of frequencies between about 0.01 Hz and about 10,000 Hz. The averaging process may comprise measuring the signal amplitude for a length of time that is longer (e.g., greater than at least twice as long) than the period of oscillation of the signal at the selected frequency, and then averaging the signal amplitude over the detection time period. The averaging may reduce the momentary fluctuations in the detected electromagnetic field resulting from noise fluctuations that are not related to signals originating in the earth. Processing may further consist of averaging the signal amplitude at many frequencies over a range of frequencies. For example, the selected frequencies might be chosen to be separated by 1 Hz between 1 Hz and 10,000 Hz.

When the signal has been pre-processed using any optional pre-processing steps including band-passing the signal, the signal may pass to a signal envelope extraction step to determine the envelope of the signal in the band of interest. The envelope of the signal may refer to the shape of the modulation of the signal. As discussed above, the modulation, and therefore the envelope, can comprise one or more of a frequency modulation, a phase modulation, or an amplitude modulation. An envelope detector as known in the art may be used to extract the envelope of the signal. The envelope detector may be implemented in hardware or software and may be used to demodulate the band-passed signal to extract the signal envelope. The envelope detector may be used to extract the signal envelope for a plurality of band-passed signals. Suitable demodulation techniques and methods are known and may include the Hilbert transform method.

Once the signal envelope has been obtained, the envelope may be analyzed to determine the spectral properties. The spectral properties may allow for comparison with one or more additional envelopes for additional signal bands from the originally detected signal. The spectral properties may be determined in the frequency domain through well-established methods for calculating the Fourier Transform and the power spectral density. For example, the power spectral density for various bands of frequencies may be calculated to give the power carried by the envelope expressed in units of power per frequency. Alternatively or in addition to the power spectral density, a Fourier Transform (e.g., Fast Fourier Transform (FFT), complex FFT, etc.) may provide an indication of the frequency characteristics of the envelope (e.g., a frequency distribution). Further, the power spectral density and FFT calculations may provide relative amplitudes of each of the frequencies identified. As used herein, the "spectral properties" may include amplitude and frequency characteristics of a signal and/or envelope along with other characteristics of the signal and/or envelope such as the phase characteristics, etc. Calculation of the spectral properties may be implemented in hardware and/or software. Calculation methods for determining the power spectral density and/or the FFT are known and may be carried out using processing implemented on a digital computer comprising a processor, as described in more detail below. In an embodiment, one or more of the spectral properties may be determined using a lock-in amplifier and/or a spectrum analyzer.

The spectral properties of one or more additional envelopes resulting from one or more corresponding additional frequency ranges selected from the detected (and optionally pre-processed) signal may be calculated using the methods described herein. When a plurality of spectral properties has been calculated, the corresponding values may be compared to generate one or more ratios of the spectral properties (e.g., power spectral density, FFT amplitudes, phase comparisons, etc.) in certain frequency bands to the corresponding spectral properties in other frequency bands. The spectral properties of the base detected signal containing various white noise portions may also be calculated using a variety of methods to provide a base spectral property (e.g., a power density, a frequency-amplitude correlation, etc.) for comparison. For example, the base spectral property may be used to normalize the other calculated ratios, though other mathematical transformations may be used to produce similar results.

The ratios obtained by comparison of the various signal bands may be analyzed and correlated as a function of the band-pass frequencies of the original signal and/or the frequency band of the extracted envelopes. The resulting analysis may provide information about the frequency characteristics of the modulating signal and/or an amplitude correlation relating the strength of the modulating signal for each frequency. Variations within the analysis may be used to adjust the analysis criteria such as increasing the bandwidth of the band-pass filters, which may be expected to increase the amplitude of the ratio of the power spectral properties. The properties of the analysis may be tailored based on the quality and amount of data obtained, the type of signals present and interacting with a formation of interest, and a desired processing speed and cost.

The existence of hydrocarbons in a formation may be indicated by the existence of a modulating signal. In terms of the signal analysis described in this section, the modulating signal may be identified by demodulating a portion of the detected signal to determine if an envelope can be identified. If no envelope is found that is distinguishable from white noise, for example, or some other suitable reference signal, then this result may be taken as evidence that there are no hydrocarbons in a formation of interest below the sensor location. If a suitable envelope is identified, then the analysis described herein may be carried out to identify the spectral properties of the envelope and correlate the results with the presence of various fluids as well as a frequency-depth function. In an embodiment, a further survey as described below may be performed when an envelope is identified.

Correlation of the spectral properties of the envelope and the presence of various fluids in subterranean pore spaces may be based on a variety of classification methodologies. For example, statistical regression analysis, and statistical classifiers such as neural networks, decision trees, Bayes-based classifiers, fuzzy logic-based classifiers, and conventional statistical classifiers may all be used to determine a frequency-depth relationship. For example, the analysis may be performed with the system and methods described herein at locations with known properties and formation characteristics to train and/or determine the correlation parameters. Once the parameters have been determined (e.g., once a neural net has been trained), the system and methods may be repeated in a new location.

While it is known that a correlation generally exists between the frequency of the modulating signal and the depth at which it originates, the exact relationship may not be evident from the analysis of the signal detected by the sensor. A frequency-depth function may be established using known locations, parameters, and/or calculations to allow the depth values for similar locations to be determined once the spectral characteristics of the signals are analyzed and determined. The frequency-depth relationship for electric signals may depend on the Earth's resistivity, formation properties, types of components present, and, more generally, the electrical properties for a particular area and corrections may need to be applied to the spectral properties from location to location. In some instances, the frequency-depth correlation variation from area to area may not be so great that for many purposes an approximate or a more or less typical frequency-depth function may be used. For example, a frequency-depth function may be derived from empirical data taking into consideration various locations that have been reported in the literature. This function may be considered more or less representative of the "typical" relationship between frequency and depth. Other suitable sources of data may be considered including, for example, an approximate frequency-depth function derived from conventional skin effect conductivity analyses. The resulting typical frequency-depth function may be used to derive depth information for the corresponding modulating signal of interest based on the analysis described herein.

In still another embodiment, the various properties of the subterranean formation including the frequency-depth function may be determined by developing a geological model of the subterranean formation. Various modeling programs may be used to develop the model of the subterranean formation and can provide predicted outputs based on the model. The predicted outputs can then be compared with the detected signals (e.g., a detected envelope) to determine if the model is accurate. When a discrepancy is detected, the geological model can be altered and the process repeated. Such a process may result in a match between the geological model and the detected signal, thereby providing one or more properties of the subterranean formation.

The processing described herein may be used to determine the existence of a fluid in a subterranean formation as well as other properties of the subterranean formation. In an embodiment, the processing of the electromagnetic signal may provide an indication of at least one property of a subterranean formation including, but not limited to, an existence of the subsurface earth formation containing at least one fluid, a depth of the subsurface earth formation, a porosity, a fluid permeability, a composition of at least one fluid within the subsurface earth formation, a spatial extent of the subsurface earth formation, an orientation of the boundaries of the subsurface earth formation, a resistivity, and any combination thereof. Further, the processing may detect one or more fluids within the subterranean formation, where detectable fluids may include, but are not limited to, an aqueous fluid, a hydrocarbon, a petroleum, carbon dioxide and/or other reservoir gases (e.g., various acid gases, helium, and the like), and any combination thereof.

While the measurement of a signal at a single location followed by an analysis of that signal has been described herein, the detection and analysis steps may be repeated any number of times. For example, multiple measurements may be made at a single location over several time periods. The results may be statistically analyzed to provide an improved accuracy correlation and/or survey. In addition, one or more samples may be taken at varying locations sequentially in time or concurrently in time using one or multiple sensors. For example, multiple measurements may be made at varying locations around a site of interest. Various grid patterns and/or random sample locations may be chosen to generate a plurality of measurements across an area. For example, the grid and/or array of detectors described above may be used to generate a plurality of detected signals for use with the processing techniques described herein. The multiple measurements may be performed sequentially or concurrently (e.g., using multiple sensors) at a single location, and/or the measurements may be performed sequentially and/or concurrently in the various locations around a site of interest when a plurality of locations are used to measure the signal of interest. The resulting hydrocarbon indications and resulting depth measurements may be used to generate a two dimensional, a three dimensional, and/or a four dimensional model (e.g., where the fourth dimension is time) of a subterranean formation and the one or more fluids contained therein.

Passive Electrical Surveying and Processing: Directly Detecting an Electromagnetic Field In an embodiment, passive surveying may be carried out by detecting an electromagnetic signal alone, and processing the detected electromagnetic signal to determine if one or more fluids are present in a subterranean formation of interest. The electromagnetic signal may comprise the electromagnetic signals described above including a nonlinear electromagnetic response. In this embodiment, an electromagnetic signal may be detected using any of the electromagnetic field detector configurations described above. Once the electromagnetic field has been detected by one or more sensors and a signal has been generated, the signal may be analyzed to extract information concerning the existence of a formation of interest. In the broadest sense, the signal may be optionally pre-processed using one or more filters, followed by correlation analysis of the detected electromagnetic signal in either the time or frequency domain. The temporal or frequency characteristics of the correlation analysis may be used to derive depth and location information about the source and strength of the detected signal, thereby revealing information about the location of a subterranean formation. A variety of models may be used to correlate the correlation analysis results with the depth of the detected signal.

Having generally described the various types of signal analysis that can be performed on the detected electromagnetic signal, each signal processing method will now be described in greater detail. As discussed above, the source signal interacting with the formation of interest may comprise a broad spectrum of frequencies, from sub-hertz frequencies to tens of thousands of hertz frequencies. In an embodiment, the signal of interest may comprise the signal directly arising from the electroseismic and seismoelectric effects within a formation of interest. While not intended to be limited by theory, the electromagnetic signal arising from the interactions within the formation of interest may have a narrower frequency-band spectrum than the source signal with recognizable and extractable characteristics. Even with the narrower frequency-band characteristics, some pre-processing of the signal may be used to analyze the detected signal. The optional pre-processing of the signal may include use of a noise reduction detection scheme, separation of a direct current component of the signal, data reduction, and/or noise filtering/frequency band-passing.

Depending on the type of sensor used to detect the signal, the signal may comprise both an alternating current (AC) portion and direct current (DC) portion. The DC portion of the signal may result from the detection of one or more portions of the earth's electromagnetic field and may not contain signal of interest. The DC portion may then be thought of as noise that may be filtered out prior to analysis of the signal. Any suitable DC filtering methods and/or equipment may be used to remove the DC portion from the detected signal. When a capacitive plate sensor is used, the DC portion may be filtered out based on the sensor design. Alternatively, a capacitive filter and/or a digital filter implemented in software on a computer may be used to remove the DC portion from the detected and/or stored signal.

As discussed above, the time period over which the signal is detected and recorded and/or the sampling frequency of the signal may result in a significant quantity of data to analyze. Greater amounts of data generally require more time to analyze and greater storage and computing costs. As a result, the amount of data may be limited and/or reduced to allow for faster processing, especially when real time processing is desired. While a reduced amount of data may lead to a less accurate analysis, processing of a relatively small portion of the data may provide a faster, cheaper first look at the results of the survey.

The data may be limited in a number of ways. In an embodiment, the signal data may be decimated. Decimating the data reduces the amount of data that is processed in the analysis steps and, therefore, reduces processing time and costs. Excessive decimation may reduce the reliability of the analysis to a certain extent, and thus the savings in processing times and costs must be weighed against reduced reliability. The signal data may typically be decimated down to an effective sampling rate approximating two times the highest frequency of interest while allowing for an identification of the frequency characteristics in the data. Higher decimation rates may be used, for example, when a faster, and possibly less accurate first look at the data is desired. Decimation of the data may be used alone or in addition to any of the other pre-processing techniques described herein.

The signal data may be filtered to reduce the amount of noise and thereby increase the SNR of the signal and/or the signal may be band-pass filtered to isolate one or more frequency bands of interest for use in the further analysis of the data. A noise filter may comprise any type of noise filter known in the art. For example, a high pass filter, a low pass filter, or any suitable wide band frequency filter, and/or any suitable narrow band frequency filter may be used to eliminate noise. The earth's background electromagnetic field, a cultural source of electromagnetic radiation, and/or the reference signal, if used, may be used to determine the frequency range, amplitude range, and/or other parameters of a desired noise filter.

In some embodiments, a plurality of electromagnetic sensors may be disposed in an array and may be used to detect one or more components of the electromagnetic signal. In an embodiment, a horizontal component of the detected electromagnetic signal may be used with a predictive filter to remove noise from the vertical component of the detected electromagnetic field. The predictive filter may utilize one horizontal component or two horizontal components as detected by the one or more electromagnetic field detectors. This predictive filter may be applied to each electromagnetic field detector of the plurality of electromagnetic field detectors.

In addition to, or in place of, the noise filter, a band-pass filter may be used to isolate one or more frequency ranges of interest for purpose of extracting the signal over this frequency range. A set of predetermined frequencies may be used as the basis for filtering the detected signal for further processing. The frequency filters may improve the SNR of the signal. A variety of band-pass filters may be used to produce one or more frequency filtered signals useful for further processing. For example, band-pass filters implemented in hardware are known and may be suitable. Alternatively, band-pass filters may also be implemented in software, for example, using a digital processing environment on a computer encoded for processing of the data. Any of a number of known rational polynomial functions may be used alone or in combination with other functions to separate the data for a particular frequency and/or frequency range from the data set as a whole, and in general those functions and processes may be used as frequency filters. For example, linear phase filters, finite impulse response filters, forward infinite impulse response filters, reverse infinite impulse response filters, and the like may be used. When a plurality of band-pass filters are used to generate a plurality of signals, each band pass filter may have the same or may have different bandwidths.

In an embodiment, the detected signal amplitude may be averaged over one or more frequencies and/or frequency ranges. In an embodiment, the averaging of the detected electromagnetic field signal amplitude may comprise averaging the signal amplitude at one or more fixed frequencies. The frequencies may generally be selected from those frequencies present in the detected electric signal. In an embodiment, the one or more frequencies at which the detected signal can be averaged may be selected from a range of frequencies between about 0.01 Hz and about 10,000 Hz. The averaging process may comprise measuring the signal amplitude for a length of time that is longer (e.g., greater than at least twice as long) than the period of oscillation of the signal at the selected frequency, and then averaging the signal amplitude over the detection time period. The averaging may reduce the momentary fluctuations in the detected electromagnetic field resulting from noise fluctuations that are not related to signals originating in the earth. Processing may further consist of averaging the signal amplitude at many frequencies over a range of frequencies. For example, the selected frequencies might be chosen to be separated by 1 Hz between 1 Hz and 10,000 Hz.

When the signal has been pre-processed using any optional pre-processing steps including band-passing the signal, the signal may be analyzed to determine the spectral properties. The spectral properties may be determined in the frequency domain through well-established methods for calculating the power spectral density. For example, the power spectral density for various bands of frequencies may be calculated to give the power carried by the signal expressed in units of power per frequency. Further, the power spectral density calculations may provide relative amplitudes of each of the frequencies identified. As used herein, the "spectral properties" may include amplitude and frequency characteristics of a signal. Calculation of the spectral properties may be implemented in hardware and/or software. Calculation methods for determining the power spectral density are known and may be carried out using processing implemented on a digital computer comprising a processor, as described in more detail below. In an embodiment, one or more of the spectral properties may be determined using a lock-in amplifier and/or a spectrum analyzer.

Further processing of the obtained power spectral density may be done, including de-trending of the power spectral density and integration of the power spectral density. A correlation analysis of the detected electromagnetic field may then be performed in the time domain, the frequency domain, or both. For example, a Fourier Transform or Fast Fourier Transform (FFT) of the power spectral density, perhaps after processing steps such as de-trending and integration, can be performed to yield correlations between the source electromagnetic field and secondary electromagnetic fields generated by seismic signals through the seismoelectric effect near the earth's surface, which in turn are generated by electroseismic effects at the formations of interest. The properties of the analysis may be tailored based on the quality and amount of data obtained, the type of signals present and interacting with a formation of interest, and a desired processing speed and cost.

The existence of hydrocarbons in a formation may be indicated by the existence of strong correlations between the source electromagnetic signal and the secondary electromagnetic field generated by seismic signals through the seismoelectric effect near the earth's surface, which in turn are generated by electroseismic effects at the formations of interest, at correlation times that correspond to known seismic transit times between hydrocarbon formations and the surface of the earth. These seismic transit times can be obtained explicitly from seismic data obtained in the area of interest or can be estimated based on rock acoustic properties.

The spectral properties may be correlated with the presence of various fluids in subterranean pore spaces based on a variety of classification methodologies. For example, statistical regression analysis, and statistical classifiers such as neural networks, decision trees, Bayes-based classifiers, fuzzy logic-based classifiers, and conventional statistical classifiers may all be used to determine a frequency-depth relationship. For example, the analysis may be performed with the system and methods described herein at locations with known properties and formation characteristics to train and/or determine the correlation parameters. Once the parameters have been determined (e.g., once a neural net has been trained), the system and methods may be repeated in a new location.

The correlations may also be used to develop a frequency-depth function. A frequency-depth function may be established using known locations, parameters, and/or calculations to allow the depth values for similar locations to be determined once the spectral characteristics of the signals are analyzed and determined. The frequency-depth relationship for electromagnetic signals may depend on the Earth's resistivity, formation properties, types of components present, and, more generally, the electrical properties for a particular area and corrections may need to be applied to the spectral properties from location to location. In some instances, the frequency-depth correlation variation from area to area may not be so great that for many purposes an approximate or a more or less typical frequency-depth function may be used. For example, a frequency-depth function may be derived from empirical data taking into consideration various locations that have been reported in the literature. This function may be considered more or less representative of the "typical" relationship between frequency and depth. Other suitable sources of data may be considered including, for example, an approximate frequency-depth function derived from conventional skin effect conductivity analyses. The resulting typical frequency-depth function may be used to derive depth information for the corresponding detected electromagnetic signal of interest based on the analysis described herein. In an embodiment, the frequency-depth relationship is determined based on a classification method comprising at least one method selected from the group consisting of: a neural network, a decision tree, a Bayes-based classifier, a fuzzy logic-based classifier, and a conventional statistical classifier.

In still another embodiment, the various properties of the subterranean formation including the frequency-depth function may be determined by developing a geological model of the subterranean formation. Various modeling programs may be used to develop the model of the subterranean formation and can provide predicted outputs based on the model. The predicted outputs can then be compared with the detected signals (e.g., a detected electromagnetic signal) to determine if the model is accurate. When a discrepancy is detected, the geological model can be altered and the process repeated. Such a process may result in a match between the geological model and the detected signal, thereby providing one or more properties of the subterranean formation.

The processing described herein may be used to determine the existence of a fluid in a subterranean formation as well as other properties of the subterranean formation. In an embodiment, the processing of the electromagnetic signal may provide an indication of at least one property of a subterranean formation including, but not limited to, an existence of the subsurface earth formation containing at least one fluid, a depth of the subsurface earth formation, a porosity, a fluid permeability, a composition of at least one fluid within the subsurface earth formation, a spatial extent of the subsurface earth formation, an orientation of the boundaries of the subsurface earth formation, a resistivity, and any combination thereof. Further, the processing may detect one or more fluids within the subterranean formation, where detectable fluids may include, but are not limited to, an aqueous fluid, a hydrocarbon, a petroleum, carbon dioxide, and any combination thereof. Other fluids know to be present in subsurface earth formations can include hydrogen sulfide, sulfur dioxide, helium, and the like.

While the measurement of a signal at a single location followed by an analysis of that signal has been described herein, the detection and analysis steps may be repeated any number of times. For example, multiple measurements may be made at a single location over several time periods. The results may be statistically analyzed to provide an improved accuracy correlation and/or survey. In addition, one or more samples may be taken at varying locations sequentially in time or concurrently in time using one or multiple sensors. For example, multiple measurements may be made at varying locations around a site of interest. Various grid patterns and/or random sample locations may be chosen to generate a plurality of measurements across an area. For example, the grid and/or array of detectors described above may be used to generate a plurality of detected signals for use with the processing techniques described herein. The multiple measurements may be performed sequentially or concurrently (e.g., using multiple sensors) at a single location, and/or the measurements may be performed sequentially and/or concurrently in the various locations around a site of interest when a plurality of locations are used to measure the signal of interest. The resulting hydrocarbon indications and resulting depth measurements may be used to generate a two dimensional, a three dimensional, and/or a four dimensional model (e.g., where the fourth dimension is time) of a subterranean formation and the one or more fluids contained therein.

Passive Seismic Surveying and Processing

In an embodiment, passive surveying may be carried out by detecting a seismic signal alone, and processing the detected seismic signal to determine if one or more fluids are present in a subterranean formation of interest. In this embodiment, a seismic signal may be detected using any of the seismic sensor configurations described above, including the use of a plurality of seismic sensors configured in an array. The seismic signal may comprise any of the seismic signals described above including a nonlinear seismic response.

Once the seismic signal has been detected by one or more seismic sensors and a detected seismic signal has been generated, the signal may be analyzed to extract information concerning the existence of a formation of interest. The analysis of the seismic signal may be similar to the analysis of the detected electromagnetic signal described above. In the broadest sense, the signal may be optionally pre-processed using one or more filters, followed by analyzing the detected seismic signal to determine if a seismic signal resulting from an electroseismic conversion is present. The existence of an a seismic signal resulting from an electroseismic conversion may be taken as a direct indication that a coupling has occurred due to the interaction of an electromagnetic source with a fluid in a subterranean formation below the sensor. The frequency characteristics may be used to derive depth and location information about the source and strength of the detected seismic signal, thereby revealing information about the location of a subterranean formation. A variety of models may be used to correlate the spectral analysis results with the depth of the modulating signal. The correlation between the frequency of the filtered signal obtained from the raw seismic signal and the depth of the formation of interest may be determined in a number of ways, as described in more detail below.

Having generally described the various types of signal analysis that can be performed on the detected seismic signal, each signal processing method will now be described in greater detail. As discussed above, the detected seismic signal may be pre-processed using one or more filters. The optional pre-processing of the signal may include use of a noise reduction detection scheme, separation of a direct current component of the signal, data reduction, and/or noise filtering/frequency band-passing.

As discussed above, the time period over which the seismic signal is detected and recorded and/or the sampling frequency of the seismic signal may result in a significant quantity of data to analyze. Greater amounts of data generally require more time to analyze and greater storage and computing costs. As a result, the amount of data may be limited and/or reduced to allow for faster processing, especially when real time processing is desired. While a reduced amount of data may lead to a less accurate analysis, processing of a relatively small portion of the data may provide a faster, cheaper first look at the results of the survey.

The data may be limited in a number of ways. In an embodiment, the seismic signal data may be decimated. Decimating the data reduces the amount of data that is processed in the analysis steps and, therefore, reduces processing time and costs. Excessive decimation may reduce the reliability of the analysis to a certain extent, and thus the savings in processing times and costs must be weighed against reduced reliability. The signal data may typically be decimated down to an effective sampling rate approximating two times the highest frequency of interest while allowing for an identification of the frequency characteristics in the data. Higher decimation rates may be used, for example, when a faster, and possibly less accurate first look at the data is desired. Decimation of the data may be used alone or in addition to any of the other pre-processing techniques described herein.

The signal data may be filtered to reduce the amount of noise and thereby increase the SNR of the signal and/or the signal may be band-pass filtered to isolate one or more frequency bands of interest for use in the further analysis of the data. A noise filter may comprise any type of noise filter known in the art. For example, a high pass filter, a low pass filter, or any suitable wide band frequency filter, and/or any suitable narrow band frequency filter may be used to eliminate noise. The earth's background electromagnetic field and/or local sources of seismic noise may be used to determine the frequency range, amplitude range, and/or other parameters of a desired noise filter for the detected seismic signal.

In addition to, or in place of, the noise filter, a band-pass filter may be used to isolate one or more frequency ranges of interest for purpose of filtering the detected seismic signal over a desired frequency range. A set of predetermined frequencies may be used as the basis for filtering the detected signal for further processing. The frequency filters may improve the SNR of the signal. A variety of band-pass filters may be used to produce one or more frequency filtered signals useful for further processing. For example, band-pass filters implemented in hardware are known and may be suitable. Alternatively, band-pass filters may also be implemented in software, for example, using a digital processing environment on a computer encoded for processing of the data. Any of a number of known rational polynomial functions may be used alone or in combination with other functions to separate the data for a particular frequency and/or frequency range from the data set as a whole, and in general those functions and processes may be used as frequency filters. For example, linear phase filters, finite impulse response filters, forward infinite impulse response filters, reverse infinite impulse response filters, and the like may be used. When a plurality of band-pass filters are used to generate a plurality of signals, each band pass filter may have the same or may have different bandwidths.

In some embodiments, a plurality of sensors that may be disposed in an array may be used to detect the seismic signal. In this embodiment, various optional pre-processing steps may use data from the plurality of sensors to improve the signal-to-noise ratio and/or filter the resulting detected signal. In an embodiment, local sources of noise may be present in the vicinity of the seismic sensors, and the local sources of noise may be rejected in the detected seismic signal using several methods. First, the detected seismic signals from one or more of the plurality of seismic sensors may be filtered in the spatial domain to reject surface waves traveling across the plurality of seismic sensors. The filter may use at least a portion of the horizontal component of the detected seismic signal across the plurality of seismic sensors to remove at least a portion of a noise signal from the detected seismic signal at each seismic sensor. In an embodiment, only a portion of the seismic sensors may be configured to measure a horizontal component of the seismic wave, and these seismic sensors may be used to generate the horizontal components used in the spatial filter. In an embodiment, each of the plurality of seismic sensors may be configured to measure a horizontal component of the seismic wave, and each of the plurality of seismic sensors may be used with the filter in the spatial domain to reject surface waves traveling across the plurality of seismic sensors.

In an embodiment, a horizontal component of the detected seismic signal may be used as a predictive filter to remove local noise from the vertical component of each seismic sensor. The filter may utilize one horizontal component or two horizontal components as detected by the seismic sensor. This predictive filter may be applied to each seismic sensor of the plurality of seismic sensors that is configured to measure a horizontal component of the seismic wave.

In an embodiment, local noise waves may propagate across the plurality of seismic sensors in expected spreading patterns, which may be analogous to water waves on a pond. The propagating noise waves may be suppressed by determining the direction of travel and speed, and applying a spatial filter that makes use of the spreading symmetry of the noise wave. The spatial filter may remove the local noise from the detected seismic signals at each sensor being affected by the noise. In an embodiment, a predictive filter may be employed to predict the arrival and amplitude of the local noise wave at a seismic sensor and remove the local noise wave during the generation of the detected seismic signal. In an embodiment, only a portion of the seismic sensors may be configured to measure a horizontal component of the seismic wave, and these seismic sensors may be used to determine the spreading geometry of the local noise wave. The spatial filter may then be applied to each of the plurality of seismic sensors, including those that are not configured to measure a horizontal component of the seismic wave. In an embodiment, each of the plurality of seismic sensors may be configured to measure a horizontal component of the seismic wave, and each of the plurality of seismic sensors may be used to predict and verify the spreading geometry of the local noise wave used with the spatial filter. In an embodiment, one or more additional seismic sensors at a distance away from the plurality seismic sensors may be used to measure a seismic wave, which may include the local noise wave. The ability to measure the local noise wave at a distance from the plurality of seismic sensors may provide better prediction of the local noise wave and an improvement of the reduction of the local noise wave in the detected seismic signal.

In an embodiment, the detected seismic signals from the plurality of seismic sensors may be cross-correlated, and the cross-correlated data from all of the seismic sensors may be summed. The resulting summed data may be used as a predictive filter to enhance spatial continuity across the plurality of seismic sensors. The summing of the data may result in an increase in the amplitude of the seismic waves arriving at the same time, for example from a plane wave. Any seismic components resulting from a noise source traveling across the plurality of seismic sensors and/or any components that are not traveling as a plane wave will tend not to add. As a result, the summed data may be used to identify the seismic waves resulting from an electroseismic conversion and identify the other seismic components as local noise sources.

In an embodiment, the assumption that the seismic wave resulting from the electroseismic conversion can be represented as a plane wave may be used to remove at least a portion of a noise signal from the detected seismic signal from one or more of the seismic sensors. In an embodiment, a dip filter can be used to reject detected seismic signals arriving at a non-normal angle to the plurality of seismic sensors. In an embodiment, the dip filter may be applied after cross-correlating the detected seismic signals from two or more of the seismic sensors.

In an embodiment, the detected seismic signal amplitude may be averaged over one or more frequencies and/or frequency ranges. In an embodiment, the averaging of the detected seismic signal amplitude may comprise averaging the signal amplitude at one or more fixed frequencies. The frequencies may generally be selected from those frequencies present in the detected seismic signal. In an embodiment, the one or more frequencies at which the detected signal can be averaged may be selected from a range of frequencies between about 0.01 Hz and about 1,000 Hz, alternatively between about 1 Hz and about 500 Hz. The averaging process may comprise measuring the signal amplitude for a length of time that is longer (e.g., greater than at least twice as long) than the period of oscillation of the signal at the selected frequency, and then averaging the signal amplitude over the detection time period. The averaging may reduce the momentary fluctuations in the detected seismic field resulting from noise fluctuations that are not related to signals originating in the earth. Processing may further consist of averaging the signal amplitude at many frequencies over a range of frequencies. For example, the selected frequencies might be chosen to be separated by 1 Hz between 1 Hz and 500 Hz. Those skilled in the art of seismology will recognize that the propagation of seismic waves from a subsurface structure to the earth's surface results in certain characteristic times associated with the time required for a seismic wave that originates at a subterranean formation to reach the Earth's surface where it is detected. Processing passive seismoelectric data by the averaging process may include identifying the characteristic times of seismic propagation from the subterranean formation. These characteristic times may then be processed by methods known to those skilled in the art to determine the depth of subterranean structures.

When the seismic signal has been pre-processed using any optional pre-processing steps including band-passing the signal, the seismic signal may be analyzed to determine the spectral properties. The spectral properties may be determined in the frequency domain through well-established methods for calculating the power spectral density. For example, the power spectral density for various bands of frequencies may be calculated to give the power carried by the signal expressed in units of power per frequency. Further, the power spectral density calculations may provide relative amplitudes of each of the frequencies identified. As used herein, the "spectral properties" may include amplitude and frequency characteristics of a seismic signal. Calculation of the spectral properties may be implemented in hardware and/or software. Calculation methods for determining the power spectral density are known and may be carried out using processing implemented on a digital computer comprising a processor, as described in more detail below. In an embodiment, one or more of the spectral properties may be determined using a lock-in amplifier and/or a spectrum analyzer.

Further processing of the obtained power spectral density of the seismic signal may be done, including de-trending of the power spectral density and integration of the power spectral density. Finally, a Fourier Transform or Fast Fourier Transform (FFT) of the power spectral density, perhaps after processing steps such as de-trending and integration, is performed to yield correlations between the seismic signal generated by seismoelectric effects near the surface of the earth and the seismic signals generated by electroseismic effects at the formations of interest. The properties of the analysis may be tailored based on the quality and amount of data obtained, the type of signals present and interacting with a formation of interest, and a desired processing speed and cost.

The existence of hydrocarbons in a formation may be indicated by the existence of strong correlations between the seismic signal generated by seismoelectric effects near the surface of the earth and the seismic signals generated by electroseismic effects at the formations of interest, at correlation times that correspond to known seismic transit times between hydrocarbon formations and the surface of the earth. These seismic transit times can be obtained explicitly from seismic data obtained in the area of interest or can be estimated based on rock acoustic properties.

The spectral properties may be correlated with the presence of various fluids in subterranean pore spaces based on a variety of classification methodologies. For example, statistical regression analysis, and statistical classifiers such as neural networks, decision trees, Bayes-based classifiers, fuzzy logic-based classifiers, and conventional statistical classifiers may all be used to determine a frequency-depth relationship. For example, the analysis may be performed with the system and methods described herein at locations with known properties and formation characteristics to train and/or determine the correlation parameters. Once the parameters have been determined (e.g., once a neural net has been trained), the system and methods may be repeated in a new location.

The spectral properties may also be used to develop a frequency-depth function. A frequency-depth function may be established using known locations, parameters, and/or calculations to allow the depth values for similar locations to be determined once the spectral characteristics of the signals are analyzed and determined. The frequency-depth relationship for seismic signals may depend on the Earth's resistivity, formation properties, types of components present, and, more generally, the electrical properties for a particular area and corrections may need to be applied to the spectral properties from location to location. In some instances, the frequency-depth correlation variation from area to area may not be so great that for many purposes an approximate or a more or less typical frequency-depth function may be used. For example, a frequency-depth function may be derived from empirical data taking into consideration various locations that have been reported in the literature. This function may be considered more or less representative of the "typical" relationship between frequency and depth. Other suitable sources of data may be considered including, for example, an approximate frequency-depth function derived from conventional skin effect conductivity analyses. The resulting typical frequency-depth function may be used to derive depth information for the corresponding detected electromagnetic signal of interest based on the analysis described herein. In an embodiment, the frequency-depth relationship is determined based on a classification method comprising at least one method selected from the group consisting of: a neural network, a decision tree, a Bayes-based classifier, a fuzzy logic-based classifier, and a conventional statistical classifier.

In still another embodiment, the various properties of the subterranean formation including the frequency-depth function may be determined by developing a geological model of the subterranean formation. Various modeling programs may be used to develop the model of the subterranean formation and can provide predicted outputs based on the model. The predicted outputs can then be compared with the detected signals (e.g., a detected seismic signal) to determine if the model is accurate. When a discrepancy is detected, the geological model can be altered and the process repeated. Such a process may result in a match between the geological model and the detected signal, thereby providing one or more properties of the subterranean formation.

The processing described herein may be used to determine the existence of a fluid in a subterranean formation as well as other properties of the subterranean formation. In an embodiment, the processing of the seismic signal may provide an indication of at least one property of a subterranean formation including, but not limited to, an existence of the subsurface earth formation containing at least one fluid, a depth of the subsurface earth formation, a porosity, a fluid permeability, a composition of at least one fluid within the subsurface earth formation, a spatial extent of the subsurface earth formation, an orientation of the boundaries of the subsurface earth formation, a resistivity, and any combination thereof. Further, the processing may detect one or more fluids within the subterranean formation, where detectable fluids may include, but are not limited to, an aqueous fluid, a hydrocarbon, a petroleum, and any combination thereof.

While the measurement of a signal at a single location followed by an analysis of that signal has been described herein, the detection and analysis steps may be repeated any number of times. For example, multiple measurements may be made at a single location over several time periods. The results may be statistically analyzed to provide an improved accuracy correlation and/or survey. In addition, one or more samples may be taken at varying locations sequentially in time or concurrently in time using one or multiple sensors. For example, multiple measurements may be made at varying locations around a site of interest. Various grid patterns and/or random sample locations may be chosen to generate a plurality of measurements across an area. For example, the grid and/or array of detectors described above may be used to generate a plurality of detected signals for use with the processing techniques described herein. The multiple measurements may be performed sequentially or concurrently (e.g., using multiple sensors) at a single location, and/or the measurements may be performed sequentially and/or concurrently in the various locations around a site of interest when a plurality of locations are used to measure the signal of interest. The resulting hydrocarbon indications and resulting depth measurements may be used to generate a two dimensional, a three dimensional, and/or a four dimensional model (e.g., where the fourth dimension is time) of a subterranean formation and the one or more fluids contained therein.

Passive, Sequential Surveying and Processing

In an embodiment, passive surveying may be carried out by sequentially detecting and/or separately processing an electromagnetic signal and a seismic signal. For example, the detection of both an electromagnetic signal and a seismic signal may occur at different times and/or locations. The two signals may be cross-correlated to some degree to determine if one or more fluids are present in a subterranean formation of interest. In this embodiment, the seismic signal may be detected using any of the seismic sensor configurations described above, including the use of a plurality of seismic sensors configured in an array. Similarly, the electromagnetic signal may be detected using any of the electromagnetic sensor configurations described above, including the use of a plurality of electromagnetic sensors configured in an array. The electromagnetic signal may comprise a modulated electromagnetic signal and/or the electromagnetic signal directly originating from the electroseismic and seismoelectric conversions. The electromagnetic signal and/or the seismic signal may comprise nonlinear components and/or responses.

The cross-correlation of the electromagnetic signal and the seismic signal, which may also be referred to in some contexts as joint processing, may be used to identify the features that are common in both detected data sets. Electroseismic and seismoelectric signals originate in the same physical conversion mechanism at boundaries between dissimilar rocks or at boundaries between different fluids in rock pore spaces, as described in more detail above. However, the seismic detectors and the electromagnetic field detectors may not be equally sensitive to rapid signal changes or to small signal amplitude differences. Thus, the processed electromagnetic signal and the seismic signal may be similar but likely will not be identical. The use of a cross-correlation may be used to enhance and/or isolate the common information in both data sets. Several methods are known to those skilled in the art for comparing the information in the two measurements with the goal of learning more about subterranean features of interest.

In an embodiment, the cross-correlation of the electromagnetic signal and the seismic signal may be carried out at a variety of points in the analysis of each signal as described above with respect to the processing of the electromagnetic signal alone and the seismic signal alone. In general, the cross-correlation of the electromagnetic signal and the seismic signal may be carried out on a data set using the same or similar processing for each data set to allow for the comparison of similar data sets. For example, both the electromagnetic signal and the seismic signal may be optionally pre-processed using one or more similar filters and then cross-correlated. In other embodiments, the electromagnetic signal and the seismic signal may be cross-correlated following the demodulation of the signal or after any additional processing is performed.

The sequential detection and/or separate processing an electromagnetic signal and a seismic signal described herein may be used to determine the existence of a fluid in a subterranean formation as well as other properties of the subterranean formation. In an embodiment, the processing of the electromagnetic signal and the seismic signal may provide an indication of at least one property of a subterranean formation including, but not limited to, an existence of the subsurface earth formation containing at least one fluid, a depth of the subsurface earth formation, a porosity, a fluid permeability, a composition of at least one fluid within the subsurface earth formation, a spatial extent of the subsurface earth formation, an orientation of the boundaries of the subsurface earth formation, a resistivity, and any combination thereof. Further, the sequential detection and/or separate processing may detect one or more fluids within the subterranean formation, where detectable fluids may include, but are not limited to, an aqueous fluid, a hydrocarbon, a petroleum, and any combination thereof.

Passive, Simultaneous Surveying and Processing

In an embodiment, passive surveying may be carried out by detecting both an electromagnetic signal and a seismic signal at overlapping time intervals to allow for cross-correlation of the two detected signals. The resulting signals may then be processed to determine if one or more fluids are present in a subterranean formation of interest. In this embodiment, an electromagnetic and seismic signal may be detected using any of the sensor configurations described above, including the use of a plurality of sensors configured in an array.

In an embodiment, processing of the detected signals may comprise cross-correlating the detected electromagnetic field with the detected seismic signal and isolating at least a portion of the detected seismic signal arising from the electroseismic conversion. The ability to isolate the detected seismic signal arising from the electroseismic conversion may depend on the various components (e.g., desired signal versus noise components) of the detected electromagnetic field and/or the detected seismic signal. For example, the amplitude of the earth's electromagnetic field in the detected electromagnetic field and the seismic waves resulting from the electroseismic conversion within the subsurface earth formation in the detected seismic signal may be smaller than the various noise levels at the electromagnetic field detectors and/or seismic sensors. Various processing techniques may be used when an increase in the signal-to-noise ratio and/or removal of at least a portion of the noise in the detected electromagnetic field and the detected seismic signals is needed. In an embodiment, at least one processing technique may be used to eliminate at least a portion of a coherent noise and/or a random noise in the detected seismic signal and/or the detected electromagnetic field. Each of these processing techniques will be described in more detail below.

Coherent noise refers to cyclic electromagnetic and/or seismic signals that have an approximately constant frequency over a predetermined measurement period. Many coherent, electromagnetic noise sources can be found in a typical measurement setting and can be accounted for through various processing techniques. For example, the power-line frequency of 60 Hertz (Hz) can generate a high amplitude electromagnetic signal that can propagate into the earth, where the resulting amplitude at the one or more electromagnetic field detectors may be hundreds or thousands of times larger than the desired background electromagnetic field within the earth. Similarly, unbalanced power-lines can generate 180 Hz noise and motors can generate 400 Hz noise. As a further example, cathodic protection circuits can produce poorly-rectified alternating current (AC) signals at several frequencies that result in electromagnetic noise at the one or more electromagnetic field detectors. In order to improve the signal-to-noise ratio, at least a portion of the noise may be removed from the detected electromagnetic field.

In an embodiment, at least a portion of coherent noise may be removed from the detected electromagnetic field through the use of data intervals having selected start times and durations. The intervals may be non-overlapping and the start times may be chosen so that a portion of the detected electromagnetic field is not taken into consideration in a data interval. The data points within the data intervals may then be summed to remove at least a portion of the coherent noise and/or improve the signal-to-noise ratio of the detected electromagnetic field through cancellation of the overlapping coherent noise signal. In order to facilitate the selection of the intervals, the detected electromagnetic field and the detected seismic signal may be recorded and the intervals selected from the recorded data. In an embodiment, the intervals may be processed in real time, using for example a transitory storage medium, to temporarily store the data in the intervals during removal of the coherent noise. In this embodiment, only the final signal having an improved signal-to-noise ratio and/or a reduced noise content may be recorded.

In an embodiment, a start time may be chosen to correspond to the zero crossing voltage of a coherent noise source. For example, the start time for a first interval may be selected to occur where the 60 Hz voltage crosses zero volts. After collecting data for a given duration, the start time for the next interval may be chosen as the zero crossing voltage plus some additional time period. In an embodiment, the additional time period may correspond to an irrational number or a whole number fraction of an irrational number. For example, the irrational number may be $\pi$, though other irrational numbers may also be used. For example, the start time for the second interval in the example above may be chosen to correspond to the 60 Hz zero crossing voltage plus a small time that is not an even fraction of the 60 Hz period, which is 16.666 milliseconds (ms) for the 60 Hz signal. If the second and subsequent intervals have a predetermined start time corresponding to the 60 Hz zero crossing plus a cumulative time of $\pi/10,000$ (i.e., 0.31416 microseconds ($\mu s$)) for each additional interval, then the collection of the data during the data interval will never repeat the 60 Hz phase of the first interval. In other words, each start time would begin 0.31416 $\mu s$ beyond the start time of the preceding interval relative to the time corresponding to the zero crossing voltage. By adding a plurality of the resulting data intervals, the positive amplitudes (e.g., positive voltage portions) of the coherent signals will cancel with the negative amplitudes (e.g., negative voltage portions) of the coherent signals such that any coherent noise sources will not add up in the data collection process. By this technique, at least a portion of the coherent noise may be removed from the detected electromagnetic field.

In general, coherent noise sources may not have exactly constant frequency over a predetermined measurement period. These imperfections may be due to phase changes in the coherent noise sources. For example, electromagnetic noise generated by power lines can experience some variations in the power-line voltage. The method described herein may comprise monitoring the phase of the coherent noise source to adjust the start times to correspond to the phase of the coherent noise for each interval. The coherent noise source may also experience amplitude variations over time, which may result in a partial cancellation of the coherent noise upon the summing of the intervals. In an embodiment, a frequency filter (e.g., a frequency notch filter) may be applied to the detected electromagnetic field to further enhance the signal-to-noise ratio and/or reduce a portion of the coherent noise in the background electromagnetic field.

As a second coherent noise cancellation method, the start time may be chosen to correspond to events (e.g., large amplitude spikes) in the in the earth's electric and/or magnetic fields. If these events occur at random intervals in time, then effective coherent noise cancellation may be achieved through summing of the resulting data intervals. The number of events may vary from location to location and from time to time. As a result, this method may not yield as many data collection intervals per day as frequency based method, which may result in a slower data interval collection.

Slower data collection resulting from choosing the predetermined start time to correspond to an event in the earth's electric and/or magnetic fields may be balanced by concentrating on the largest peak events in the earth's electric and/or magnetic fields. Events comprising low amplitude electric and/or magnetic fields may result in low-amplitude seismic waves, which may be difficult to detect in the presence of noise. In order to select larger events and suppress the low amplitude peaks in the earth's electric and/or magnetic fields, the detected electromagnetic field and the detected seismic signal data may be squared while retaining the sign. Cross-correlation of the squared detected electromagnetic field and detected seismic signal data may then result in the selection of the largest events while suppressing the small-amplitude noise.

The duration of the data intervals may comprise any period of time sufficient to include at least one coherent noise cycle. The frequency of the coherent noise, and thus the period of time of a coherent noise cycle, may be estimated based on localized sources of electromagnetic noise or measured using an electromagnetic field detector. In an embodiment, the predetermined duration comprises a time of at least a plurality of coherent noise cycles. In an embodiment, the duration comprises a period of time of between about 10 seconds and about 100 minutes, alternatively between about 30 seconds and about 10 minutes.

In an embodiment, each interval in the plurality of intervals does not overlap with any other interval and each interval may have a period of time between successive intervals in which the data are not considered. The period of time between intervals may be the same between each interval or may vary between the intervals. In an embodiment, the period of time between the intervals may comprise an uneven fraction of a coherent noise cycle or an uneven fraction of a coherent noise cycle plus an amount of time corresponding to a whole number of coherent noise cycles. In an embodiment, the period of time between intervals may comprise a fraction of $\pi$. For example, each interval may have a period of time between intervals of a time of $\pi/10,000$ (i.e., 0.31416 $\mu s$), as described in the example above. As an alternative example, one or more full cycles of the coherent noise may be allowed to pass before beginning the next interval at a start time according to one of the methods disclosed herein. This may allow for system processing and/or recording latencies to be taken into account between data intervals.

The techniques used to remove at least a portion of coherent noise from the detected electromagnetic field may also be applied to the detected seismic signal. Various sources of coherent seismic noise may be present in a typical measurement setting, including for example, motor noise, industrial equipment, etc. It should be noted that the start time and duration for each corresponding interval of both the detected electromagnetic field and the detected seismic signal are the same so that the signals can be cross-correlated. In an embodiment, the start time and duration may be chosen to allow cancellation of at least a portion of the coherent noise in both the detected electromagnetic field and the detected seismic signal.

In an embodiment, a method of removing at least a portion of a coherent noise signal may use the techniques described above. In an embodiment, a method comprises generating a detected electromagnetic field by detecting the earth's electromagnetic field within the earth, and generating a detected seismic signal by detecting a seismic wave related to the earth's electromagnetic field. The detected electromagnetic field and the detected seismic signal may optionally be recorded, though processing of the detected signals without first being recorded may also be used. A first signal may be generated by adding a plurality of intervals of the detected electromagnetic field, where each of the plurality of intervals of the detected electromagnetic field begins at a start time and continues for a duration. A second signal may be generated by adding a plurality of intervals of the detected seismic signal corresponding to the plurality of intervals of the detected electromagnetic field, wherein each of the plurality of intervals of the detected seismic signal begins at the start time and continues for the duration. Processing of the first signal and the second signal may then be performed to determine at least one property of the subsurface earth formation. The number of the plurality of intervals may be chosen to produce a predetermined signal-to-noise ratio and/or remove a predetermined amount of a coherent noise in one or more of the detected signals at one or more of the sensors.

Additional processing techniques may be used to eliminate at least a portion of a coherent noise and/or a random noise in the detected electromagnetic field and/or the detected seismic signal. As discussed above, the electroseismic conversion between electromagnetic and seismic energy may occur when ions in pore fluids are displaced relative to grain interfaces within the pores of a rock in a subsurface earth formation. The displaced ions may impose a force on the fluid in the pore space and the pore surfaces. The moving fluids and displaced ions may track each other and may be expected to have a corresponding, though not necessarily identical, time dependence. In other words, the electroseismic conversion may generate a seismic response to a time-dependent electromagnetic field with a corresponding time dependence. Accordingly, the resulting seismic wave may have the same time-dependence as the earth's background electromagnetic field, only delayed by the seismic travel time. The electromagnetic signal travel time may be neglected since the electromagnetic propagation time down to the reservoir is much shorter than the seismic travel time to the surface. This result may be used to remove at least a portion of a noise signal that does not possess the expected time dependence between the detected electromagnetic field and the detected seismic signal.

In addition to the expected time dependence, the seismic wave characteristics may be used to remove at least a portion of a noise signal in the detected seismic signal. The detected seismic signal resulting from the electroseismic conversion of the earth's background electromagnetic field at a horizontal reservoir interface can be assumed to be a vertically-traveling plane wave, as described in more detail above. Even inhomogeneous reservoir interfaces that on average are horizontal can produce vertical plane waves. The vertical plane wave may arrive at all of the seismic sensors at the same time, and accordingly, may not have any horizontal components. This result may be used to remove at least a portion of a noise signal by accounting for detected seismic signal components that are not common to all of the seismic sensors and/or that do not represent a plane wave propagating from a subsurface earth formation.

In order to determine at least one property of the subsurface earth formation, the detected electromagnetic field and the detected seismic signal may be processed, for example, using a cross-correlation of the detected signals. Cross-correlation of the background electromagnetic field with the detected seismic signal from one or more seismic sensors may produce a peak in amplitude corresponding to the seismic travel time. When a plurality of seismic sensors are used to generate one or more detected seismic signals, the result of the cross-correlation between the background electromagnetic field and the detected seismic signal should be the same for each seismic sensor. Local sources of noise (e.g., non-uniform noise sources) may corrupt this expectation, and the differences may be used to remove at least a portion of the noise signal. For example, when considering a pseudo-random noise source with a non-repeating character, the cross-correlation of the detected electromagnetic field and the detected seismic signal may be convoluted with the autocorrelation of the detected electromagnetic field.

In an embodiment, local sources of noise may be rejected using several methods. First, the detected seismic signals from each of the seismic sensors may be filtered in the spatial domain to reject surface waves traveling across the plurality of seismic sensors. The filter may use at least a portion of the horizontal component of the detected seismic signal across the plurality of seismic sensors to remove at least a portion of a noise signal from the detected seismic signal at each seismic sensor. In an embodiment, only a portion of the seismic sensors may be configured to measure a horizontal component of the seismic wave, and these seismic sensors may be used to generate the horizontal components used in the spatial filter. In an embodiment, each of the plurality of seismic sensors may be configured to measure a horizontal component of the seismic wave, and each of the plurality of seismic sensors may be used with the filter in the spatial domain to reject surface waves traveling across the plurality of seismic sensors.

Second, a horizontal component of the detected seismic signal may be used as a predictive filter to remove local noise from the vertical component of each seismic sensor. The filter may utilize one horizontal component or two horizontal components as detected by the seismic sensor. This predictive filter may be applied to each seismic sensor of the plurality of seismic sensors that is configured to measure a horizontal component of the seismic wave.

This noise cancellation method may also be used with the detected electromagnetic signal. In an embodiment, a horizontal component of the detected electromagnetic signal may be used with a predictive filter to remove noise from the vertical component of the detected electromagnetic field. The predictive filter may utilize one horizontal component or two horizontal components as detected by the one or more electromagnetic field detectors. This predictive filter may be applied to each electromagnetic field detector of the plurality of electromagnetic field detectors.

Third, local noise waves may propagate across the plurality of seismic sensors in expected spreading patterns, which may be analogous to water waves on a pond. The propagating noise waves may be suppressed by determining the direction of travel and speed, and applying a spatial filter that makes use of the spreading symmetry of the noise wave. The spatial filter may remove the local noise from the detected seismic signals at each sensor having affected by the noise. In an embodiment, a predictive filter may be employed to predict the arrival and amplitude of the local noise wave at a seismic sensor and remove the local noise wave during the generation of the detected seismic signal. In an embodiment, only a portion of the seismic sensors may be configured to measure a horizontal component of the seismic wave, and these seismic sensors may be used to determine the spreading geometry of the local noise wave. The spatial filter may then be applied to each of the plurality of seismic sensors, including those that are not configured to measure a horizontal component of the seismic wave. In an embodiment, each of the plurality of seismic sensors may be configured to measure a horizontal component of the seismic wave, and each of the plurality of seismic sensors may be used to predict and verify the spreading geometry of the local noise wave used with the spatial filter. In an embodiment, one or more additional seismic sensors at a distance away from the plurality seismic sensors may be used to measure a seismic wave, which may include the local noise wave. The ability to measure the local noise wave at a distance from the plurality of seismic sensors may provide better prediction of the local noise wave and an improvement of the reduction of the local noise wave in the detected seismic signal.

Fourth, the detected seismic signals may be cross-correlated, and the cross-correlated data from all of the seismic sensors may be summed. The resulting summed data may be used as a predictive filter to enhance spatial continuity across the plurality of seismic sensors. The summing of the data may result in an increase in the amplitude of the seismic waves arriving at the same time, for example from a plane wave. Any seismic components resulting from a noise source traveling across the plurality of seismic sensors and/or any components that are not traveling as a plane wave will tend not to add. As a result, the summed data may be used to identify the seismic waves resulting from an electroseismic conversion and identify the other seismic components as local noise sources.

Fifth, the assumption that the seismic wave resulting from the electroseismic conversion can be represented as a plane wave may be used to remove at least a portion of a noise signal from the detected seismic signal from one or more of the seismic sensors. In an embodiment, a dip filter can be used to reject detected seismic signals arriving at a non-normal angle to the plurality of seismic sensors. In an embodiment, the dip filter may be applied after cross-correlating the detected seismic signals from two or more of the seismic sensors.

In an embodiment, the application of one or more of the methods disclosed here may result in the suppression of at least a portion of a noise source in a detected field and/or signal. When at least a portion of the noise source is removed, the cross-correlation between two or more detected seismic signals may more closely approximate an autocorrelation of each detected seismic signal from each seismic sensor. Differences between the cross-correlation and the autocorrelation may be due, at least in part, to differences in the detected seismic signal amplitudes at each seismic sensor due to ground inhomogeneities and/or seismic scattering. The processing of the detected electromagnetic field and the detected seismic signal with a reduction in at least one noise signal may then be used to determine at least one property of the subsurface earth formation.

In addition to the detected electromagnetic field and the detected seismic signal, other detected signals may also be used to determine at least one property of the subsurface earth formation. For example, nonlinear electroseismic conversions may produce signals useful during processing. In an embodiment, nonlinear, harmonic signals having frequency components at higher frequency harmonics of the source's fundamental frequency (i.e., those frequencies present in the earth's background electromagnetic field) may be detected as a result of distortions of the background electromagnetic field interacting with the subsurface earth formation containing at least one fluid. The harmonic signals may be processed alone or in conjunction with the fundamental frequencies of the detected seismic signal and/or the detected electromagnetic field to determine one or more properties of the subsurface earth formation. In an embodiment, the harmonic signals may be present, detected, and/or isolated in both the detected electromagnetic field and the detected seismic signal.

One or more harmonic signals may be detected and/or isolated in the detected seismic signal using a variety of methods. In an embodiment, the detected seismic signal may be cross-correlated with the detected electromagnetic field. A frequency analysis of the data resulting from the cross-correlation may be used to identify frequencies in the detected seismic signal that are higher than those present in the detected electromagnetic field. The frequencies present in the detected electromagnetic field may then be used to remove (e.g., using a filter) at least a portion of the corresponding frequencies (e.g., the fundamental frequencies) from the detected seismic signal and detect and/or isolate one or more of the harmonic signals. In an embodiment, the harmonic signal may comprise a coherent harmonic signal.

In an embodiment, the harmonic signals may be detected and/or isolated in the detected seismic signal by partially rectifying the detected seismic signal and/or the harmonic signals detected and/or isolated from the detected seismic signal. The harmonic signals may resemble a partially-rectified sine wave, which may be asymmetrical about zero amplitude. In an embodiment, the positive amplitudes may be larger than the negative amplitudes. The resulting asymmetry may be utilized by arbitrarily reducing the positive portions of the source waveform before cross-correlation. In an embodiment, the negative amplitudes may be larger than the positive amplitudes. The resulting asymmetry may be utilized by arbitrarily reducing the negative portions of the source waveform before cross-correlation. Signal measurement and processing may be used to determine which portion of the amplitude (i.e., the positive amplitude portion or the negative amplitude portion), if either, is larger.

The detected seismic signal may be filtered prior to cross-correlating the detected harmonic signals in the detected seismic signal with the detected electromagnetic field and/or one or more harmonic signals in the detected electromagnetic field, which are described in more detail below. An autocorrelation of the detected electromagnetic field may have lower frequency components than the autocorrelation of the detected seismic signal from one or more of the seismic sensors. In an embodiment, the detected seismic signal may be band-pass filtered to remove frequencies below the fundamental frequencies present in the detected electromagnetic field, which may be used to identify the harmonic signals. The filter may be applied before processing the detected seismic signal and the detected electromagnetic field.

In an embodiment, the detected harmonic signals may be processed with the detected electromagnetic field to determine at least one property of the subsurface earth formation. In an embodiment, the processing of the detected harmonic signals with the detected electromagnetic field may comprise cross-correlating the detected harmonic signals with the detected electromagnetic field.

One or more nonlinear signals may be detected and/or isolated in the detected electromagnetic signal using a variety of methods. The nonlinear signals in the detected electromagnetic field, which may include harmonic signals, may result from the conversion of the electromagnetic energy in the earth's background electromagnetic field to seismic energy, as described in more detail above. This point of conversion may also result in a frequency shift or time delay in the electromagnetic energy in the earth's background electromagnetic field, generating nonlinear signals. At least a portion of the resulting nonlinear signals may be detected by the electromagnetic field detectors and used to determine at least one property of the subsurface earth formation.

Without intending to be limited by theory, it is believed that the point of electroseismic conversion may also produce nonlinear electromagnetic conversions that may be detected and/or isolated in the detected electromagnetic signal. As discussed above, the electroseismic energy conversion may occur at the boundary between two types of rock. For example, the electroseismic energy conversion may occur at the boundary between reservoir rock and the sealing and/or confining rock. Alternatively, electroseismic energy conversion may occur at an interface between pore fluids, for example, between oil and water. At the rock and/or fluid interfaces there may be a gradient in the chemical potential. For example, at the boundary between a silicate rock and a carbonate rock, a chemical reaction may occur in the commingled pore fluids. For example, the silicate may dissolve the carbonate, and the silicate ions in solution may react with the carbonate ions in solution. The overall reaction may be driven by a gradient in the chemical potential at the interface. The reaction product between positive and negative ions in solution is electrically neutral and may precipitate out of solution. When a precipitate is formed, the resulting deposition of the precipitate strengthens the rock, increases it hardness, and increases the electrical resistivity of the interface. During the reactions in pore spaces, concentration gradients of charged ions may be created within the pore fluids.

These concentration gradients may produce an electrochemical-potential gradient which may manifest itself as a macroscopic electrical potential gradient. The internal electrical potential gradients at the interfaces may create internal stresses, and the interaction of the earth's background electromagnetic field with the electrochemical-potential gradient may change these internal stresses. Due to the natural modulations in the earth's background electromagnetic field, the internal stresses may be modulated, accounting for the nonlinear electroseismic conversions that may be measured and used with the systems and method disclosed herein.

In an embodiment, the interface where electroseismic conversions occur can be modeled as a charged capacitor that comprises a planar region of high resistance and an existing, internal electromagnetic field. The interface can then be understood as having a resistor-capacitor (RC) time constant. The RC time constant may vary over a considerable range of values depending on the resistance of the rock interface and the internal electric field. The RC time constant may have the effect of smoothing out a portion of the background electromagnetic field, which may be detected by one or more of the electromagnetic field detectors. In an embodiment, the extent of the resulting smoothing of the background electromagnetic field may be used during processing to determine at least one property of the subsurface earth formation.

The background electromagnetic field may be modified depending on the orientation of the background electromagnetic field with respect to the interface. When the background electromagnetic field is parallel to the internal electric field at the interface, the internal field and internal stresses may not be modified significantly. In this orientation, the interface behaves as a simple resistor of high value with mobile fluids in the pore space, and the RC time constant may not significantly affect the background electromagnetic field. However, some of the electrical field energy may be converted into seismic energy in the electroseismic response.

When the background electromagnetic field is anti-parallel with respect to the internal field at the interface, the internal chemical reactions may be temporarily halted, the stresses and effective resistance may be reduced, and the net electric field may decrease. In this orientation, the applied field (e.g., the earth's background electromagnetic field) may be at least partially rectified to a reduced value and the change in internal stresses may produce a seismic response. In terms of the overall subsurface earth formation, the earth's background electromagnetic field may be at least partially rectified at the boundaries between rock masses. As a result, the earth's background electromagnetic field that is interacting with a charged dipole layer where an electroseismic conversion occurs may be altered, and the alterations may be detected by one or more background electromagnetic field detectors. By detecting and processing the resulting electromagnetic field signals, at least one property of the subsurface earth formation may be determined.

In an embodiment, the partial rectification of the background electromagnetic field may be used to determine an orientation, resistivity, or both of at least one interface in the subsurface earth formation. The apparent subsurface resistivity may depend on the background electromagnetic field's polarization. In one polarity of the background electromagnetic field, the conversion surface looks like a simple resistor. In the opposite polarity it appears to be a capacitor with a long RC time constant. This time constant may at least partially smooth out one polarity of the source signal, resulting in one polarity having an observable induced polarization while the opposite polarity may not. The degree of induced polarization may act as an indicator of the resistivity of the interface, and the determination of the polarity being affected may act as an indicator of the orientation of the rock interface.

The properties of the background electromagnetic field may be spatially dependent, allowing for a determination of the lateral extent of the subsurface earth formation structure. The extent of the lateral variation in the induced polarization and generation of nonlinear signals may be smoothed out due of the long wavelengths present in the earth's background electromagnetic field. As a result, the detected electromagnetic field may have a limited resolution with respect to the edges of the reservoir.

In an embodiment, low frequency measurements (e.g., below 1 Hz) of the earth's background electromagnetic field may be useful in measuring the polarity dependence of the induced polarization. In the measurements of the seismic signals resulting from the electroseismic conversions, the seismic wavelengths may be useful for spatial delineation and the seismic velocity may be useful for depth determination. In these measurements, frequency and time information may be important characterizations. In an embodiment, the frequency and time information may be determined by integrating the amplitudes of different polarities in the detected electromagnetic field and the detected seismic signal from one or more seismic sensors.

The nonlinear signals in the detected electromagnetic field resulting from the conversions at the subsurface earth formation interfaces may be detected using a variety of methods. In an embodiment, the positive and negative polarities of the earth's background electromagnetic field may have different amplitudes and different frequency spectra after being affected by the interface. These differences may be used in determining the nonlinear components of the detected electromagnetic field. The resulting linear electroseismic response may be detected from the detected seismic signal at one or more seismic sensors. Through a cross-correlation, the resulting linear components of the detected electromagnetic field may be determined and isolated. Using the linear components as a filter, the non-linear components may be isolated from the detected electromagnetic field. The filtered electromagnetic field may be further processed to identify the nonlinear components or reduce any noise signals present in the remaining detected electromagnetic field after being filtered. For example, additional filters may be applied and/or autocorrelations performed.

In an embodiment, the detected electromagnetic field may be compared to the earth's background electromagnetic field measured at a distant location. The detected electromagnetic field may have harmonic frequencies and low frequencies that are not present in a signal measured at a distant point.

In this embodiment, a detected electromagnetic field at a distant electromagnetic field detector may be used to filter the detected electromagnetic field above the subsurface earth formation of interest. The remaining signal present after applying the filter may contain the various harmonic, non-linear, and/or low frequencies of interest. These signals may be further processed or filtered, for example to remove one or more noise signals.

In an embodiment, any harmonic, nonlinear, and/or low frequencies present in the detected electromagnetic field above the subsurface earth formation of interest may be detected by comparing the detected electromagnetic field measured in the earth to those measured in the atmosphere. If the earth's background electromagnetic field modulation creates a seismic response, then the surface where energy conversion occurs may behave as a source of electromagnetic radiation since there is a finite region of modulated electromagnetic field and charge separation. The earth's background electromagnetic field within the earth may itself take on a character reflecting the nonlinear conversion. The resulting electromagnetic radiation may manifest itself as a change in boundary conditions at the earth's surface. Specifically, the resulting electromagnetic radiation may create a vertical electric field that may not be continuous across the earth/atmosphere boundary. The use of a detected electromagnetic field above the surface of the earth may be used to filter the detected electromagnetic field within the earth. The remaining signal present after applying the filter may contain the various harmonic, nonlinear, and/or low frequencies of interest. These signals may be further processed or filtered, for example to remove one or more noise signals.

The processing described herein may be used to determine the existence of a fluid in a subterranean fluid as well as other properties of the subterranean formation. In an embodiment, the processing of the electric/electromagnetic signal and the seismic signal may provide an indication of at least one property of a subterranean formation including, but not limited to, an existence of the subsurface earth formation containing at least one fluid, a depth of the subsurface earth formation, a porosity, a fluid permeability, a composition of at least one fluid within the subsurface earth formation, a spatial extent of the subsurface earth formation, an orientation of the boundaries of the subsurface earth formation, a resistivity, and any combination thereof. Further, the processing may detect one or more fluids within the subterranean formation, where detectable fluids may include, but are not limited to, an aqueous fluid, a hydrocarbon, a petroleum, and any combination thereof.

As noted above, the detection and analysis steps described herein may be repeated any number of times. For example, multiple measurements may be made at a single location over several time periods. The results may be statistically analyzed to provide an improved accuracy correlation and/or survey. In addition, one or more samples may be taken at varying locations sequentially in time or concurrently in time using one or multiple sensors. For example, multiple measurements may be made at varying locations around a site of interest. Various grid patterns and/or random sample locations may be chosen to generate a plurality of measurements across an area. For example, the grid and/or array of detectors (e.g., using about 10 to about 10,000 seismic sensors and/or electromagnetic field detectors) described above may be used to generate a plurality of detected signals for use with the processing techniques described herein. The multiple measurements may be performed sequentially or concurrently (e.g., using multiple sensors) at a single location, and/or the measurements may be performed sequentially and/or concurrently in the various locations around a site of interest when a plurality of locations are used to measure the signal of interest. The resulting hydrocarbon indications and resulting depth measurements may be used to generate a two dimensional and/or three dimensional model of a subterranean formation and the one or more fluids contained therein.

Additional Surveying Steps

In an embodiment, more information may be obtained about the subterranean formation by conducting one or more further surveys after any of the passive surveying techniques described herein have been carried out. For example, a seismological survey, a controlled-source electromagnetics survey, a controlled-source electroseismic survey, a controlled-source seismoelectric survey a gravity survey, and/or a magnetic survey may be conducted based on an indication of a fluid (e.g., a hydrocarbon) present in the subterranean formation of interest. In an embodiment, an additional passive survey may be performed as described herein. The additional passive survey may provide for more data over a greater number of sensors and/or detectors to obtain higher quality information about the subterranean formation. Thus, the system and methods described herein may be used in combination with other surveying techniques to provide information about a subterranean formation of interest. In an embodiment, a wellbore may be commenced and/or drilled into the subterranean formation when an envelope is detected in order to recover one or more hydrocarbons contained therein.

These systems and methods may have several advantages over previous prospecting techniques. The detection of an electroseismic conversion allows for the detection of an electromagnetic signal and a generated seismic response, alone or in combination. As a result, the passive surveying system allows for surveying without an active electromagnetic energy source, which may improve site safety and reduce any environmental impacts. The reduction in the amount of equipment and power, along with the corresponding reduced footprint at the measurement site, represents an advantage over other surveying systems and methods. From an environmental and health perspective, the reduction in transportation, site preparation, and high energy sources may improve the overall health and safety of the workers operating the equipment. In addition, the earth's naturally occurring electromagnetic field comprises a broad spectrum of frequencies, from sub-hertz frequencies to tens of thousands of hertz frequencies, along with a broad coverage over the surface of the earth. This broad spectrum allows for a broad range of penetration depths from tens of meters to tens of kilometers.

Computer Based Implementations

Figure 9:
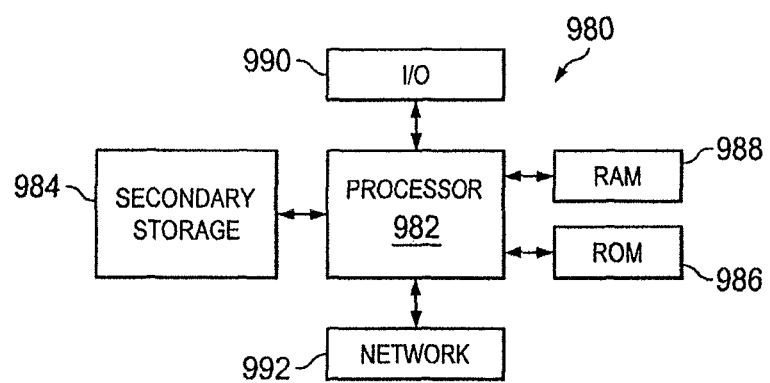
FIG. 9 is a schematic view of a computer useful with an embodiment.

The various methods disclosed herein for removing coherent and random noise sources and/or isolating and processing nonlinear signals may use real-time processing or may use data that has been recorded (e.g., post processing). In an embodiment, one or more of the methods disclosed herein may be implemented on any computer with sufficient processing power, memory resources, and network throughput capability to handle the necessary workload placed upon it. FIG. 9 illustrates a typical, computer system suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) devices 990, and network connectivity devices 992. The processor may be implemented as one or more CPU chips.

It is understood that by programming and/or loading executable instructions onto the computer system 980, at least one of the CPU 982, the RAM 988, and the ROM 986 are changed, transforming the computer system 980 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage 984. The RAM 988 is used to store volatile data and perhaps to store instructions. Access to both ROM 986 and RAM 988 is typically faster than to secondary storage 984. The secondary storage 984, the RAM 988, and/or the ROM 986 may be referred to in some contexts as computer readable storage media and/or non-transitory computer readable media.

I/O devices 990 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 992 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 992 may enable the processor 982 to communicate with the Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave.

Such information, which may include data or instructions to be executed using processor 982 for example, may be received from and outputted to the network, for example, in the form of a computer data baseband signal or signal embodied in a carrier wave. The baseband signal or signal embodied in the carrier wave generated by the network connectivity devices 992 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992. While only one processor 982 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 984, for example, hard drives, floppy disks, optical disks, and/or other device, the ROM 986, and/or the RAM 988 may be referred to in some contexts as non-transitory instructions and/or non-transitory information.

In an embodiment, the computer system 980 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 980 to provide the functionality of a number of servers that is not directly bound to the number of computers in the computer system 980. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 980, at least portions of the contents of the computer program product to the secondary storage 984, to the ROM 986, to the RAM 988, and/or to other non-volatile memory and volatile memory of the computer system 980. The processor 982 may process the executable instructions and/or data structures in part by directly accessing the computer program product, for example by reading from a CD-ROM disk inserted into a disk drive peripheral of the computer system 980. Alternatively, the processor 982 may process the executable instructions and/or data structures by remotely accessing the computer program product, for example by downloading the executable instructions and/or data structures from a remote server through the network connectivity devices 992. The computer program product may comprise instructions that promote the loading and/or copying of data, data structures, files, and/or executable instructions to the secondary storage 984, to the ROM 986, to the RAM 988, and/or to other non-volatile memory and volatile memory of the computer system 980.

In some contexts, a baseband signal and/or a signal embodied in a carrier wave may be referred to as a transitory signal. In some contexts, the secondary storage 984, the ROM 986, and the RAM 988 may be referred to as a non-transitory computer readable medium or a computer readable storage media. A dynamic RAM embodiment of the RAM 988, likewise, may be referred to as a non-transitory computer readable medium in that while the dynamic RAM receives electrical power and is operated in accordance with its design, for example during a period of time during which the computer 980 is turned on and operational, the dynamic RAM stores information that is written to it. Similarly, the processor 982 may comprise an internal RAM, an internal ROM, a cache memory, and/or other internal non-transitory storage blocks, sections, or components that may be referred to in some contexts as non-transitory computer readable media or computer readable storage media.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

Figure 10:
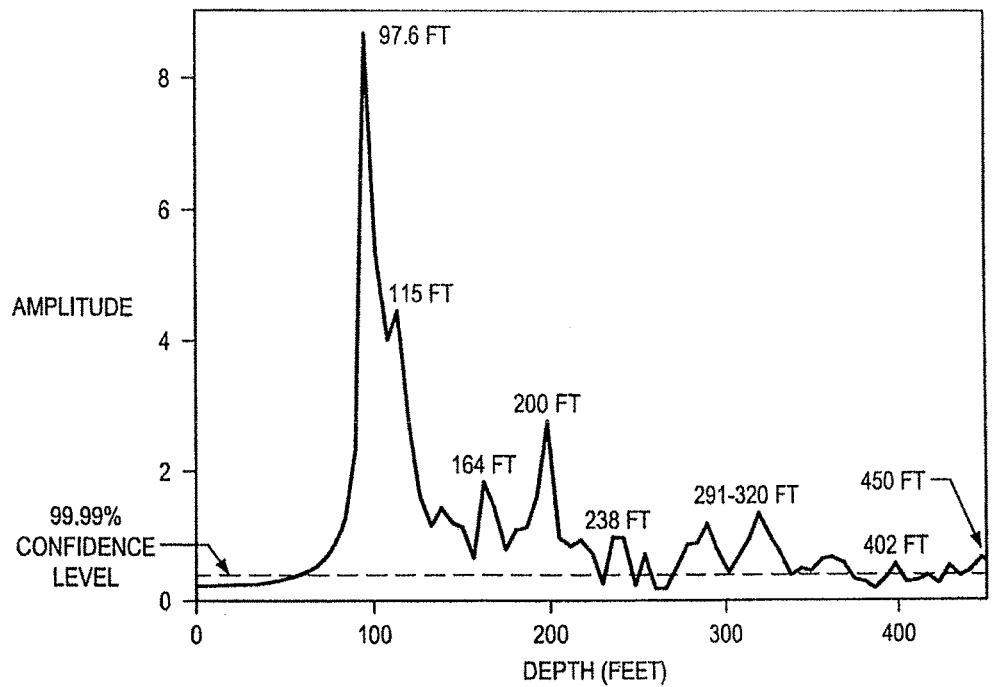
FIG. 10 illustrates passive seismoelectric test results using an embodiment of the system and methods disclosed herein.

Referring now to FIG. 10, the results of passive seismoelectric detection used to detect and process electromagnetic waves are shown. The processing of the detected signal illustrates characteristic depths of subterranean formations of interest. The data of FIG. 10 were collected at Harris County Tex. The subterranean features of interest are aquifers that are well-characterized by standard measurement methods and the depths of the subject aquifers are tabulated in the public domain. FIG. 10 displays the amplitude of seismoelectric signals on the vertical axis and the depth below the surface on the horizontal axis. The highest amplitude peaks on the data of FIG. 10 occur at depths corresponding to the known aquifer depths, which are known to occur at about 200 feet, about 300 feet, and about 400 feet. Additionally, the data of FIG. 10 have a peak near 100 feet that is the expected signal originating from seismic waves traveling between the aquifers at 200 and 300 feet.

Example 2

Figure 11:
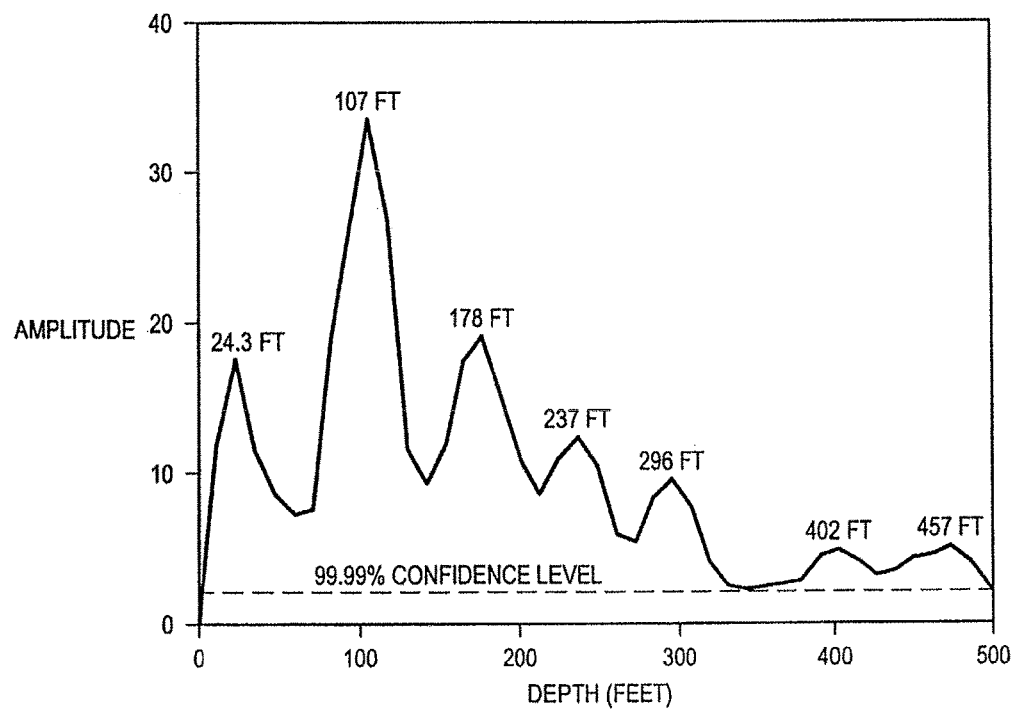
FIG. 11 illustrates passive electroseismic test results using an embodiment of the system and methods disclosed herein.

Referring now to FIG. 11, the results of passive electroseismic testing used to detect and process a seismic signal are shown. The processing of the seismic signal illustrates characteristic depths to subterranean formations that were also detected with the seismoelectric testing of Example 1. The seismic testing reveals additional subterranean structures not found with the seismoelectric test. Those skilled in the art will recognize that seismic waves have shorter wavelengths than electromagnetic waves. The shorter wavelengths of seismic waves enable seismic detectors to resolve additional structures that are not visible to electromagnetic waves. FIG. 11 has peaks indicating structures near 100 feet, 200 feet, 300 feet, and 400 feet. A peak at 24 feet is expected as a seismic wave originating at the near-surface water table. Double peaks near 100 feet, 200 feet, and 400 feet are expected to arise from electroseismic conversions at both the top and bottom of aquifers.

Example 3

Figure 12:
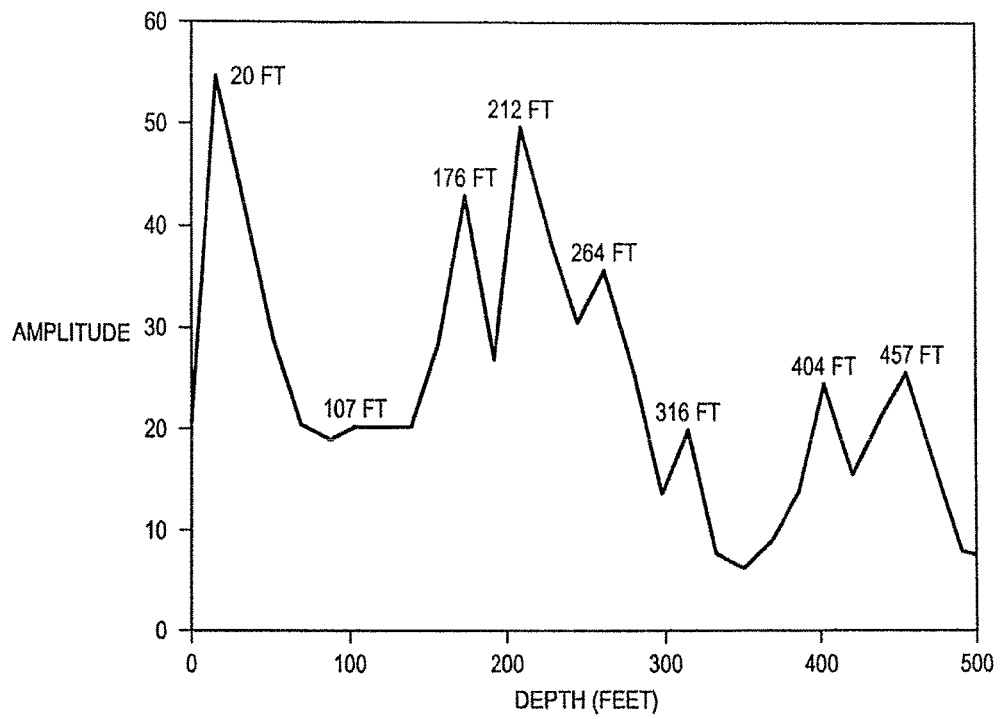
FIG. 12 illustrates combined passive electroseismic and seismoelectric test results using an embodiment of the system and methods disclosed herein.

Referring now to FIG. 12, cross-correlation (i.e., joint processing) of the results of Example 1 (shown in FIG. 10) and Example 2 (shown in FIG. 11) shows the features that are common in the FIG. 10 and FIG. 11 data sets. Electroseismic and seismoelectric signals originate in the same physical conversion mechanism at boundaries between dissimilar rocks or at boundaries between different fluids in rock pore spaces. The seismic detectors and the electromagnetic field detectors are not equally sensitive to rapid signal changes or to small signal amplitude differences. Thus, the processed data shown in FIGS. 10 and 11 are similar but not identical. FIG. 12 enhances the common information in both data sets. There exist several methods known to those skilled in the art for comparing the information in the two measurements with the goal of learning more about subterranean features of interest.

Example 4

Figure 13:
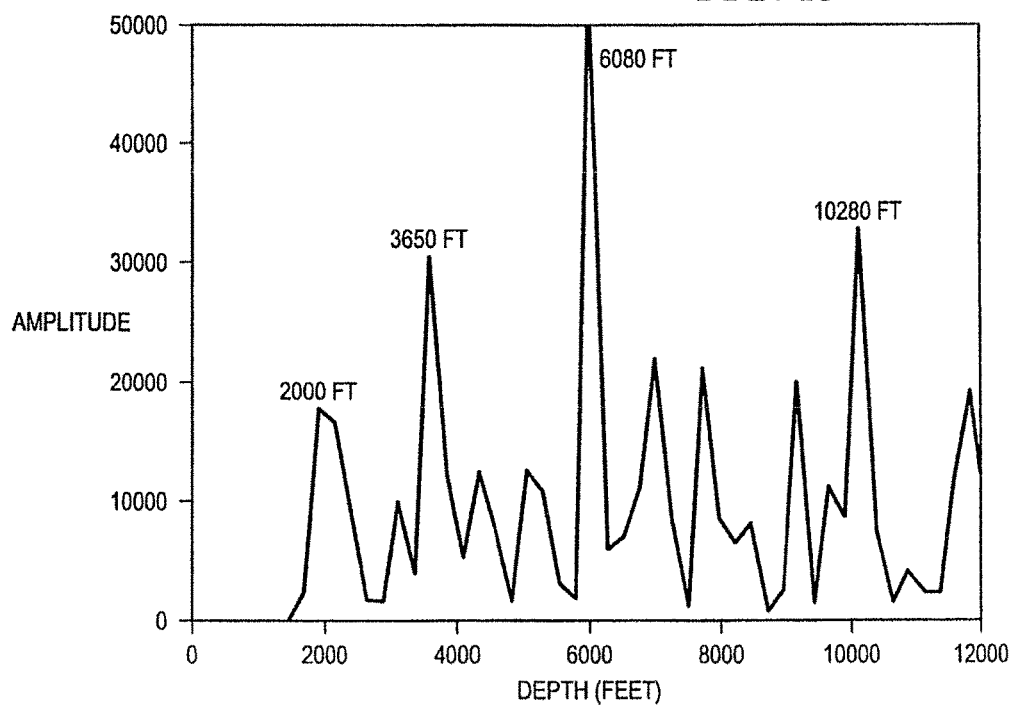
FIG. 13 illustrates another passive seismoelectric test results using an embodiment of the system and methods disclosed herein.

Referring now to FIG. 13, the results of passive detection used to detect and process electromagnetic fields are shown.

The processing of the detected signal illustrates characteristic depths of subterranean formations of interest. The data of FIG. 13 were collected in Texas. The subterranean features of interest are hydrocarbon reservoirs and strong seismic reflectors that have been previously characterized by standard seismic surveying techniques. FIG. 13 displays the amplitude of seismoelectric signals on the vertical axis and the depth on the horizontal axis. The highest amplitude peaks on the data of FIG. 13 occur at time of about 0.2 seconds, 0.365 seconds, 0.608 seconds, and 1.028 seconds. These seismic travel times correspond to strong reflectors measured in seismology and the strong reflector at 1.028 seconds, corresponding to a depth of approximately 10,000 feet, is the depth of a recently discovered reservoir. Other peaks in FIG. 13 also correspond to known depths of strong seismic reflectors. The results of FIG. 13 illustrate that the application of the techniques described herein can be used to identify the depth of seismic reflectors and hydrocarbons in a subsurface formation.

System and Method Embodiments

Having described the systems and methods for passive surveying, various embodiments will now be described.

1. In an embodiment, a method of passive surveying comprises: generating one or more detected signals by passively detecting a signal generated within a subsurface earth formation due to a seismoelectric response or an electroseismic response in at least one porous subsurface earth formation containing at least one fluid; and processing the one or more detected signals to determine at least one property of the subsurface earth formation.

2. The method of embodiment 1, wherein generating the one or more detected signals comprises: generating a detected electromagnetic field by detecting earth's electromagnetic field using an electromagnetic field detector; and wherein processing the one or more detected signals comprises: demodulating a portion of the signal to identify an envelope of the signal, wherein the envelope is indicative of the presence of the hydrocarbons; and analyzing the envelope to determine a value correlated to a depth of the hydrocarbons in the subterranean formation.

3. The method of embodiment 2, wherein demodulating the portion of the signal comprises extracting a frequency modulation, a phase modulation, an amplitude modulation, or any combination thereof from the signal.

4. The method of embodiment 3, wherein the envelope comprises at least one of the frequency modulation, the phase modulation, or the amplitude modulation.

5. The method of any of embodiments 2 to 4, wherein the sensor is disposed on or above the surface of the earth.

6. The method of any of embodiments 2 to 5, wherein the sensor is moving during the detection of the electromagnetic field.

7. The method of any of embodiments 2 to 6, wherein the sensor is disposed in a moving vehicle.

8. The method of any of embodiments 2 to 7, further comprising recording the signal using a recording apparatus.

9. The method of embodiment 8, wherein the signal is recorded for at least about 5 seconds.

10. The method of embodiment 8, wherein the signal is recorded for at least about 0.1 seconds.

11. The method of any of embodiments 8 to 10, wherein the recording apparatus comprises a digital or analog recording device.

12. The method of any of embodiments 2 to 11, wherein analyzing the envelope comprises determining one or more spectral properties of the envelope.

13. The method of any of embodiments 2 to 12, wherein the value comprises a frequency distribution of the envelope and the value is correlated to the depth of the hydrocarbons using a frequency-depth function.

14. The method of embodiment 13, wherein the frequency-depth function is derived using data from a known location.

15. The method of any of embodiments 2 to 14, further comprising repeating the detecting, demodulating, and analyzing a plurality of times.

16. The method of embodiment 15, wherein the repeating is performed at a single location.

17. The method of embodiment 15, wherein the repeating is performed at different locations.

18. The method of embodiment 17, wherein the repeating is performed sequentially or concurrently at each of the different locations.

19. The method of embodiment 17 or 18, wherein the different locations correspond to a plurality of grid positions.

20. The method of embodiment 19, further comprising generating a multi-dimension model of a subterranean formation using a plurality of values, wherein at least one value of the plurality of values is determined at each corresponding grid position of the plurality of grid positions.

21. The method of any of embodiments 2 to 20, further comprising: performing a further survey of the subterranean formation when an envelope is identified.

22. The method of embodiment 21, wherein the performing of the further survey comprises a seismological survey, a controlled-source electromagnetics survey, a controlled-source electroseismic survey, a gravity survey, a magnetic survey, or a passive survey.

23. The method of any of embodiments 2 to 22, wherein detecting the earth's electromagnetic field comprises measuring a vertical electric component of the earth's electromagnetic field.

24. The method of embodiment 23, further comprising generating a detected magnetic field by detecting earth's magnetic field using a magnetic field detector, and processing the detected magnetic field with the vertical electric component and the detected seismic signal.

25. The method of any of embodiments 2 to 24, wherein detecting the earth's electromagnetic field comprises measuring the earth's electromagnetic field in at least one horizontal direction.

26. The method of any of embodiments 2 to 25, wherein the earth's electromagnetic field comprises a time-varying electromagnetic field.

27. The method of any of embodiments 2 to 26, wherein the earth's electromagnetic field is detected using a pair of porous pot electrodes.

28. The method of embodiment 27, wherein the pair of porous pot electrodes comprises at least one component selected from the group consisting of: copper sulfate, silver chloride, cadmium chloride, mercury chloride, and lead chloride.

29. The method of any of embodiments 2 to 28, wherein the earth's electromagnetic field is detected using a plurality of pairs of porous pot electrodes.

30. The method of any of embodiments 2 to 29, wherein the earth's electromagnetic field is detected using a pair of conductive electrodes.

31. The method of embodiment 30, wherein the pair of metal electrodes comprises at least one conductive material selected from the group consisting of: copper, stainless steel, aluminum, gold, galvanized metal, iron, lead, brass, graphite, and steel.

32. The method of any of embodiments 2 to 31, wherein the earth's electromagnetic field is detected using a conductive electrode coupled to a porous pot electrode.

33. The method of any of embodiments 2 to 32, wherein the detected electromagnetic field is generated using one or more antennas disposed on or above a surface of the earth.

34. The method of embodiment 33, wherein the one or more antennas comprises at least one antenna selected from the group consisting of a parallel-plate capacitor antenna comprising two or more parallel conducting plates, a single-plate capacitor antenna comprising one electrode electrically coupled to the earth, a monopole antenna comprising a conducting element, a dipole antenna comprising two conducting elements, a multi-pole antenna comprising a plurality of conducting elements, a directional antenna comprising conducting elements arranged to augment a signal amplitude in a particular direction, a coil antenna comprising one or more coils of wire, and any combination thereof.

35. The method of embodiment 33, wherein the one or more antennas comprise a concentric electric dipole.

36. The method of any of embodiments 2 to 35, wherein the at least one property of the subsurface earth formation comprises at least one property selected from the group consisting of: an existence of the subsurface earth formation containing at least one fluid, a depth of the subsurface earth formation, a porosity, a fluid permeability, a composition of at least one fluid within the subsurface earth formation, a spatial extent of the subsurface earth formation, an orientation of the boundaries of the subsurface earth formation, a resistivity, and any combination thereof.

37. The method of any of embodiments 2 to 36, wherein the at least one fluid comprises at least one component selected from the group consisting of: an aqueous fluid, a hydrocarbon, a petroleum, carbon dioxide, and any combination thereof.

38. The method of embodiment 37 where the aqueous fluid comprises at least one of potable water, fresh water, or brine.

39 The method of any of embodiments 2 to 38, wherein the detected electromagnetic field results, at least in part, from a natural event comprising at least one of a electromagnetic fluctuation in the ionosphere, and a naturally occurring electric discharge in the atmosphere.

40. The method of any of embodiments 2 to 39, further comprising a plurality of electromagnetic field detectors.

41. The method of embodiment 40, wherein the plurality of electromagnetic field detectors are arranged in an array.

42. The method of any of embodiments 2 to 41, wherein processing the one or more detected signals further comprises: filtering the detected electromagnetic field.

43. The method of embodiment 42, wherein the filtering and processing occur in real time.

44. The method of any of embodiments 42 to 43, wherein filtering comprises filtering a direct current (DC) portion of the detected electromagnetic field prior to performing the processing.

45. The method of any of embodiments 42 to 44, wherein filtering comprises decimating a data set representing the detected electromagnetic field prior to performing the processing.

46. The method of any of embodiments 42 to 45, wherein filtering comprises using a noise filter.

47. The method of embodiment 46, wherein the noise filter comprises a high pass filter, a low pass filter, a wide band frequency filter, a narrow band frequency filter, or any combination thereof.

48. The method of any of embodiments 42 to 47, wherein filtering comprises using one or more band-pass filters.

49. The method of embodiment 48, wherein at least one of the band-pass filters of the one or more band-pass filters comprises a linear phase filter, a finite impulse response filter, a forward infinite impulse response filter, a reverse infinite impulse response filter, or any combination thereof.

50. The method of any of embodiments 2 to 49, wherein generating the one or more detected signals further comprises: generating at least one nonlinear electromagnetic field response by isolating the at least one nonlinear electromagnetic field response from the detected electromagnetic field; and wherein processing the one or more detected signals further comprises: processing the at least one nonlinear electromagnetic field response to determine at least one property of the subsurface earth formation.

51. In an embodiment, a method for identifying deposits in a subterranean formation comprises: obtaining a signal corresponding to a vertical electric field in the earth from an area of interest, wherein the signal comprises a modulating signal generated within the subterranean formation; filtering the signal using a set of predetermined frequency bandwidths to generate a plurality of filtered signals; identifying a plurality of envelopes, wherein each envelope of the plurality of envelopes corresponds to each filtered signal of the plurality of filtered signals; and analyzing the plurality of envelopes to determine one or more values correlated to a depth of the deposits in the subterranean formation.

52. The method of embodiment 51, wherein the modulating signal is generated based on a combination of electroseismic and seismoelectric effects due to interactions between the deposits in the subterranean formation and interactions with a background electromagnetic field of the earth.

53. The method of embodiment 51 or 52, wherein the modulating signal comprises at least one of a frequency modulation, a phase modulation, or an amplitude modulation.

54. The method of embodiment 53, wherein the envelope comprises at least one of the frequency modulation, the phase modulation, or the amplitude modulation.

55. The method of any of embodiments 51 to 54, further comprising recording the signal using a recording apparatus.

56. The method of any of embodiments 51 to 55, wherein the filtering, identifying, and analyzing occur in real time.

57. The method of any of embodiments 51 to 56, wherein a positive identification of a plurality of envelopes indicates the presence of a fluid within a pore in the subterranean formation.

58. The method of any of embodiments 51 to 57, wherein a positive identification of a plurality of envelopes indicates the presence of a fluid of a certain type within a pore in the subterranean formation.

59. The method of any of embodiments 51 to 58, further comprising filtering a direct current (DC) portion of the signal from the signal prior to identifying a plurality of envelopes.

60. The method of any of embodiments 51 to 59, further comprising decimating a data set representing the signal prior to identifying the plurality of envelopes.

61. The method of any of embodiments 51 to 60, further comprising filtering the signal with a noise filter.

62. The method of embodiment 61, wherein the noise filter comprises a high pass filter, a low pass filter, a wide band frequency filter, a narrow band frequency filter, or any combination thereof.

63. The method of any of embodiments 51 to 62, wherein a plurality of band-pass filters is used to generate the plurality of filtered signals.

64. The method of embodiment 63, wherein at least one of the band-pass filters of the plurality of band-pass filters comprises a linear phase filter, a finite impulse response filter, a forward infinite impulse response filter, a reverse infinite impulse response filter, or any combination thereof.

65. The method of any of embodiments 51 to 64, wherein identifying a plurality of envelopes comprises using a Hilbert transform method.

66. The method of any of embodiments 51 to 65, wherein analyzing the plurality of envelopes comprises determining one or more spectral properties of at least one of the plurality of envelopes.

67. The method of embodiment 66, wherein determining one or more spectral properties comprises calculating a power spectral density for the at least one of the plurality of envelopes.

68. The method of embodiment 66 or 67, wherein determining one or more spectral properties comprises calculating a frequency profile using a fast Fourier transform of the at least one of the plurality of envelopes.

69. The method of any of embodiments 66 to 68, wherein determining one or more spectral properties comprises using at least one of a lock-in amplifier or a spectrum analyzer.

70. The method of any of embodiments 66 to 69, further comprising correlating a ratio of at least one spectral property of at least one frequency band from one or more envelopes of the plurality of envelopes to at least one corresponding spectral property of at least a second frequency band from the one or more envelopes of the plurality of envelopes.

71. The method of any of embodiments 51 to 70, further comprising correlating the value to a depth of the deposits in the subterranean formation.

72. The method of embodiment 71, wherein correlating comprises determining a frequency-depth relationship.

73. The method of embodiment 72, wherein the frequency-depth relationship is determined based on a classification method comprising at least one method selected from the group consisting of: a neural network, a decision tree, a Bayes-based classifier, a fuzzy logic-based classifier, and a conventional statistical classifier.

74. The method of embodiment 72 or 73, wherein the frequency-depth relationship is determined based on a regression analysis of a set of known empirical data.

75. The method of any of embodiments 66 to 74, further comprising analyzing the one or more spectral properties to determine a relationship between the one or more spectral properties and a presence of a fluid in a pore in the subterranean formation based on a classification method comprising at least one method selected from the group consisting of: a neural network, a decision tree, a Bayes-based classifier, a fuzzy logic-based classifier, and a conventional statistical classifier.

76. The method of any of embodiments 66 to 75, further comprising analyzing the one or more spectral properties to determine a relationship between the one or more spectral properties and a presence of a fluid in a pore in the subterranean formation based on a regression analysis of a set of known empirical data.

77. The method of any of embodiments 51 to 76, further comprising: developing a geological model of the subterranean formation; obtaining one or more predicted envelopes from the geological model; comparing the one or more predicted envelopes to the plurality of envelopes; and determining one or more properties of the subterranean formation based on the comparing.

78. The method of any of embodiments 51 to 77, further comprising: performing a further survey of the subterranean formation when an envelope is identified.

79. In an embodiment, a method comprises: providing a sensor disposed on or above a surface of the earth; generating a reference signal; introducing the reference signal into the earth, wherein the reference signal is modulated by a modulating signal generated within the subterranean formation to generate a modulated reference signal; detecting the modulated reference signal; and processing the modulated reference signal and the reference signal to isolate the modulating signal.

80. The method of embodiment 79 wherein the modulating signal comprises at least one of a frequency modulation, a phase modulation, or an amplitude modulation.

81. The method of embodiment 79 or 80, wherein the modulating signal is generated based on at least one of an electroseismic effect or a seismoelectric effect due to an interaction between a fluid in a subterranean formation and a background electromagnetic field of the earth.

82. The method of any of embodiments 79 to 81, further comprising recording the modulated reference signal using a recording apparatus.

83. The method of embodiment 82, wherein the modulated reference signal is recorded for at least about 5 seconds.

84. The method of embodiment 82, wherein the modulated reference signal is recorded for at least about 0.1 seconds.

85. The method of any of embodiments 79 to 84, wherein processing the modulated reference signal comprises demodulating the modulated reference signal.

86. The method of embodiment 85, wherein the demodulating comprises using a Hilbert transform method.

87. The method of any of embodiments 79 to 86, wherein processing the modulated reference signal and the reference signal comprises using a lock-in amplifier receiving the modulated reference signal and the reference signal to isolate the modulating signal.

88. The method of any of embodiments 79 to 88, further comprising: performing a further survey of the subterranean formation when an envelope is identified.

89. In an embodiment, a system for identifying hydrocarbons in a subterranean formation comprises: one or more sensors coupled to a processor that detect one or more signals generated within a subsurface earth formation due to a seismoelectric response or an electroseismic response in at least one porous subsurface earth formation containing at least one fluid; and an analysis tool, that when executed on the processor, configures the processor to: receive the one or more signals from the one or more sensors; and process at least a portion of the one or more signals to determine at least one property of the subsurface earth formation.

90. The system of embodiment 89, wherein the one or more sensors comprise: one or more electromagnetic field detectors that measures the earth's electromagnetic field and produces a signal indicative of the detected electromagnetic field; and wherein the analysis tool configures the processor to: receive the signal from the one or more sensors; demodulate a portion of the signal to identify an envelope of the signal; analyze the envelope to determine one or more properties indicative of the presence of the hydrocarbons; and analyze the envelope to determine the depth of the hydrocarbons in the subterranean formation.

91. The system of embodiment 90, wherein the envelope of the signal comprises at least one of a frequency modulation, a phase modulation, or an amplitude modulation.

92. The system of embodiment 90 or 91, further comprising a recording apparatus coupled to the sensor and the analysis tool, wherein the recording apparatus is configured to record the signal.

93. The system of any of embodiments 90 to 92, wherein the analysis tool further configures the processor to: remove a direct current (DC) portion of the signal.

94. The system of any of embodiments 90 to 93, wherein the analysis tool further configures the processor to: decimate a data set representing the signal.

95. The system of any of embodiments 90 to 94, wherein the analysis tool further configures the processor to: filter a noise component from the signal.

96. The system of any of embodiments 90 to 95, wherein the analysis tool further configures the processor to: filter the signal using a predetermined frequency bandwidth.

97. The system of any of embodiments 90 to 96, wherein the analysis tool configures the processor to demodulate a portion of the signal using a Hilbert transform.

98. The system of any of embodiments 90 to 97, wherein the analysis tool configures the processor to analyze the envelope to determine a spectral property of the envelope.

99. The system of embodiment 98, wherein the spectral property comprises a power spectral density.

100. The system of embodiment 98, wherein the spectral property comprises a frequency distribution determined by a fast Fourier transform.

101. The system of any of embodiments 90 to 100, wherein the analysis tool further configures the processor to: correlate the envelope to a depth of the hydrocarbons in the subterranean formation.

102. The system of embodiment 101, wherein the analysis tool configures the processor to: correlate the envelope to a depth using a frequency-depth function.

103. The system of any of embodiments 90 to 102, wherein the electromagnetic field detector comprises a plurality of pairs of porous pot electrodes, wherein each pair of porous pot electrodes are electrically coupled.

104. The system of embodiment 103, wherein the pairs of porous pot electrodes comprise at least one component selected from the group consisting of copper sulfate, silver chloride, cadmium chloride, mercury chloride, and lead chloride.

105. The system of any of embodiments 90 to 104, wherein the electromagnetic field detector comprises a plurality of pairs of conductive electrodes, wherein each pair of conductive electrodes are electrically coupled.

106. The system of any of embodiments 90 to 105, wherein the plurality of conductive electrodes comprises at least one conductive material selected from the group consisting of: copper, stainless steel, aluminum, gold, galvanized metal, iron, lead, brass, graphite, steel, alloys thereof, and any combination thereof.

107. The system of any of embodiments 90 to 106, wherein the electromagnetic field detector comprises a conductive electrode coupled to a porous pot electrode.

108. The system of any of embodiments 90 to 107, wherein the at least one fluid comprises at least one component selected from the group consisting of: an aqueous fluid, a hydrocarbon, a petroleum, carbon dioxide, and any combination thereof.

109. The system of embodiment 108, wherein the aqueous fluid comprises at least one of potable water, fresh water, or brine.

110. The system of any of embodiments 90 to 109, wherein the electromagnetic field detector comprises an antenna disposed on or above the surface of the earth.

111. The system of embodiment 110, wherein the antenna comprises at least one antenna selected from the group consisting of: a parallel-plate capacitor antenna comprising two or more parallel conducting plates, a single-plate capacitor antenna comprising one electrode electrically coupled to the earth, a monopole antenna comprising a conducting element, a dipole antenna comprising two conducting elements, a multi-pole antenna comprising a plurality of conducting elements, a directional antenna comprising conducting elements arranged to augment a signal amplitude in a particular direction, a coil antenna comprising one or more coils of wire, and any combination thereof.

112. The system of embodiment 110, wherein the antenna comprises a concentric electric dipole.

113. In an embodiment, a system for detecting a signal comprises: a signal generator configured to generate a reference signal and transmit the reference signal into the earth, wherein the reference signal is modulated by a modulating signal generated within a subterranean formation and generates a modulated reference signal; a sensor disposed on or above a surface of the earth and coupled to a processor that detects the modulated reference signal; and a filter coupled to the signal generator and the sensor, wherein the filter is configured to receive the reference signal from the signal generator and the modulated reference signal from the sensor, and process the modulated reference signal and the reference signal to isolate the modulating signal.

114. The system of embodiment 113, wherein the sensor comprises one or more capacitive plates arranged parallel to a surface of the earth.

115. The system of embodiment 113 or 114, wherein the filter comprises a lock-in amplifier.

116. The system of any of embodiments 113 to 115, wherein the modulating signal comprises at least one of a frequency modulation, a phase modulation, or an amplitude modulation.

117. In an embodiment, a system for identifying hydrocarbons in a subterranean formation comprises: a memory comprising a non-transitory computer readable media; a processor; and an analysis tool, that when executed on the processor, configures the processor to: receive one or more signals from one or more sensors, wherein the one or more sensors detect one or more signals generated within a subsurface earth formation due to a seismoelectric response or an electroseismic response in at least one porous subsurface earth formation containing at least one fluid; and process at least a portion of the one or more signals to determine at least one property of the subsurface earth formation.

118. The system of embodiment 117, wherein the one or more sensors comprise one or more electromagnetic field detectors that measures the earth's electromagnetic field and produces a signal indicative of the detected electromagnetic field; and wherein the analysis tool further configures the processor to: receive the signal from the one or more electromagnetic field detectors; demodulate a portion of the signal to identify an envelope of the signal; analyze the envelope to determine one or more properties indicative of the presence of the hydrocarbons; and analyze the envelope to determine the depth of the hydrocarbons in the subterranean formation.

119. A method of passive surveying comprising: generating one or more detected signals by passively detecting a signal generated within a subsurface earth formation due to a seismoelectric response or an electroseismic response in at least one porous subsurface earth formation containing at least one fluid; and processing the one or more detected signals to determine at least one property of the subsurface earth formation.

120. The method of embodiment 119 wherein generating the one or more detected signals comprises: generating a detected electromagnetic field by detecting earth's electromagnetic field using an electromagnetic field detector; and wherein processing the one or more detected signals comprises: processing the detected electromagnetic field to determine the at least one property of the subsurface earth formation.

121. The method of embodiment 120, wherein detecting the earth's electromagnetic field comprises measuring a vertical electric component of the earth's electromagnetic field.

122. The method of embodiment 121, further comprising generating a detected magnetic field by detecting earth's magnetic field using a magnetic field detector, and processing the detected magnetic field with the vertical electric component.

123. The method of any of embodiments 120 to 122, wherein detecting the earth's electromagnetic field comprises measuring the earth's electromagnetic field in at least one horizontal direction.

124. The method of any of embodiments 120 to 123, wherein the earth's electromagnetic field comprises a time-varying electromagnetic field.

125. The method of any of embodiments 120 to 124, wherein the earth's electromagnetic field is detected using a pair of porous pot electrodes.

126. The method of embodiment 125, wherein the pair of porous pot electrodes comprises at least one component selected from the group consisting of: copper sulfate, silver chloride, cadmium chloride, mercury chloride, and lead chloride.

127. The method of any of embodiments 120 to 126, wherein the earth's electromagnetic field is detected using a plurality of pairs of porous pot electrodes.

128. The method of any of embodiments 120 to 127, wherein the earth's electromagnetic field is detected using a pair of conductive electrodes.

129. The method of embodiment 128, wherein the pair of metal electrodes comprises at least one conductive material selected from the group consisting of: copper, stainless steel, aluminum, gold, galvanized metal, iron, lead, brass, graphite, and steel.

130. The method of any of embodiments 120 to 129, wherein the earth's electromagnetic field is detected using a conductive electrode coupled to a porous pot electrode.

131. The method of any of embodiments 120 to 130, wherein the electromagnetic field detector is disposed on or above the surface of the earth.

132. The method of any of embodiments 120 to 131, wherein the electromagnetic field detector is moving during the generation of the detected electromagnetic field.

133. The method of any of embodiments 120 to 132, wherein the electromagnetic field detector is disposed in a moving vehicle.

134. The method of any of embodiments 120 to 133, wherein the detected electromagnetic field is generated using one or more antennas disposed on or above a surface of the earth.

135. The method of embodiment 134, wherein the one or more antennas comprises at least one antenna selected from the group consisting of a parallel-plate capacitor antenna comprising two or more parallel conducting plates, a single-plate capacitor antenna comprising one electrode electrically coupled to the earth, a monopole antenna comprising a conducting element, a dipole antenna comprising two conducting elements, a multi-pole antenna comprising a plurality of conducting elements, a directional antenna comprising conducting elements arranged to augment a signal amplitude in a particular direction, a coil antenna comprising one or more coils of wire, and any combination thereof.

136. The method of embodiment 134, wherein the one or more antennas comprise a concentric electric dipole.

137. The method of any of embodiments 120 to 136, wherein the at least one property of the subsurface earth formation comprises at least one property selected from the group consisting of: an existence of the subsurface earth formation containing at least one fluid, a depth of the subsurface earth formation, a porosity, a fluid permeability, a composition of at least one fluid within the subsurface earth formation, a spatial extent of the subsurface earth formation, an orientation of the boundaries of the subsurface earth formation, a resistivity, and any combination thereof.

138. The method of any of embodiments 120 to 137, further comprising recording the detected electromagnetic field.

139. The method of embodiment 138, wherein the recording occurs for at least about 5 seconds.

140. The method of embodiment 138, wherein the modulated reference signal is recorded for at least about 0.1 seconds.

141. The method of any of embodiments 120 to 140, wherein the at least one fluid comprises at least one component selected from the group consisting of: an aqueous fluid, a hydrocarbon, a petroleum, carbon dioxide, and any combination thereof.

142. The method of embodiment 141 where the aqueous fluid comprises at least one of potable water, fresh water, or brine.

143 The method of any of embodiments 120 to 142, wherein the detected electromagnetic field results, at least in part, from a natural event comprising at least one of: an electromagnetic fluctuation in the ionosphere, and a naturally occurring electric discharge in the atmosphere.

144. The method of any of embodiments 120 to 143, further comprising a plurality of electromagnetic field detectors.

145. The method of embodiment 144, wherein the plurality of electromagnetic field detectors are arranged in an array.

146. The method of any of embodiments 120 to 145, further comprising performing a correlation analysis of the detected electromagnetic field in the time domain, the frequency domain, or both, wherein the correlation analysis provides an indication of a presence of the at least one fluid.

147. The method of embodiment 146, wherein performing the correlation analysis provides at least one of temporal characteristics or frequency characteristics.

148. The method of embodiment 147, further comprising deriving a frequency-depth function based on the temporal characteristics, the frequency characteristics, or both.

149. The method of embodiment 148, wherein the frequency-depth function is derived using data from a known location.

150. The method of any of embodiments 120 to 149, further comprising repeating the passively detecting, and processing a plurality of times.

151. The method of embodiment 150, wherein the repeating is performed at a single location.

152. The method of embodiment 150 or 151, wherein the repeating is performed at different locations.

153. The method of any of embodiments 150 to 152, wherein the repeating is performed sequentially or concurrently at each of the different locations.

154. The method of embodiment 153, wherein the different locations correspond to a plurality of grid positions.

155. The method of embodiment 154, further comprising generating a multi-dimension model of a subterranean formation using a plurality of detected electromagnetic field signals, wherein at least one signal of the plurality of signals is determined at each corresponding grid position of the plurality of grid positions.

156. The method of any of embodiments 120 to 155, further comprising: performing a further survey of the subterranean formation when a presence of the at least one fluid is detected.

157. The method of embodiment 156, wherein the further survey comprises a seismological survey, a controlled-source electromagnetics survey, a controlled-source electroseismic survey, a controlled-source seismoelectric survey, a gravity survey, a magnetic survey, or a passive survey.

158. The method of any of embodiments 120 to 157, wherein processing the one or more detected signals further comprises: filtering the detected electromagnetic field.

159. The method of embodiment 158, wherein the filtering and processing occur in real time.

160. The method of embodiment 158 or 159, wherein filtering comprises filtering a direct current (DC) portion of the detected electromagnetic field prior to performing the processing.

161. The method of any of embodiments 158 to 160, wherein filtering comprises decimating a data set representing the detected electromagnetic field prior to performing the processing.

162. The method of any of embodiments 158 to 161, wherein filtering comprises using a noise filter.

163. The method of embodiment 162, wherein the noise filter comprises a high pass filter, a low pass filter, a wide band frequency filter, a narrow band frequency filter, or any combination thereof.

164. The method of any of embodiments 158 to 163, wherein filtering comprises using one or more band-pass filters.

165. The method of embodiment 164, wherein at least one of the band-pass filters of the one or more band-pass filters comprises a linear phase filter, a finite impulse response filter, a forward infinite impulse response filter, a reverse infinite impulse response filter, or any combination thereof.

166. The method of any of embodiments 120 to 165, wherein processing the detected electromagnetic field comprises averaging an amplitude of the detected electromagnetic field over one or more frequencies.

167. The method of embodiment 166, wherein the plurality of frequencies comprises one or more fixed frequencies.

168. The method of embodiment 166 or 167, wherein the averaging comprises measuring an amplitude of the detected electromagnetic field for a length of time that is greater than a period of oscillation of the detected electromagnetic field at the one or more frequencies; and averaging the amplitude over the length of time.

169. The method of any of embodiments 120 to 168, wherein processing the detected electromagnetic field comprises determining one or more spectral properties of the detected electromagnetic field.

170. The method of embodiment 169, wherein determining one or more spectral properties comprises using at least one of a lock-in amplifier or a spectrum analyzer.

171. The method of embodiment 169, wherein determining one or more spectral properties comprises determining a relative amplitude of each frequency at which an amplitude is determined.

172. The method of any of embodiments 169 to 171, further comprising analyzing the one or more spectral properties to determine a relationship between the one or more spectral properties and the presence of the at least one fluid in the subterranean formation based on a classification method comprising at least one method selected from the group consisting of: a neural network, a decision tree, a Bayes-based classifier, a fuzzy logic-based classifier, and a conventional statistical classifier.

173. The method of any of embodiments 169 to 172, further comprising analyzing the one or more spectral properties to determine a relationship between the one or more spectral properties and a presence of the at least one fluid in the subterranean formation based on a regression analysis of a set of known empirical data.

174. The method of any of embodiments 169 to 173, wherein determining one or more spectral properties comprises calculating one or more power spectral densities.

175. The method of embodiment 174, further comprising de-trending of the one or more power spectral densities.

176. The method of embodiment 174 or 175, further comprising integrating each of the one or more power spectral densities.

177. The method of any of embodiments 174 to 176, further comprising performing a fast Fourier transform of the one or more power spectral densities; and determining one or more correlations between a source signal and the detected electromagnetic field based on the fast Fourier transform.

178. The method of embodiment 177, wherein an existence of the one or more correlations provides an indication of the presence of the at least one fluid in the subterranean formation.

179. The method of embodiment 177 or 178, wherein the one or more correlations indicate one or more transit times between the subterranean formation and the surface of the earth.

180. The method of embodiment 179, further comprising correlating the one or more transit times to a depth of the fluid in the subterranean formation.

181. The method of embodiment 180, wherein the correlating is based on estimate rock acoustic properties of the earth.

182. The method of embodiment 180 or 181, wherein correlating comprises determining a frequency-depth relationship.

183. The method of embodiment 182, wherein the frequency-depth relationship is determined based on a classification method comprising at least one method selected from the group consisting of: a neural network, a decision tree, a Bayes-based classifier, a fuzzy logic-based classifier, and a conventional statistical classifier.

184. The method of embodiment 182 or 183, wherein the frequency-depth relationship is determined based on a regression analysis of a set of known empirical data.

185. The method of any of embodiments 120 to 184, further comprising: developing a geological model of the subsurface earth formation; determining at least one predicted result from the geological model; comparing the at least one predicted result to the detected electromagnetic field; and determining the at least one property of the subsurface earth formation based on the comparing.

186. The method of any of embodiments 120 to 185, wherein generating the one or more detected signals further comprises: generating at least one nonlinear electromagnetic field response by isolating the at least one nonlinear electromagnetic field response from the detected electromagnetic field; and wherein processing the one or more detected signals further comprises: processing the at least one nonlinear electromagnetic field response to determine at least one property of the subsurface earth formation.

187. A system for identifying hydrocarbons in a subterranean formation comprising: one or more sensors coupled to a processor that detect one or more signals generated within a subsurface earth formation due to a seismoelectric response or an electroseismic response in at least one porous subsurface earth formation containing at least one fluid; and an analysis tool, that when executed on the processor, configures the processor to: receive the one or more signals from the one or more sensors; process at least a portion of the one or more signals to determine at least one property of the subsurface earth formation.

188. The system of embodiment 187, wherein the one or more sensors comprise: an electromagnetic field detector that measures the earth's electromagnetic field and produces a signal indicative of the detected electromagnetic field; and wherein the analysis tool receives the signal and determines the at least one property of a subsurface earth formation.

189. The system of embodiment 188, wherein the electromagnetic field detector is disposed within the surface of the earth.

190. The system of embodiment 188 or 189, further comprising a plurality of electromagnetic field detectors.

191. The system of any of embodiments 188 to 190, wherein the signal comprises a vertical component of the earth's electromagnetic field.

192. The system of any of embodiments 188 to 191, wherein the signal comprises at least one horizontal component of the earth's electromagnetic field.

193. The system of any of embodiments 188 to 192, wherein the signal is indicative of a time-varying electromagnetic field.

194. The system of any of embodiments 188 to 193, wherein the electromagnetic field detector comprises a plurality of pairs of porous pot electrodes, wherein each pair of porous pot electrodes are electrically coupled.

195. The system of embodiment 194, wherein the pairs of porous pot electrodes comprise at least one component selected from the group consisting of: copper sulfate, silver chloride, cadmium chloride, mercury chloride, and lead chloride.

196. The system of any of embodiments 188 to 195, wherein the electromagnetic field detector comprises a plurality of pairs of conductive electrodes, wherein each pair of conductive electrodes are electrically coupled.

197. The system of any of embodiments 188 to 196, wherein the plurality of conductive electrodes comprises at least one conductive material selected from the group consisting of: copper, stainless steel, aluminum, gold, galvanized metal, iron, lead, brass, graphite, steel, alloys thereof, and any combination thereof.

198. The system of any of embodiments 188 to 197, wherein the electromagnetic field detector comprises a conductive electrode coupled to a porous pot electrode.

199. The system of any of embodiments 188 to 198, wherein the at least one property of the subsurface earth formation comprises at least one property selected from the group consisting of: an existence of the subsurface earth formation containing at least one fluid, a depth of the subsurface earth formation, a porosity, a fluid permeability, a composition of at least one fluid within the subsurface earth formation, a spatial extent of the subsurface earth formation, an orientation of the boundaries of the subsurface earth formation, a resistivity, and any combination thereof.

200. The system any of embodiments 188 to 199, further comprising a recording apparatus configured to record the signal on a non-transitory media.

201. The system of embodiment 200, wherein the recording apparatus comprises a digital or analog recording device.

202. The system of any of embodiments 188 to 201, wherein the at least one fluid comprises at least one component selected from the group consisting of: an aqueous fluid, a hydrocarbon, a petroleum, carbon dioxide, and any combination thereof.

203. The system of embodiment 202, wherein the aqueous fluid comprises at least one of potable water, fresh water, or brine.

204. The system of any of embodiments 188 to 203, wherein the electromagnetic field detector comprises an antenna disposed on or above the surface of the earth.

205. The system of embodiment 204, wherein the antenna comprises at least one antenna selected from the group consisting of: a parallel-plate capacitor antenna comprising two or more parallel conducting plates, a single-plate capacitor antenna comprising one electrode electrically coupled to the earth, a monopole antenna comprising a conducting element, a dipole antenna comprising two conducting elements, a multi-pole antenna comprising a plurality of conducting elements, a directional antenna comprising conducting elements arranged to augment a signal amplitude in a particular direction, a coil antenna comprising one or more coils of wire, and any combination thereof.

206. The system of embodiment 204, wherein the antenna comprises a concentric electric dipole.

207. The system of any of embodiments 188 to 206, wherein the analysis tool further configures the processor to: remove a direct current (DC) portion of the signal.

208. The system of any of embodiments 188 to 207, wherein the analysis tool further configures the processor to: decimate a data set representing the signal.

209. The system of any of embodiments 188 to 208, wherein the analysis tool further configures the processor to: filter a noise component from the signal.

210. The system of any of embodiments 188 to 209, wherein the analysis tool further configures the processor to: filter the signal using a predetermined frequency bandwidth.

211. In an embodiment, a system for identifying hydrocarbons in a subterranean formation comprises: a memory comprising a non-transitory computer readable media; a processor; and an analysis tool, that when executed on the processor, configures the processor to: receive one or more signals from one or more sensors, wherein the one or more sensors detect one or more signals generated within a subsurface earth formation due to a seismoelectric response or an electroseismic response in at least one porous subsurface earth formation containing at least one fluid; and process at least a portion of the one or more signals to determine at least one property of the subsurface earth formation.

212. The system of embodiment 211, wherein the one or more sensors comprise an electromagnetic field detector that measures the earth's electromagnetic field and produces a signal indicative of the detected electromagnetic field; and wherein the analysis tool configures the processor to receive the signal and determine the at least one property of a subsurface earth formation.

213. A method of passive surveying comprising: generating one or more detected signals by passively detecting a signal generated within a subsurface earth formation due to a seismoelectric response or an electroseismic response in at least one porous subsurface earth formation containing at least one fluid; and processing the one or more detected signals to determine at least one property of the subsurface earth formation.

214. The method of embodiment 213, wherein generating the one or more detected signals comprises: generating a detected seismic signal by passively detecting a seismic wave generated within the subsurface earth formation due to the seismoelectric response or the electroseismic response in the at least one porous subsurface earth formation containing the at least one fluid using a seismic sensor, and wherein processing the one or more detected signals comprises processing the detected seismic signal to determine the at least one property of the subsurface earth formation.

215. The method of embodiment 214, wherein the seismic sensor comprises at least one sensor selected from the group consisting of: a hydrophone, a single-component geophone, a two-component geophone, a three-component geophone, a single-axis accelerometer, a two-axis accelerometer, and a three-axis accelerometer.

216. The method of embodiment 214 or 215, wherein the at least one property of the subsurface earth formation comprises at least one property selected from the group consisting of: an existence of the subsurface earth formation containing at least one fluid, a depth of the subsurface earth formation, a porosity, a fluid permeability, a composition of at least one fluid within the subsurface earth formation, a spatial extent of the subsurface earth formation, an orientation of the boundaries of the subsurface earth formation, a resistivity, and any combination thereof.

217. The method of any of embodiments 214 to 216, further comprising recording the detected seismic signal.

218. The method of any of embodiments 214 to 217, wherein the at least one fluid comprises at least one component selected from the group consisting of: an aqueous fluid, a hydrocarbon, a petroleum, carbon dioxide, and any combination thereof.

219. The method of embodiment 218, wherein the aqueous fluid comprises at least one of potable water, fresh water, or brine.

220. The method of any of embodiments 214 to 219, wherein the seismic sensor is disposed on the surface of the earth, within a wellbore, or both.

221. The method of any of embodiments 214 to 220, further comprising filtering the detected seismic signal to generate a filtered signal.

222. The method of embodiment 221, wherein the filtering and processing occur in real time.

223. The method of embodiment 221 or 222, wherein filtering comprises decimating a data set representing the detected seismic signal prior to performing the processing.

224. The method of any of embodiments 221 to 223, wherein filtering the detected seismic signal comprises using a noise filter.

225. The method of embodiment 224, wherein the noise filter comprises a high pass filter, a low pass filter, a wide band frequency filter, a narrow band frequency filter, or any combination thereof.

226. The method of any of embodiments 221 to 225, wherein filtering the detected seismic signal comprises using a plurality of band-pass filters to generate the filtered signal.

227. The method of embodiment 226, wherein at least one of the band-pass filters of the plurality of band-pass filters comprises a linear phase filter, a finite impulse response filter, a forward infinite impulse response filter, a reverse infinite impulse response filter, or any combination thereof.

228. The method of any of embodiments 214 to 227, further comprising: generating the detected seismic signal using a plurality of seismic sensors.

229. The method of embodiment 228, wherein processing the detected seismic signal comprises: filtering at least a portion of a seismic wave traveling in a direction perpendicular to vertical by applying a spatial filter to the detected seismic signal from the plurality of seismic sensors.

230. The method of embodiment 229, wherein the spatial filter is based, at least in part, on the spreading symmetry of the seismic wave traveling in the direction perpendicular to vertical.

231. The method of any of embodiments 228 to 230, wherein processing the detected seismic signal comprises: removing a seismic noise from a vertical component of the detected seismic signal by applying a predictive filter to the detected seismic signal based on using a horizontal component of the detected seismic signal from the plurality of seismic sensors.

232. The method of any of embodiments 228 to 231, wherein processing the detected seismic signal comprises: applying a dip filter to the detected seismic signal based on rejecting at least a portion of the detected seismic signals from the plurality of seismic sensors that arrive at a non-normal angle to a surface, wherein the surface is defined by the plurality of seismic sensors.

233. The method of any of embodiments 214 to 232, wherein processing the detected seismic signal comprises averaging an amplitude of the detected seismic signal over one or more frequencies.

234. The method of embodiment 233, wherein the plurality of frequencies comprises one or more fixed frequencies.

235. The method of embodiment 233 or 234, wherein the averaging comprises measuring the detected seismic signal amplitude for a length of time that is greater than a period of oscillation of the signal at the one or more frequencies; and averaging the detected seismic signal amplitude over the length of time.

236. The method of any of embodiments 214 to 235, wherein processing the detected seismic signal comprises determining one or more spectral properties of the detected seismic signal.

237. The method of embodiment 236, wherein determining one or more spectral properties comprises using at least one of a lock-in amplifier or a spectrum analyzer.

238. The method of embodiment 236 or 237, further comprising analyzing the one or more spectral properties to determine a relationship between the one or more spectral properties and the presence of the fluid in a pore in the subterranean formation based on a classification method comprising at least one method selected from the group consisting of: a neural network, a decision tree, a Bayes-based classifier, a fuzzy logic-based classifier, and a conventional statistical classifier.

239. The method of any of embodiments 236 to 238, further comprising analyzing the one or more spectral properties to determine a relationship between the one or more spectral properties and a presence of the fluid in a pore in the subterranean formation based on a regression analysis of a set of known empirical data.

240. The method of any of embodiments 236 to 239, wherein determining one or more spectral properties comprises determining a relative amplitude of each frequency at which an amplitude is determined.

241. The method of any of embodiments 236 to 240, wherein determining one or more spectral properties comprises calculating a power spectral density.

242. The method of embodiment 241, further comprising de-trending of the power spectral density.

243. The method of embodiment 241 or 242, further comprising integrating the power spectral density.

244. The method of any of embodiments 241 to 243, further comprising performing a fast Fourier transform of the power spectral density; and determining one or more correlations between a source signal and the detected seismic signal based on the fast Fourier transform.

245. The method of embodiment 244, wherein an existence of the one or more correlations provides an indication of the presence of the fluid in the subterranean formation.

246. The method of embodiment 244 or 245, wherein the one or more correlations indicate one or more transit times between the subterranean formation and the surface of the earth.

247. The method of embodiment 246, further comprising correlating the one or more transit times to a depth of the fluid in the subterranean formation.

248. The method of embodiment 247, wherein the correlating is based on estimate rock acoustic properties of the earth.

249. The method of embodiment 247 or 248, wherein correlating comprises determining a frequency-depth relationship.

250. The method of embodiment 249, wherein the frequency-depth relationship is determined based on a classification method comprising at least one method selected from the group consisting of: a neural network, a decision tree, a Bayes-based classifier, a fuzzy logic-based classifier, and a conventional statistical classifier.

251. The method of embodiment 249 or 250, wherein the frequency-depth relationship is determined based on a regression analysis of a set of known empirical data.

252. The method of any of embodiments 214 to 251, further comprising performing a correlation analysis of the detected seismic signal in the time domain, the frequency domain, or both, wherein the correlation analysis provides an indication of a presence of the at least one fluid.

253. The method of embodiment 252, wherein performing the correlation analysis provides at least one of temporal characteristics or frequency characteristics.

254. The method of embodiment 253, further comprising deriving a frequency-depth function based on the temporal characteristics, the frequency characteristics, or both.

255. The method of embodiment 254, wherein the frequency-depth function is derived using data from a known location.

256. The method of any of embodiments 214 to 255, further comprising repeating the passively detecting, and processing a plurality of times.

257. The method of embodiment 256, wherein the repeating is performed at a single location.

258. The method of embodiment 256, wherein the repeating is performed at different locations.

259. The method of embodiment 258, wherein the repeating is performed sequentially or concurrently at each of the different locations.

260. The method of embodiment 258 or 259, wherein the different locations correspond to a plurality of grid positions.

261. The method of embodiment 260, further comprising generating a multi-dimension model of a subterranean formation using a plurality of detected seismic signals, wherein at least one signal of the plurality of detected seismic signals is determined at each corresponding grid position of the plurality of grid positions.

262. The method of any of embodiments 214 to 261, further comprising: performing a further survey of the subterranean formation when a presence of the at least one fluid is detected.

263. The method of embodiment 262, wherein the further survey comprises a seismological survey, a controlled-source electromagnetics survey, a controlled-source electroseismic survey, a controlled-source seismoelectric survey, a gravity survey, a magnetic survey, or a passive survey.

264. The method of any of embodiments 214 to 263, further comprising: developing a geological model of the subsurface earth formation; determining at least one predicted result from the geological model; comparing the at least one predicted result to the detected seismic signal; and determining the at least one property of the subsurface earth formation based on the comparing.

265. The method of any of embodiments 214 to 264, wherein generating the one or more detected signals further comprises: generating at least one nonlinear seismic signal by isolating the at least one nonlinear seismic signal from the detected seismic signal; and wherein processing the one or more detected signals further comprises: processing the at least one nonlinear seismic signal to determine at least one property of the subsurface earth formation.

266. In an embodiment, a system for identifying hydrocarbons in a subterranean formation comprises: one or more sensors coupled to a processor that detect one or more signals generated within a subsurface earth formation due to a seismoelectric response or an electroseismic response in at least one porous subsurface earth formation containing at least one fluid; and an analysis tool, that when executed on the processor, configures the processor to: receive the one or more signals from the one or more sensors; process at least a portion of the one or more signals to determine at least one property of the subsurface earth formation.

267. The system of embodiment 266, wherein the one or more sensors comprise a plurality of seismic sensors that detect a seismic signal related to earth's electromagnetic field and produce a first signal indicative of the detected seismic signal, and wherein the analysis tool receives the first signal and processes the first signal to determine the at least one property of the subsurface earth formation.

268. The system of embodiment 267, wherein the plurality of seismic sensors is arranged in an array over a portion of the subsurface earth formation.

269. The system of embodiment 267 or 268, wherein the distance between each of the plurality of seismic sensors is less than one half of the wavelength of the surface waves at an expected surface wave frequency.

270. The system of any of embodiments 267 to 269, wherein the plurality of seismic sensors comprises at least one sensor selected from the group consisting of: a hydrophone, a single-component geophone, a two-component geophone, a three-component geophone, a single-axis accelerometer, a two-axis accelerometer, a three-axis accelerometer, and any combination thereof.

271. The system of any of embodiments 267 to 270, wherein the at least one property of the subsurface earth formation comprises at least one property selected from the group consisting of: an existence of the subsurface earth formation containing at least one fluid, a depth of the subsurface earth formation, a porosity, a fluid permeability, a composition of at least one fluid within the subsurface earth formation, a spatial extent of the subsurface earth formation, an orientation of the boundaries of the subsurface earth formation, a resistivity, and any combination thereof.

272. The system of any of embodiments 267 to 271, further comprising a recording apparatus configured to record the first signal on a non-transitory media.

273. The system of any of embodiments 267 to 272, wherein the at least one fluid comprises at least one component selected from the group consisting of: an aqueous fluid, a hydrocarbon, a petroleum, carbon dioxide, and any combination thereof.

274. The method of embodiment 273, wherein the aqueous fluid comprises at least one of potable water, fresh water, or brine.

275. The system of any of embodiments 267 to 274, wherein at least one of the plurality of seismic sensors is disposed on the surface of the earth or within a wellbore.

276. The system of any of embodiments 267 to 275, wherein the analysis tool further configures the processor to: decimate a data set representing the first signal.

277. The system of any of embodiments 267 to 276, wherein the analysis tool further configures the processor to: filter a noise component from the first signal.

278. The system of any of embodiments 267 to 277, wherein the analysis tool further configures the processor to: filter the first signal using a predetermined frequency bandwidth.

279. In an embodiment, a system for identifying hydrocarbons in a subterranean formation comprises: a memory comprising a non-transitory computer readable media; a processor; and an analysis tool, that when executed on the processor, configures the processor to: receive one or more signals from one or more sensors, wherein the one or more sensors detect one or more signals generated within a subsurface earth formation due to a seismoelectric response or an electroseismic response in at least one porous subsurface earth formation containing at least one fluid; and process at least a portion of the one or more signals to determine at least one property of the subsurface earth formation.

280. The system of embodiment 279, wherein the one or more sensors comprise a plurality of seismic sensors that detect a seismic signal related to earth's electromagnetic field and produce a first signal indicative of the detected seismic signal, and wherein the analysis tool configures the processor to receive the first signal, and process the first signal to determine the at least one property of the subsurface earth formation.

281. In an embodiment, a method of passive surveying comprises: generating one or more detected signals by passively detecting a signal generated within a subsurface earth formation due to a seismoelectric response or an electroseismic response in at least one porous subsurface earth formation containing at least one fluid; and processing the one or more detected signals to determine at least one property of the subsurface earth formation.

282. The method of embodiment 281, wherein generating the one or more detected signals comprises: generating a detected electromagnetic field by detecting earth's electromagnetic field using an electromagnetic field detector; and generating a detected seismic signal by detecting a seismic wave at least partially resulting from the electroseismic response in the at least one porous subsurface earth formation containing the at least one fluid using a seismic sensor; and wherein processing the one or more detected signals comprises: processing the detected electromagnetic field and the detected seismic signal to determine the at least one property of the subsurface earth formation.

283. The method of embodiment 282, wherein the detected electromagnetic field is generated at a different time than the detected seismic signal.

284. The method of embodiment 282 or 283, wherein the detected electromagnetic field is generated at a different location than the detected seismic signal.

285. The method of any of embodiments 282 to 284, wherein detecting the earth's electromagnetic field comprises measuring a vertical electric component of the earth's electromagnetic field.

286. The method of embodiment 285, further comprising generating a detected magnetic field by detecting earth's magnetic field using a magnetic field detector, and processing the detected magnetic field with the vertical electric component and the detected seismic signal.

287. The method of any of embodiments 282 to 286, wherein detecting the earth's electromagnetic field comprises measuring the earth's electromagnetic field in at least one horizontal direction.

288. The method of any of embodiments 282 to 287, wherein the earth's electromagnetic field comprises a time-varying electromagnetic field.

289. The method of any of embodiments 282 to 288, wherein the earth's electromagnetic field is detected using a pair of porous pot electrodes.

290. The method of embodiment 289, wherein the pair of porous pot electrodes comprises at least one component selected from the group consisting of: copper sulfate, silver chloride, cadmium chloride, mercury chloride, and lead chloride.

291. The method of any of embodiments 282 to 290, wherein the earth's electromagnetic field is detected using a plurality of pairs of porous pot electrodes.

292. The method of any of embodiments 282 to 291, wherein the earth's electromagnetic field is detected using a pair of conductive electrodes.

293. The method of embodiment 292, wherein the pair of metal electrodes comprises at least one conductive material selected from the group consisting of: copper, stainless steel, aluminum, gold, galvanized metal, iron, lead, brass, graphite, and steel.

294. The method of any of embodiments 282 to 293, wherein the earth's electromagnetic field is detected using a conductive electrode coupled to a porous pot electrode.

295. The method of any of embodiments 282 to 294, wherein the electromagnetic field detector is disposed on or above the surface of the earth.

296. The method of any of embodiments 282 to 295, wherein the electromagnetic field detector is moving during the generation of the detected electromagnetic field.

297. The method of any of embodiments 282 to 296, wherein the electromagnetic field detector is disposed in a moving vehicle.

298. The method of any of embodiments 282 to 297, wherein the detected electromagnetic field is generated using one or more antennas disposed on or above a surface of the earth.

299. The method of embodiment 298, wherein the one or more antennas comprises at least one antenna selected from the group consisting of: a parallel-plate capacitor antenna comprising two or more parallel conducting plates, a single-plate capacitor antenna comprising one electrode electrically coupled to the earth, a monopole antenna comprising a conducting element, a dipole antenna comprising two conducting elements, a multi-pole antenna comprising a plurality of conducting elements, a directional antenna comprising conducting elements arranged to augment a signal amplitude in a particular direction, a coil antenna comprising one or more coils of wire, and any combination thereof.

300. The method of embodiment 298, wherein the one or more antennas comprise a concentric electric dipole.

301. The method of any of embodiments 282 to 300, wherein the seismic sensor comprises at least one sensor selected from the group consisting of: a hydrophone, a single-component geophone, a two-component geophone, a three-component geophone, a single-axis accelerometer, a two-axis accelerometer, and a three-axis accelerometer.

302. The method of any of embodiments 282 to 301, wherein the at least one property of the subsurface earth formation comprises at least one property selected from the group consisting of: an existence of the subsurface earth formation containing at least one fluid, a depth of the subsurface earth formation, a porosity, a fluid permeability, a composition of at least one fluid within the subsurface earth formation, a spatial extent of the subsurface earth formation, an orientation of the boundaries of the subsurface earth formation, a resistivity, and any combination thereof.

303. The method of any of embodiments 282 to 302, further comprising recording at least one of the detected electromagnetic field or the detected seismic signal.

304. The method of embodiment 303, wherein the recording occurs for at least about 5 seconds.

305. The method of embodiment 303, wherein the modulated reference signal is recorded for at least about 0.1 seconds.

306. The method of any of embodiments 282 to 305, wherein the at least one fluid comprises at least one component selected from the group consisting of: an aqueous fluid, a hydrocarbon, a petroleum, carbon dioxide, and any combination thereof.

307. The method of embodiment 306, wherein the aqueous fluid comprises at least one of potable water, fresh water, or brine.

308 The method of any of embodiments 282 to 307, wherein the detected electromagnetic field results, at least in part, from a natural event comprising at least one of: an electromagnetic fluctuation in the ionosphere, and a naturally occurring electric discharge in the atmosphere.

309. The method of any of embodiments 282 to 308, wherein the seismic wave is detected on the surface of the earth.

310. The method of any of embodiments 282 to 309, wherein the seismic wave is detected within a wellbore.

311. The method of any of embodiments 282 to 310, further comprising a plurality of electromagnetic field detectors.

312. The method of embodiment 311, wherein the plurality of electromagnetic field detectors are arranged in an array.

313. The method of any of embodiments 282 to 312, further comprising a plurality of seismic sensors.

314. The method of embodiment 313, wherein the plurality of seismic sensors are arranged in an array over a portion of the subsurface earth formation.

315. The method of embodiment 313 or 314, wherein processing the detected electromagnetic field and the detected seismic signal comprises: filtering at least a portion of a seismic wave traveling in a direction perpendicular to vertical by applying a spatial filter to the detected seismic signal from the plurality of seismic sensors.

316. The method of embodiment 315, wherein the spatial filter is based, at least in part, on the spreading symmetry of the seismic wave traveling in the direction perpendicular to vertical.

317. The method of any of embodiments 313 to 316, wherein processing the detected electromagnetic field and the detected seismic signal comprises: removing a seismic noise from a vertical component of the detected seismic signal by applying a predictive filter to the detected seismic signal based on using a horizontal component of the detected seismic signal from the plurality of seismic sensors.

318. The method of any of embodiments 313 to 317, wherein processing the detected electromagnetic field and the detected seismic signal comprises: applying a dip filter to the detected seismic signal based on rejecting at least a portion of the detected seismic signals from the plurality of seismic sensors that arrive at a non-normal angle to a surface, wherein the surface is defined by the plurality of seismic sensors.

319. The method of any of embodiments 313 to 318, wherein processing the detected electromagnetic field and the detected seismic signal comprises: producing cross-correlated seismic data by cross-correlating the detected seismic signal from all of the plurality of seismic sensors; generating summed data by summing the cross-correlated seismic data; and cross-correlating the summed data with the detected electromagnetic field.

320. The method of any of embodiments 282 to 319, further comprising performing a correlation analysis of at least one of the detected electromagnetic field or the detected seismic signal in the time domain, the frequency domain, or both, wherein the correlation analysis provides an indication of a presence of the at least one fluid.

321. The method of embodiment 320, wherein performing the correlation analysis provides at least one of temporal characteristics or frequency characteristics.

322. The method of embodiment 321, further comprising deriving a frequency-depth function based on the temporal characteristics, the frequency characteristics, or both.

323. The method of embodiment 322, wherein the frequency-depth function is derived using data from a known location.

324. The method of any of embodiments 282 to 323, further comprising repeating the passively detecting, and processing a plurality of times.

325. The method of embodiment 324, wherein the repeating is performed at a single location.

326. The method of embodiment 324, wherein the repeating is performed at different locations.

327. The method of embodiment 326, wherein the repeating is performed sequentially or concurrently at each of the different locations.

328. The method of embodiment 326 or 327, wherein the different locations correspond to a plurality of grid positions.

329. The method of embodiment 328, further comprising generating a multi-dimension model of a subterranean formation using a plurality of signals, wherein at least one signal of the plurality of signals is determined at each corresponding grid position of the plurality of grid positions.

330. The method of any of embodiments 282 to 329, further comprising: performing a further survey of the subterranean formation when a presence of the at least one fluid is detected.

331. The method of embodiment 330, wherein the further survey comprises a seismological survey, a controlled-source electromagnetics survey, a controlled-source electroseismic survey, a controlled-source seismoelectric survey, a gravity survey, a magnetic survey, or a passive survey.

332. The method of any of embodiments 282 to 331, wherein processing the one or more detected signals further comprises: filtering at least one of the detected electromagnetic field or the detected seismic signal.

333. The method of embodiment 332, wherein the filtering and processing occur in real time.

334. The method of embodiment 332 or 333, wherein filtering comprises filtering a direct current (DC) portion of the detected electromagnetic field prior to performing the processing.

335. The method of any of embodiments 332 to 334, wherein filtering comprises decimating a data set representing the signal prior to performing the processing.

336. The method of any of embodiments 332 to 335, wherein filtering comprises using a noise filter.

337. The method of embodiment 336, wherein the noise filter comprises a high pass filter, a low pass filter, a wide band frequency filter, a narrow band frequency filter, or any combination thereof.

338. The method of any of embodiments 332 to 337, wherein filtering comprises using one or more band-pass filters.

339. The method of embodiment 338, wherein at least one of the band-pass filters of the one or more band-pass filters comprises a linear phase filter, a finite impulse response filter, a forward infinite impulse response filter, a reverse infinite impulse response filter, or any combination thereof.

340. The method of any of embodiments 282 to 339, wherein processing the detected electromagnetic field and the detected seismic signal comprises averaging an amplitude of at least one of the detected electromagnetic field or the detected seismic signal over one or more frequencies.

341. The method of embodiment 340, wherein the plurality of frequencies comprises one or more fixed frequencies.

342. The method of embodiment 340 or 341, wherein the averaging comprises measuring an amplitude of the at least one of the detected electromagnetic field or the detected seismic signal for a length of time that is greater than a period of oscillation of the at least one of the detected electromagnetic field or the detected seismic signal at the one or more frequencies; and averaging the amplitude over the length of time.

343. The method of any of embodiments 282 to 342, wherein processing at least one of the detected electromagnetic field or the detected seismic signal comprises determining one or more spectral properties of the at least one of the detected electromagnetic field or the detected seismic signal.

344. The method of embodiment 343, wherein determining one or more spectral properties comprises using at least one of a lock-in amplifier or a spectrum analyzer.

345. The method of embodiment 343 or 344, wherein determining one or more spectral properties comprises determining a relative amplitude of each frequency at which an amplitude is determined.

346. The method of any of embodiments 343 to 345, further comprising analyzing the one or more spectral properties to determine a relationship between the one or more spectral properties and the presence of the at least one fluid in the subterranean formation based on a classification method comprising at least one method selected from the group consisting of: a neural network, a decision tree, a Bayes-based classifier, a fuzzy logic-based classifier, and a conventional statistical classifier.

347. The method of any of embodiments 343 to 346, further comprising analyzing the one or more spectral properties to determine a relationship between the one or more spectral properties and a presence of the at least one fluid in the subterranean formation based on a regression analysis of a set of known empirical data.

348. The method of any of embodiments 343 to 347, wherein determining one or more spectral properties comprises calculating one or more power spectral densities.

349. The method of embodiment 348, further comprising de-trending of the one or more power spectral densities.

350. The method of embodiment 348 or 349, further comprising integrating each of the one or more power spectral densities.

351. The method of any of embodiments 348 to 350, further comprising performing a fast Fourier transform of the one or more power spectral densities; and determining one or more correlations between a source signal and the at least one of the detected electromagnetic field or the detected seismic signal based on the fast Fourier transform.

352. The method of embodiment 351, wherein an existence of the one or more correlations provides an indication of the presence of the at least one fluid in the subterranean formation.

353. The method of embodiment 351 or 352, wherein the one or more correlations indicate one or more transit times between the subterranean formation and the surface of the earth.

354. The method of embodiment 353, further comprising correlating the one or more transit times to a depth of the fluid in the subterranean formation.

355. The method of embodiment 354, wherein the correlating is based on estimate rock acoustic properties of the earth.

356. The method of embodiment 354 or 355, wherein correlating comprises determining a frequency-depth relationship.

357. The method of embodiment 356, wherein the frequency-depth relationship is determined based on a classification method comprising at least one method selected from the group consisting of: a neural network, a decision tree, a Bayes-based classifier, a fuzzy logic-based classifier, and a conventional statistical classifier.

358. The method of embodiment 356 or 357, wherein the frequency-depth relationship is determined based on a regression analysis of a set of known empirical data.

359. The method of any of embodiments 282 to 358, further comprising: developing a geological model of the subsurface earth formation; determining at least one predicted result from the geological model; comparing the at least one predicted result to at least one of the detected electromagnetic field or the detected seismic signal; and determining the at least one property of the subsurface earth formation based on the comparing.

360. In an embodiment, a method comprises: generating a detected electromagnetic field by detecting earth's electromagnetic field using at least one electromagnetic field detector in the earth; generating a detected seismic signal by detecting a seismic wave related to the earth's electromagnetic field using a seismic sensor, wherein the detected electromagnetic field is generated at a different time, a different location, or both than the detected seismic signal; generating a detected noise signal by detecting at least one background noise component; filtering the detected electromagnetic field, the detected seismic signal, or both using the detected noise signal to provide a filtered signal, wherein the filtered signal comprises the detected electromagnetic field, the detected seismic signal, or both having an increased signal to noise ratio; and processing the filtered signal and the detected electromagnetic field, the detected seismic signal, or both to determine at least one property of the subsurface earth formation.

361. The method of embodiment 360, wherein the background noise component comprises a background electromagnetic field.

362. The method of embodiment 361, wherein the detected noise signal is generated with an electromagnetic field detector on or above the surface of the earth.

363. The method of embodiment 361 or 362, wherein the detected noise signal is generated by cross-correlating the signal from the at least one electromagnetic field detector in the earth.

364. The method of any of embodiments 361 to 363, wherein the detected noise signal is generated by an electromagnetic field detector capable of measuring at least one horizontal electromagnetic field component in the earth.

365. The method of any of embodiments 361 to 364, wherein the detected noise signal is generated with an electromagnetic field sensor on or above a surface of the earth and distanced from the at least one electromagnetic field detector in the earth.

366. The method of any of embodiments 361 to 365, wherein the detected noise signal comprises a background seismic signal at the surface of the earth.

367. The method of any of embodiments 361 to 366, wherein the detected noise signal is generated using a plurality of seismic sensors.

368. In an embodiment, a method comprising: generating a detected electromagnetic field by detecting earth's electromagnetic field using at least one electromagnetic field detector; generating a detected seismic signal by detecting a seismic wave related to the earth's electromagnetic field using a seismic sensor, wherein the detected electromagnetic field is generated at a different time, a different location, or both than the detected seismic signal; isolating at least one nonlinear electromagnetic field response from the detected electromagnetic field; and processing the at least one nonlinear electromagnetic field and the detected seismic signal to determine at least one property of the subsurface earth formation.

369. The method of embodiment 368, wherein isolating at least one nonlinear seismic signal comprises: identifying fundamental frequencies present in the detected electromagnetic field by cross-correlating the detected electromagnetic field and a detected distant electromagnetic field generated by a distant electromagnetic field detector located at least 500 yards from the at least one electromagnetic field detector; and identifying the at least one nonlinear electromagnetic field response by filtering the fundamental frequencies from the detected electromagnetic field.

370. The method of embodiment 368, wherein isolating at least one nonlinear seismic signal comprises: identifying fundamental frequencies present in the detected electromagnetic field by cross-correlating the detected electromagnetic field and a detected atmospheric electromagnetic field generated by an atmospheric electromagnetic field detector located above the surface of the earth; and identifying the at least one nonlinear electromagnetic field response by filtering the fundamental frequencies from the detected electromagnetic field.

371. In an embodiment, a system for identifying hydrocarbons in a subterranean formation comprises: one or more sensors coupled to a processor that detect one or more signals generated within a subsurface earth formation due to a seismoelectric response or an electroseismic response in at least one porous subsurface earth formation containing at least one fluid; and an analysis tool, that when executed on the processor, configures the processor to: receive the one or more signals from the one or more sensors; process at least a portion of the one or more signals to determine at least one property of the subsurface earth formation.

372. The system of embodiment 371, wherein the one or more sensors comprise: a plurality of seismic sensors that detects a seismic signal related to earth's electromagnetic field and produce a first signal indicative of the detected seismic signal; an electromagnetic field detector that measures the earth's electromagnetic field and produces a second signal indicative of the detected electromagnetic field; and wherein the analysis tool receives the first signal and the second signal and determines the at least one property of a subsurface earth formation.

373. The system of embodiment 372, wherein the first signal is generated at a different time than the second signal.

374. The system of embodiment 373, wherein the first signal is generated at a different location than the second signal.

375. The system of any of embodiments 372 to 374, wherein the plurality of seismic sensors are arranged in an array over a portion of the subsurface earth formation.

376. The system of any of embodiments 372 to 375, wherein the electromagnetic field detector is disposed within the surface of the earth below the plurality of seismic sensors.

377. The system of any of embodiments 372 to 376, wherein the distance between each of the plurality of seismic sensors is less than one half of the wavelength of the surface waves at an expected surface wave frequency.

378. The system of any of embodiments 372 to 377, further comprising a plurality of electromagnetic field detectors.

379. The system of any of embodiments 372 to 378, wherein the second signal comprises a vertical component of the earth's electromagnetic field.

380. The system of any of embodiments 372 to 379, wherein the second signal comprises at least one horizontal component of the earth's electromagnetic field.

381. The system of any of embodiments 372 to 380, wherein the second signal is indicative of a time-varying electromagnetic field.

382. The system of any of embodiments 372 to 381, wherein the electromagnetic field detector comprises a plurality of pairs of porous pot electrodes, wherein each pair of porous pot electrodes are electrically coupled.

383. The system of embodiment 382, wherein the pairs of porous pot electrodes comprise at least one component selected from the group consisting of: copper sulfate, silver chloride, cadmium chloride, mercury chloride, and lead chloride.

384. The system of any of embodiments 372 to 383, wherein the electromagnetic field detector comprises a plurality of pairs of conductive electrodes, wherein each pair of conductive electrodes are electrically coupled.

385. The system of any of embodiments 372 to 384, wherein the plurality of conductive electrodes comprises at least one conductive material selected from the group consisting of: copper, stainless steel, aluminum, gold, galvanized metal, iron, lead, brass, graphite, steel, alloys thereof, and any combination thereof.

386. The system of any of embodiments 372 to 385, wherein the electromagnetic field detector comprises a conductive electrode coupled to a porous pot electrode.

387. The system of any of embodiments 372 to 386, wherein the plurality of seismic sensors comprises at least one sensor selected from the group consisting of: a hydrophone, a single-component geophone, a two-component geophone, a three-component geophone, a single-axis accelerometer, a two-axis accelerometer, a three-axis accelerometer, and any combination thereof.

388. The system of any of embodiments 372 to 387, wherein the at least one property of the subsurface earth formation comprises at least one property selected from the group consisting of: an existence of the subsurface earth formation containing at least one fluid, a depth of the subsurface earth formation, a porosity, a fluid permeability, a composition of at least one fluid within the subsurface earth formation, a spatial extent of the subsurface earth formation, an orientation of the boundaries of the subsurface earth formation, a resistivity, and any combination thereof.

389. The system of any of embodiments 372 to 388, further comprising a recording apparatus configured to record the first signal and the second signal on a non-transitory media.

390. The system of embodiment 389, wherein the recording apparatus comprises a digital or analog recording device.

391. The system of any of embodiments 372 to 390, wherein the at least one fluid comprises at least one component selected from the group consisting of: an aqueous fluid, a hydrocarbon, a petroleum, carbon dioxide, and any combination thereof.

392. The system of embodiment 391, wherein the aqueous fluid comprises at least one of potable water, fresh water, or brine.

393. The system of any of embodiments 372 to 392, wherein at least one of the plurality of seismic sensors is disposed on the surface of the earth or within a wellbore.

394. The system of any of embodiments 372 to 393, wherein at least one of the plurality of seismic sensors is disposed within a wellbore.

395. The system of any of embodiments 372 to 394, wherein the electromagnetic field detector comprises an antenna disposed on or above the surface of the earth.

396. The system of embodiment 395, wherein the antenna comprises at least one antenna selected from the group consisting of a parallel-plate capacitor antenna comprising two or more parallel conducting plates, a single-plate capacitor antenna comprising one electrode electrically coupled to the earth, a monopole antenna comprising a conducting element, a dipole antenna comprising two conducting elements, a multi-pole antenna comprising a plurality of conducting elements, a directional antenna comprising conducting elements arranged to augment a signal amplitude in a particular direction, a coil antenna comprising one or more coils of wire, and any combination thereof.

397. The system of embodiment 395, wherein the antenna comprises a concentric electric dipole.

398. The system of any of embodiments 372 to 397, wherein the analysis tool further configures the processor to: remove a direct current (DC) portion of the second signal.

399. The system of embodiment 272, wherein the analysis tool further configures the processor to: decimate a data set representing at least one of the first signal or second signal.

400. The system of any of embodiments 372 to 399, wherein the analysis tool further configures the processor to: filter a noise component from at least one of the first signal or second signal.

401. The system of any of embodiments 372 to 400, wherein the analysis tool further configures the processor to: filter at least one of the first signal or second signal using a predetermined frequency bandwidth.

402. In an embodiment, a system for identifying hydrocarbons in a subterranean formation comprises: a memory comprising a non-transitory computer readable media; a processor; and an analysis tool, that when executed on the processor, configures the processor to: receive one or more signals from one or more sensors, wherein the one or more sensors detect one or more signals generated within a subsurface earth formation due to a seismoelectric response or an electroseismic response in at least one porous subsurface earth formation containing at least one fluid; and process at least a portion of the one or more signals to determine at least one property of the subsurface earth formation.

403. The system of embodiment 402, wherein the one or more sensors comprise a plurality of seismic sensors that detects a seismic signal related to earth's electromagnetic field and produce a first signal indicative of the detected seismic signal, and an electromagnetic field detector that measures the earth's electromagnetic field and produces a second signal indicative of the detected electromagnetic field; and wherein the analysis tool further configures the processor to receive the first signal and the second signal, and determine the at least one property of a subsurface earth formation.

404. In an embodiment, a method of passive surveying comprises: generating one or more detected signals by passively detecting a signal generated within a subsurface earth formation due to a seismoelectric response or an electroseismic response in at least one porous subsurface earth formation containing at least one fluid; and processing the one or more detected signals to determine at least one property of the subsurface earth formation.

405. The method of embodiment 404, wherein generating the one or more detected signals comprises: generating a detected electromagnetic field by detecting earth's electromagnetic field using an electromagnetic field detector; and generating a detected seismic signal by detecting a seismic wave at least partially resulting from the electroseismic response in the at least one porous subsurface earth formation containing the at least one fluid using a seismic sensor; and wherein processing the one or more detected signals comprises: processing the detected electromagnetic field and the detected seismic signal to determine the at least one property of the subsurface earth formation.

406. The method of embodiment 405, wherein detecting the earth's electromagnetic field comprises measuring a vertical electric component of the earth's electromagnetic field.

407. The method of embodiment 406, further comprising generating a detected magnetic field by detecting earth's magnetic field using a magnetic field detector, and processing the detected magnetic field with the vertical electric component and the detected seismic signal.

408. The method of any of embodiments 405 to 407, wherein detecting the earth's electromagnetic field comprises measuring the earth's electromagnetic field in at least one horizontal direction.

409. The method of any of embodiments 405 to 408, wherein the earth's electromagnetic field comprises a time-varying electromagnetic field.

410. The method of any of embodiments 405 to 409, wherein the earth's electromagnetic field is detected using a pair of porous pot electrodes.

411. The method of embodiment 410, wherein the pair of porous pot electrodes comprises at least one component selected from the group consisting of: copper sulfate, silver chloride, cadmium chloride, mercury chloride, and lead chloride.

412. The method of any of embodiments 405 to 411, wherein the earth's electromagnetic field is detected using a plurality of pairs of porous pot electrodes.

413. The method of any of embodiments 405 to 412, wherein the earth's electromagnetic field is detected using a pair of conductive electrodes.

414. The method of embodiment 413, wherein the pair of metal electrodes comprises at least one conductive material selected from the group consisting of: copper, stainless steel, aluminum, gold, galvanized metal, iron, lead, brass, graphite, and steel.

415. The method of any of embodiments 405 to 414, wherein the earth's electromagnetic field is detected using a conductive electrode coupled to a porous pot electrode.

416. The method of any of embodiments 405 to 415, wherein the electromagnetic field detector is disposed on or above the surface of the earth.

417. The method of any of embodiments 405 to 416, wherein the electromagnetic field detector is moving during the generation of the detected electromagnetic field.

418. The method of any of embodiments 405 to 417, wherein the electromagnetic field detector is disposed in a moving vehicle.

419. The method of any of embodiments 405 to 418, wherein the detected electromagnetic field is generated using one or more antennas disposed on or above a surface of the earth.

420. The method of embodiment 419, wherein the one or more antennas comprises at least one antenna selected from the group consisting of: a parallel-plate capacitor antenna comprising two or more parallel conducting plates, a single-plate capacitor antenna comprising one electrode electrically coupled to the earth, a monopole antenna comprising a conducting element, a dipole antenna comprising two conducting elements, a multi-pole antenna comprising a plurality of conducting elements, a directional antenna comprising conducting elements arranged to augment a signal amplitude in a particular direction, a coil antenna comprising one or more coils of wire, and any combination thereof.

421. The method of embodiment 419, wherein the one or more antennas comprise a concentric electric dipole.

422. The method of any of embodiments 405 to 421, wherein the seismic sensor comprises at least one sensor selected from the group consisting of: a hydrophone, a single-component geophone, a two-component geophone, a three-component geophone, a single-axis accelerometer, a two-axis accelerometer, and a three-axis accelerometer.

423. The method of any of embodiments 405 to 422, wherein the at least one property of the subsurface earth formation comprises at least one property selected from the group consisting of: an existence of the subsurface earth formation containing at least one fluid, a depth of the subsurface earth formation, a porosity, a fluid permeability, a composition of at least one fluid within the subsurface earth formation, a spatial extent of the subsurface earth formation, an orientation of the boundaries of the subsurface earth formation, a resistivity, and any combination thereof.

424. The method of any of embodiments 405 to 423, further comprising recording at least one of the detected electromagnetic field or the detected seismic signal.

425. The method of embodiment 424, wherein the recording occurs for at least about 5 seconds.

426. The method of embodiment 424, wherein the modulated reference signal is recorded for at least about 0.1 seconds.

427. The method of any of embodiments 405 to 426, wherein the at least one fluid comprises at least one component selected from the group consisting of: an aqueous fluid, a hydrocarbon, a petroleum, carbon dioxide, and any combination thereof.

428. The method of embodiment 427, wherein the aqueous fluid comprises at least one of potable water, fresh water, or brine.

429. The method of any of embodiments 405 to 428, wherein the detected electromagnetic field results, at least in part, from a natural event comprising at least one of: an electromagnetic fluctuation in the ionosphere, and a naturally occurring electric discharge in the atmosphere.

430. The method of any of embodiments 405 to 429, wherein the seismic wave is detected on the surface of the earth.

431. The method of any of embodiments 405 to 430, wherein the seismic wave is detected within a wellbore.

432. The method of any of embodiments 405 to 431, wherein processing the detected electromagnetic field and the detected seismic signal comprises: cross-correlating the detected electromagnetic field with the detected seismic signal; and isolating at least a portion of the detected seismic signal arising from the conversion of the earth's electromagnetic field to seismic energy.

433. The method of any of embodiments 405 to 432, further comprising a plurality of electromagnetic field detectors.

434. The method of embodiment 433, wherein the plurality of electromagnetic field detectors are arranged in an array.

435. The method of any of embodiments 405 to 434, further comprising a plurality of seismic sensors.

436. The method of embodiment 435, wherein the plurality of seismic sensors are arranged in an array over a portion of the subsurface earth formation.

437. The method of embodiment 435 or 436, wherein processing the detected electromagnetic field and the detected seismic signal comprises: filtering at least a portion of a seismic wave traveling in a direction perpendicular to vertical by applying a spatial filter to the detected seismic signal from the plurality of seismic sensors.

438. The method of any of embodiments 435 to 437, wherein the spatial filter is based, at least in part, on the spreading symmetry of the seismic wave traveling in the direction perpendicular to vertical.

439. The method of any of embodiments 435 to 438, wherein processing the detected electromagnetic field and the detected seismic signal comprises: removing a seismic noise from a vertical component of the detected seismic signal by applying a predictive filter to the detected seismic signal based on using a horizontal component of the detected seismic signal from the plurality of seismic sensors.

440. The method of any of embodiments 435 to 439, wherein processing the detected electromagnetic field and the detected seismic signal comprises: applying a dip filter to the detected seismic signal based on rejecting at least a portion of the detected seismic signals from the plurality of seismic sensors that arrive at a non-normal angle to a surface, wherein the surface is defined by the plurality of seismic sensors.

441. The method of any of embodiments 435 to 440, wherein processing the detected electromagnetic field and the detected seismic signal comprises: producing cross-correlated seismic data by cross-correlating the detected seismic signal from all of the plurality of seismic sensors; generating summed data by summing the cross-correlated seismic data; and cross-correlating the summed data with the detected electromagnetic field.

442. The method of any of embodiments 405 to 441, further comprising performing a correlation analysis of at least one of the detected electromagnetic field or the detected seismic signal in the time domain, the frequency domain, or both, wherein the correlation analysis provides an indication of a presence of the at least one fluid.

443. The method of embodiment 442, wherein performing the correlation analysis provides at least one of temporal characteristics or frequency characteristics.

444. The method of embodiment 443, further comprising deriving a frequency-depth function based on the temporal characteristics, the frequency characteristics, or both.

445. The method of embodiment 444, wherein the frequency-depth function is derived using data from a known location.

446. The method of any of embodiments 405 to 445, further comprising repeating the passively detecting, and processing a plurality of times.

447. The method of embodiment 446, wherein the repeating is performed at a single location.

448. The method of embodiment 446, wherein the repeating is performed at different locations.

449. The method of embodiment 448, wherein the repeating is performed sequentially or concurrently at each of the different locations.

450. The method of embodiment 448 or 449, wherein the different locations correspond to a plurality of grid positions.

451. The method of embodiment 450, further comprising generating a multi-dimension model of a subterranean formation using a plurality of signals, wherein at least one signal of the plurality of signals is determined at each corresponding grid position of the plurality of grid positions.

452. The method of any of embodiments 405 to 451, further comprising: performing a further survey of the subterranean formation when a presence of the at least one fluid is detected.

453. The method of embodiment 452, wherein the further survey comprises a seismological survey, a controlled-source electromagnetics survey, a controlled-source electroseismic survey, a controlled-source seismoelectric survey, a gravity survey, a magnetic survey, or a passive survey.

454. The method of any of embodiments 405 to 453, wherein processing the one or more detected signals further comprises: filtering at least one of the detected electromagnetic field or the detected seismic signal.

455. The method of embodiment 454, wherein the filtering and processing occur in real time.

456. The method of embodiment 454 or 455, wherein filtering comprises filtering a direct current (DC) portion of the detected electromagnetic field prior to performing the processing.

457. The method of any of embodiments 454 to 456, wherein filtering comprises decimating a data set representing the signal prior to performing the processing.

458. The method of any of embodiments 454 to 457, wherein filtering comprises using a noise filter.

459. The method of embodiment 458, wherein the noise filter comprises a high pass filter, a low pass filter, a wide band frequency filter, a narrow band frequency filter, or any combination thereof.

460. The method of any of embodiments 454 to 459, wherein filtering comprises using one or more band-pass filters.

461. The method of embodiment 460, wherein at least one of the band-pass filters of the one or more band-pass filters comprises a linear phase filter, a finite impulse response filter, a forward infinite impulse response filter, a reverse infinite impulse response filter, or any combination thereof.

462. In an embodiment, a method comprises: generating a detected electromagnetic field by detecting earth's electromagnetic field; generating a detected seismic signal by detecting a seismic wave related to the earth's electromagnetic field; generating a first signal by adding a plurality of intervals of the detected electromagnetic field, wherein each of the plurality of intervals of the detected electromagnetic field begins at a start time and continues for a duration; and generating a second signal by adding a plurality of intervals of the detected seismic signal corresponding to the plurality of intervals of the detected electromagnetic field, wherein each of the plurality of intervals of the detected seismic signals begins at the start time of the corresponding interval of the detected electromagnetic field and continues for the duration of the corresponding interval of the detected electromagnetic field; determining at least one property of the subsurface earth formation by processing the first signal and the second signal.

463. The method of embodiment 462, wherein the number of the plurality of intervals of the detected electromagnetic field and the number of the plurality of intervals of the detected seismic signal are chosen to produce a predetermined signal to noise ratio.

464. The method of embodiment 462 or 463, wherein at least one start time corresponds to the zero crossing voltage of a coherent noise source.

465. The method of any of embodiments 462 to 464, wherein at least one start time corresponds to a natural amplitude spike in the detected electromagnetic field.

466. The method of any of embodiments 462 to 465, wherein each duration comprises a plurality of coherent noise cycles.

467. The method of embodiment 466, wherein each duration comprises a time of about 30 seconds to about 10 minutes.

468. The method of any of embodiments 462 to 467, wherein a time between the intervals comprises an uneven fraction of a coherent noise cycle.

469. The method of any of embodiments 462 to 468, wherein a time between each of the plurality of intervals comprises a fraction of an irrational number.

470. The method of any of embodiments 462 to 469, wherein a time between each of the plurality of intervals comprises a fraction of □.

471. The method of any of embodiments 462 to 470, further comprising: applying a frequency filter to the first signal and the second signal.

472. The method of any of embodiments 462 to 471, further comprising squaring the first signal and the second signal before processing the first signal and the second signal.

473. The method of any of embodiments 462 to 472, further comprising: recording the detected electromagnetic field and the detected seismic signal; using the recorded detected electromagnetic field to generate the first signal; and using the recorded detected seismic signal to generate the second signal.

474. In an embodiment, a method comprises: generating a detected electromagnetic field by detecting earth's electromagnetic field using at least one electromagnetic field detector in the earth; generating a detected seismic signal by detecting a seismic wave related to the earth's electromagnetic field using a seismic sensor; generating a detected noise signal by detecting at least one background noise component; filtering the detected electromagnetic field, the detected seismic signal, or both using the detected noise signal to provide a filtered signal, wherein the filtered signal comprises the detected electromagnetic field, the detected seismic signal, or both having an increased signal to noise ratio; and processing the filtered signal and the detected electromagnetic field, the detected seismic signal, or both to determine at least one property of the subsurface earth formation.

475. The method of embodiment 474, wherein the background noise component comprises a background electromagnetic field.

476. The method of embodiment 475, wherein the detected noise signal is generated with an electromagnetic field detector on or above the surface of the earth.

477. The method of embodiment 475 or 476, wherein the detected noise signal is generated by cross-correlating the signal from the at least one electromagnetic field detector in the earth.

478. The method of any of embodiments 475 to 477, wherein the detected noise signal is generated by an electromagnetic field detector capable of measuring at least one horizontal electromagnetic field component in the earth.

479. The method of any of embodiments 475 to 478, wherein the detected noise signal is generated with an electromagnetic field sensor on or above a surface of the earth and distanced from the at least one electromagnetic field detector in the earth.

480. The method of embodiment 474, wherein the detected noise signal comprises a background seismic signal at the surface of the earth.

481. The method of embodiment 480, wherein the detected noise signal is generated using a plurality of seismic sensors.

482. In an embodiment, a method comprises: generating a detected electromagnetic field by detecting earth's electromagnetic field using at least one electromagnetic field detector; generating a detected seismic signal by detecting a seismic wave related to the earth's electromagnetic field using a seismic sensor; isolating at least one nonlinear seismic signal from the detected seismic signal; and processing the at least one nonlinear seismic signal and the detected electromagnetic field to determine at least one property of the subsurface earth formation.

483. The method of embodiment 482, wherein isolating at least one nonlinear seismic signal comprises: identifying fundamental frequencies present in the detected electromagnetic field by cross-correlating the detected electromagnetic field and the detected seismic signal; and identifying the at least one nonlinear seismic signal by filtering the fundamental frequencies from the detected seismic signal.

484. The method of embodiment 482 or 483, wherein isolating at least one nonlinear seismic signal comprises at least partially rectifying the detected seismic signal.

485. The method of embodiment 483, wherein filtering the fundamental frequencies comprises using a band-pass filter.

486. In an embodiment, a method comprises: generating a detected electromagnetic field by detecting earth's electromagnetic field using at least one electromagnetic field detector; generating a detected seismic signal by detecting a seismic wave related to the earth's electromagnetic field using a seismic sensor; isolating at least one nonlinear electromagnetic field response from the detected electromagnetic field; and processing the at least one nonlinear electromagnetic field and the detected seismic signal to determine at least one property of the subsurface earth formation.

487. The method of embodiment 486, wherein isolating at least one nonlinear electromagnetic field response comprises: identifying fundamental frequencies present in the detected electromagnetic field by cross-correlating the detected electromagnetic field and the detected seismic signal; and identifying the at least one nonlinear electromagnetic field response by filtering the fundamental frequencies from the detected electromagnetic field.

488. The method of embodiment 486 or 487, wherein isolating at least one nonlinear seismic signal comprises: identifying fundamental frequencies present in the detected electromagnetic field by cross-correlating the detected electromagnetic field and a detected distant electromagnetic field generated by a distant electromagnetic field detector located at least 500 yards from the at least one electromagnetic field detector; and identifying the at least one nonlinear electromagnetic field response by filtering the fundamental frequencies from the detected electromagnetic field.

489. The method of any of embodiments 486 to 488, wherein isolating at least one nonlinear seismic signal comprises: identifying fundamental frequencies present in the detected electromagnetic field by cross-correlating the detected electromagnetic field and a detected atmospheric electromagnetic field generated by an atmospheric electromagnetic field detector located on or above the surface of the earth; and identifying the at least one nonlinear electromagnetic field response by filtering the fundamental frequencies from the detected electromagnetic field.

490. In an embodiment, a system for identifying hydrocarbons in a subterranean formation comprises: one or more sensors coupled to a processor that detect one or more signals generated within a subsurface earth formation due to a seismoelectric response or an electroseismic response in at least one porous subsurface earth formation containing at least one fluid; and an analysis tool, that when executed on the processor, configures the processor to: receive the one or more signals from the one or more sensors; process at least a portion of the one or more signals to determine at least one property of the subsurface earth formation.

491. The system of embodiment 490, wherein the one or more sensors comprise: a plurality of seismic sensors that detects a seismic signal related to earth's electromagnetic field and produce a first signal indicative of the detected seismic signal; an electromagnetic field detector that measures the earth's electromagnetic field and produces a second signal indicative of the detected electromagnetic field;

and wherein the analysis tool receives the first signal and the second signal and determines the at least one property of a subsurface earth formation.

492. The system of embodiment 491, wherein the plurality of seismic sensors are arranged in an array over a portion of the subsurface earth formation.

493. The system of embodiment 491 or 492, wherein the electromagnetic field detector is disposed within the surface of the earth below the plurality of seismic sensors.

494. The system of any of embodiments 491 to 493, wherein the distance between each of the plurality of seismic sensors is less than one half of the wavelength of the surface waves at an expected surface wave frequency.

495. The system of any of embodiments 491 to 494, further comprising a plurality of electromagnetic field detectors.

496. The system of any of embodiments 491 to 495, wherein the second signal comprises a vertical component of the earth's electromagnetic field.

497. The system of any of embodiments 491 to 496, wherein the second signal comprises at least one horizontal component of the earth's electromagnetic field.

498. The system of any of embodiments 491 to 497, wherein the second signal is indicative of a time-varying electromagnetic field.

499. The system of any of embodiments 491 to 498, wherein the electromagnetic field detector comprises a plurality of pairs of porous pot electrodes, wherein each pair of porous pot electrodes are electrically coupled.

500. The system of embodiment 499, wherein the pairs of porous pot electrodes comprise at least one component selected from the group consisting of: copper sulfate, silver chloride, cadmium chloride, mercury chloride, and lead chloride.

501. The system of any of embodiments 491 to 500, wherein the electromagnetic field detector comprises a plurality of pairs of conductive electrodes, wherein each pair of conductive electrodes are electrically coupled.

502. The system of embodiment 501, wherein the plurality of conductive electrodes comprises at least one conductive material selected from the group consisting of: copper, stainless steel, aluminum, gold, galvanized metal, iron, lead, brass, graphite, steel, alloys thereof, and any combination thereof.

503. The system of any of embodiments 491 to 502, wherein the electromagnetic field detector comprises a conductive electrode coupled to a porous pot electrode.

504. The system of any of embodiments 491 to 503, wherein the plurality of seismic sensors comprises at least one sensor selected from the group consisting of: a hydrophone, a single-component geophone, a two-component geophone, a three-component geophone, a single-axis accelerometer, a two-axis accelerometer, a three-axis accelerometer, and any combination thereof.

505. The system of any of embodiments 491 to 504, wherein the at least one property of the subsurface earth formation comprises at least one property selected from the group consisting of an existence of the subsurface earth formation containing at least one fluid, a depth of the subsurface earth formation, a porosity, a fluid permeability, a composition of at least one fluid within the subsurface earth formation, a spatial extent of the subsurface earth formation, an orientation of the boundaries of the subsurface earth formation, a resistivity, and any combination thereof.

506. The system of any of embodiments 491 to 505, further comprising a recording apparatus configured to record the first signal and the second signal on a non-transitory media.

507. The system of embodiment 506, wherein the recording apparatus comprises a digital or analog recording device.

508. The system of any of embodiments 491 to 507, wherein the at least one fluid comprises at least one component selected from the group consisting of: an aqueous fluid, a hydrocarbon, a petroleum, carbon dioxide, and any combination thereof.

509. The system of embodiment 508, wherein the aqueous fluid comprises at least one of potable water, fresh water, or brine.

510. The system of any of embodiments 491 to 509, wherein at least one of the plurality of seismic sensors is disposed on the surface of the earth or within a wellbore.

511. The system of any of embodiments 491 to 510, wherein at least one of the plurality of seismic sensors is disposed within a wellbore.

512. The system of any of embodiments 491 to 511, wherein the electromagnetic field detector comprises an antenna disposed on or above the surface of the earth.

513. The system of embodiment 512, wherein the antenna comprises at least one antenna selected from the group consisting of: a parallel-plate capacitor antenna comprising two or more parallel conducting plates, a single-plate capacitor antenna comprising one electrode electrically coupled to the earth, a monopole antenna comprising a conducting element, a dipole antenna comprising two conducting elements, a multi-pole antenna comprising a plurality of conducting elements, a directional antenna comprising conducting elements arranged to augment a signal amplitude in a particular direction, a coil antenna comprising one or more coils of wire, and any combination thereof.

514. The system of embodiment 512, wherein the antenna comprises a concentric electric dipole.

515. The system of any of embodiments 491 to 514, wherein the analysis tool further configures the processor to: remove a direct current (DC) portion of the second signal.

516. The system of any of embodiments 491 to 515, wherein the analysis tool further configures the processor to: decimate a data set representing at least one of the first signal or second signal.

517. The system of any of embodiments 491 to 516, wherein the analysis tool further configures the processor to: filter a noise component from at least one of the first signal or second signal.

518. The system of any of embodiments 491 to 517, wherein the analysis tool further configures the processor to: filter at least one of the first signal or second signal using a predetermined frequency bandwidth.

519. In an embodiment, a system for identifying hydrocarbons in a subterranean formation comprises: a memory comprising a non-transitory computer readable media; a processor; and an analysis tool, that when executed on the processor, configures the processor to: receive one or more signals from one or more sensors, wherein the one or more sensors detect one or more signals generated within a subsurface earth formation due to a seismoelectric response or an electroseismic response in at least one porous subsurface earth formation containing at least one fluid; and process at least a portion of the one or more signals to determine at least one property of the subsurface earth formation.

520. The system of embodiment 519, wherein the one or more sensors comprise a seismic sensor that detects a seismic signal related to earth's electromagnetic field and produce a first signal indicative of the detected seismic signal, and an electromagnetic field detector that measures the earth's electromagnetic field and produces a second signal indicative of the detected electromagnetic field; and wherein the analysis tool configures the processor to receive the first signal and the second signal and determine the at least one property of a subsurface earth formation.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A system for subsurface surveying comprising:
   one or more of an electromagnetic sensor and a seismic sensor located near or above the surface of the earth, wherein the electromagnetic sensor is configured to detect an electromagnetic signal generated by a subsurface earth formation in response to a passive-source electromagnetic signal, wherein the electromagnetic signal is generated by an electroseismic or seismoelectric conversion of the passive-source electromagnetic signal and wherein the seismic sensor is configured to detect a seismic signal generated by the subsurface earth formation in response to a passive-source electromagnetic signal, wherein the seismic signal is generated by an electroseismic or seismoelectric conversion of the passive-source electromagnetic signal;
   a processor; and
   a memory, wherein the memory includes executable instructions that, when executed, cause the processor to:
      receive data corresponding to one or more of the electromagnetic signal generated by the subsurface earth formation in response to the passive-source electromagnetic signal and the seismic signal generated by the subsurface earth formation in response to the passive-source electromagnetic signal; and
      determine at least one property of the subsurface earth formation, based, at least in part, on one or more of the detected electromagnetic signal generated by a subsurface earth formation and the detected seismic signal generated by a subsurface earth formation.

2. The system of claim 1, wherein the instructions that cause the process to determine at least one property of the subsurface earth formation, based, at least in part, on the detected electromagnetic signal generated by a subsurface earth formation, further cause the processor to:
   perform an autocorrelation on the data corresponding to an electromagnetic signal generated by a subsurface earth formation.

3. The system of claim 1, wherein the executable instructions that cause the processor to determine the at least one property of the subsurface earth formation, based, at least in part, on the detected seismic signal generated by the subsurface earth formation further cause the processor to:
   perform an autocorrelation on the data corresponding to a seismic signal generated by the subsurface earth formation.

4. The system of claim 1, wherein the electromagnetic signal generated by a subsurface earth formation is detected at a first time, the seismic signal generated by the subsurface earth formation is detected at a second time, the first time and the second time are different, and wherein the executable instructions that cause the processor to determine the at least one property of the subsurface earth formation, based, at least in part, on the detected seismic signal generated by the subsurface earth formation further cause the processor to:
   determine the at least one property of the subsurface earth formation, based, at least in part, on a correlation of the detected electromagnetic signal generated by a subsurface earth formation and the detected seismic signal generated by the subsurface earth formation.

5. The system of claim 1, wherein the executable instructions further cause the processor to:
   demodulate a portion of the electromagnetic signal generated by a subsurface earth formation to identify a signal property that is indicative of the presence of the hydrocarbons.

6. The system of claim 1, wherein the at least one property of the subsurface earth formation comprises the existence of a subsurface earth formation containing at least one fluid.

7. The system of claim 6, wherein the at least one fluid includes at least one hydrocarbon.

8. The system of claim 6, wherein the at least one fluid includes helium.

9. The system of claim 6, wherein the at least one fluid includes one or more fluids selected from the group consisting of: water and carbon dioxide.

10. The system of claim 9, wherein the at least one fluid includes at least one hydrocarbon.

11. The system of claim 1, wherein the at least one property of the subsurface earth formation comprises a depth of a subsurface formation containing at least one fluid.

12. The system of claim 1, wherein the at least one property of the subsurface earth formation comprises a porosity of the subsurface formation containing at least one fluid.

13. A method of survey analysis comprising;
receiving data corresponding to one or more of a electromagnetic signal generated by the subsurface earth formation in response to the passive-source electromagnetic signal and a seismic signal generated by the subsurface earth formation in response to the passive-source electromagnetic signal, wherein the electromagnetic signal generated by the subsurface earth formation in response to the passive-source electromagnetic signal is detected by an electromagnetic sensor located at or near the surface of the earth and wherein the seismic signal generated by the subsurface earth formation in response to the passive-source electromagnetic signal is detected by an seismic sensor located at or near the surface of the earth; and
determining at least one property of the subsurface earth formation, based, at least in part, on one or more of the detected electromagnetic signal generated by a subsurface earth formation and the seismic signal generated by the subsurface earth formation in response to the passive-source electromagnetic signal.

14. The method of claim 13, wherein determining at least one property of the subsurface earth formation, based, at least in part, on the detected electromagnetic signal generated by a subsurface earth formation comprises:
performing an autocorrelation on the data corresponding to an electromagnetic signal generated by a subsurface earth formation.

15. The method of claim 14, wherein the at least one property of the subsurface earth formation comprises the existence of a subsurface earth formation containing at least one fluid.

16. The method of claim 15, wherein the at least one fluid includes at least one hydrocarbon.

17. The method of claim 15, wherein the at least one fluid includes helium.

18. The method of claim 13, wherein determining the at least one property of the subsurface earth formation, based, at least in part, on the detected seismic signal generated by the subsurface earth formation comprises:
performing an autocorrelation on the data corresponding to a seismic signal generated by the subsurface earth formation.

19. The method of claim 13, wherein the electromagnetic signal generated by a subsurface earth formation is detected at a first time, the seismic signal generated by the subsurface earth formation is detected at a second time, the first time and the second time are different, and wherein determining the at least one property of the subsurface earth formation, based, at least in part, on the detected seismic signal generated by the subsurface earth formation further comprises:
determining the at least one property of the subsurface earth formation, based, at least in part, on a correlation of the detected electromagnetic signal generated by a subsurface earth formation and the detected seismic signal generated by the subsurface earth formation.

20. The method of claim 13, wherein the at least one property of the subsurface earth formation comprises a depth of a subsurface formation containing at least one fluid.

21. The method of claim 13, wherein the at least one property of the subsurface earth formation comprises a porosity of the subsurface formation containing at least one fluid.

22. The method of claim 13, further comprising:
drilling a wellbore at a location, wherein the location is based, at least in part, on the at least one property of the subsurface earth formation.

23. The method of claim 13, further comprising:
recovering one or more fluids from the subsurface earth formation.

* * * * *